US012801187B2

(12) United States Patent
Park et al.

(10) Patent No.: US 12,801,187 B2
(45) Date of Patent: Nov. 17, 2026

(54) HINGE STRUCTURE AND FOLDABLE ELECTRONIC DEVICE INCLUDING THE SAME

(71) Applicant: SAMSUNG ELECTRONICS CO., LTD., Suwon-si (KR)

(72) Inventors: Daehyeong Park, Suwon-si (KR); Jaehee Kim, Suwon-si (KR); Jongkeun Kim, Suwon-si (KR); Jongyoon Kim, Suwon-si (KR); Hyungsoo Kim, Suwon-si (KR); Chungkeun Yoo, Suwon-si (KR); Soobin Choi, Suwon-si (KR); Sooyeon Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 41 days.

(21) Appl. No.: 18/828,134

(22) Filed: Sep. 9, 2024

(65) Prior Publication Data

US 2025/0004508 A1 Jan. 2, 2025

Related U.S. Application Data

(63) Continuation of application No. PCT/KR2023/001778, filed on Feb. 8, 2023.

(30) Foreign Application Priority Data

May 9, 2022 (KR) ........................ 10-2022-0056655
Jun. 16, 2022 (KR) ........................ 10-2022-0073275

(51) Int. Cl.
*G06F 1/16* (2006.01)
*H04M 1/02* (2006.01)

(52) U.S. Cl.
CPC .......... *G06F 1/1681* (2013.01); *G06F 1/1652* (2013.01); *H04M 1/022* (2013.01); *H04M 1/0268* (2013.01)

(58) Field of Classification Search
CPC .... G06F 1/1652; G06F 1/1681; H04M 1/022; H04M 1/0268
See application file for complete search history.

(56) References Cited

U.S. PATENT DOCUMENTS 10,761,573 B2 9/2020 Hsu
10,845,850 B1 11/2020 Kang et al.
(Continued)

FOREIGN PATENT DOCUMENTS

CN 114095592 A 2/2022
EP 4072110 A1 10/2022
(Continued)

OTHER PUBLICATIONS

European Search Report for European Patent Application No. 23803661.0 dated Mar. 13, 2025.
(Continued)

*Primary Examiner* — Nidhi Thaker
(74) *Attorney, Agent, or Firm* — CANTOR COLBURN LLP

(57) ABSTRACT

A hinge structure includes a fixing bracket, a first rotation member including a first rail structure and rotated about a first axis, and a second rail structure extending from the first rail structure and rotated about a second axis, a second rotation member including a third rail structure and rotated about a third axis, and a fourth rail structure extending from the third rail structure and rotated about a fourth axis, a first link member including a first slide holding part including a third rail, a second link member including a second slide holding part including a fourth rail, a first arm member including a first slide structure, in which the first slide holding part is held, and a second arm member including a second slide structure, in which the second slide holding part is held, and a foldable electronic device including the same.

20 Claims, 32 Drawing Sheets

(56) References Cited

U.S. PATENT DOCUMENTS

| | | | | |
|---|---|---|---|---|
| 11,188,120 | B2 | 11/2021 | Myung et al. | |
| 11,231,752 | B2 | 1/2022 | Liu | |
| 11,231,754 | B2 | 1/2022 | Kang et al. | |
| 11,467,633 | B2 * | 10/2022 | Liao | G06F 1/1641 |
| 11,503,723 | B2 | 11/2022 | Yang et al. | |
| 11,615,720 | B2 * | 3/2023 | Park | G09F 9/301 361/679.01 |
| 11,662,781 | B2 | 5/2023 | Kang et al. | |
| 11,703,916 | B2 * | 7/2023 | Tian | G06F 1/1616 361/679.27 |
| 11,706,886 | B2 * | 7/2023 | Wu | G06F 1/1616 361/807 |
| 11,723,156 | B2 | 8/2023 | Yang et al. | |
| 11,726,530 | B2 | 8/2023 | Kang et al. | |
| 11,762,430 | B2 | 9/2023 | Kim et al. | |
| 11,792,947 | B2 | 10/2023 | Kim et al. | |
| 11,846,998 | B2 * | 12/2023 | Wu | H05K 5/0226 |
| 11,920,395 | B2 | 3/2024 | Quynh et al. | |
| 12,032,417 | B2 * | 7/2024 | Park | G06F 1/1616 |
| 12,047,521 | B2 * | 7/2024 | Liao | H04M 1/0216 |
| 12,108,551 | B2 * | 10/2024 | Jung | H04M 1/022 |
| 12,181,935 | B2 | 12/2024 | Hsiang et al. | |
| 12,314,091 | B2 * | 5/2025 | Cheng | H04M 1/022 |
| 12,389,558 | B2 * | 8/2025 | Shin | H04M 1/022 |
| 12,449,863 | B2 * | 10/2025 | Park | G06F 1/1681 |
| 12,464,059 | B2 * | 11/2025 | Liao | H04M 1/0216 |
| 2020/0097051 | A1 | 3/2020 | Liu | |
| 2020/0103935 | A1 | 4/2020 | Hsu | |
| 2020/0348732 | A1 | 11/2020 | Kang et al. | |
| 2021/0149436 | A1 | 5/2021 | Myung et al. | |
| 2022/0011827 | A1 | 1/2022 | Kim et al. | |
| 2022/0120124 | A1 | 4/2022 | Quynh et al. | |
| 2022/0346256 | A1 | 10/2022 | Kim et al. | |
| 2023/0185338 | A1 | 6/2023 | Seo et al. | |
| 2023/0213056 | A1 | 7/2023 | Han et al. | |
| 2023/0359252 | A1 | 11/2023 | Kang et al. | |
| 2024/0357025 | A1 * | 10/2024 | Zhang | H04M 1/022 |
| 2025/0076938 | A1 | 3/2025 | Hsiang et al. | |

FOREIGN PATENT DOCUMENTS

| | | | | |
|---|---|---|---|---|
| KR | 20160032080 | A | 3/2016 | |
| KR | 20170103268 | A | 9/2017 | |
| KR | 20210016498 | A | 2/2021 | |
| KR | 20210031041 | A | 3/2021 | |
| KR | 102250196 | B1 | 5/2021 | |
| KR | 20210059445 | A | 5/2021 | |
| KR | 20210068880 | A | 6/2021 | |
| KR | 102311588 | B1 | 10/2021 | |
| KR | 20220030625 | A | 3/2022 | |
| KR | 20220050462 | A | 4/2022 | |
| KR | 20220052096 | A | 4/2022 | |
| WO | WO-2021129882 | A1 * | 7/2021 | G06F 1/1681 |
| WO | 2022014852 | A1 | 1/2022 | |
| WO | 2022093229 | A1 | 5/2022 | |

OTHER PUBLICATIONS

Indian Office Action for Indian Patent Application No. 202417074106, dated Sep. 18, 2026.

* cited by examiner

FIG.2A
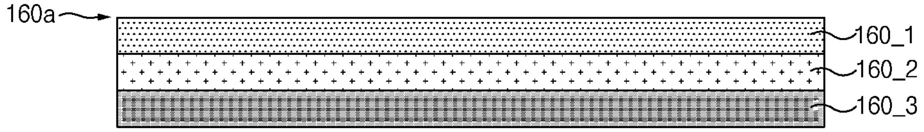
FIG.2B
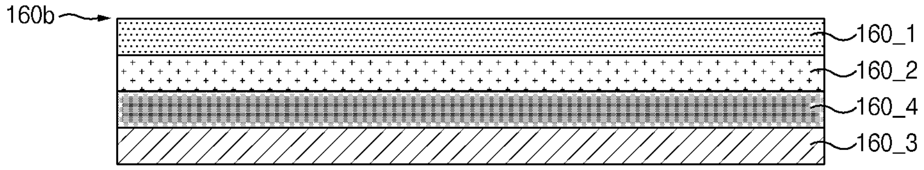
FIG.2C
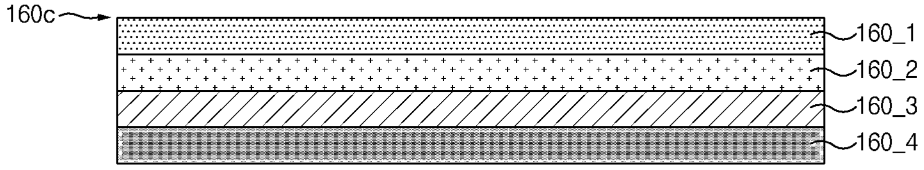
FIG.2D
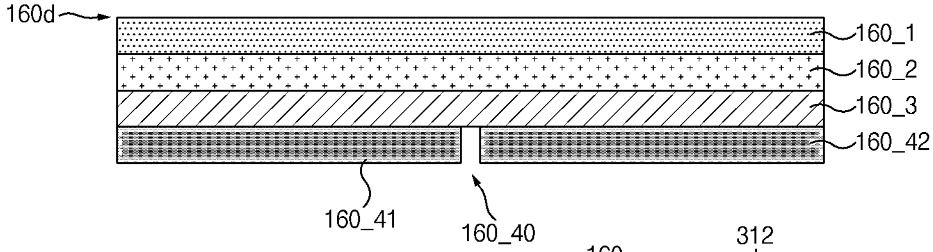
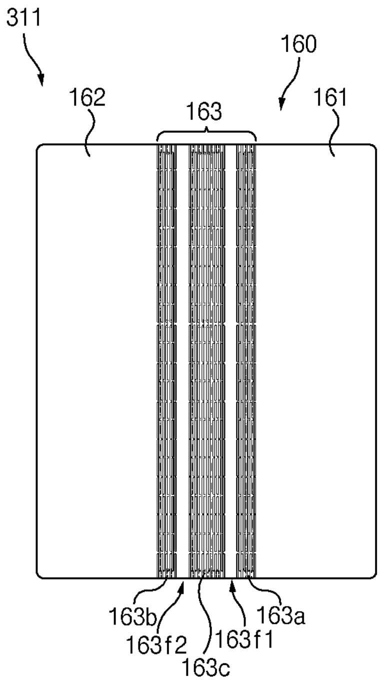
FIG.2E
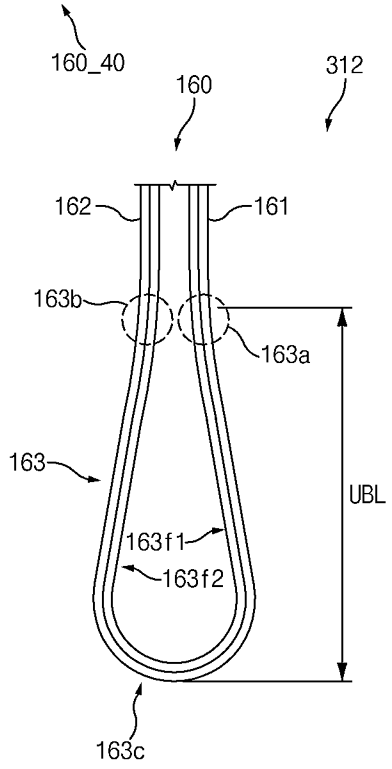
FIG.2F

HINGE STRUCTURE AND FOLDABLE ELECTRONIC DEVICE INCLUDING THE SAME

CROSS-REFERENCE TO RELATED APPLICATION(S)

This application is a continuation application of International Application No. PCT/KR2023/001778 designating the United States, filed on Feb. 8, 2023, in the Korean Intellectual Property Receiving Office and claiming priority to Korean Patent Application No. 10-2022-0056655, filed on May 9, 2022, and Korean Patent Application No. 10-2022-0073275, filed on Jun. 16, 2022, in the Korean Intellectual Property Office, the disclosures of which are incorporated by reference herein in their entireties.

BACKGROUND

1. Field

Various embodiments of the disclosure relate to a hinge structure, in which at least a portion of a folding area of a display is received, and a foldable electronic device including the same.

2. Description of Related Art

Portable electronic devices, such as smartphones, may provide various functions as well as call functions based on various types of applications. In a process of providing various functions, portable electronic devices may output images (e.g., screens) corresponding to the functions. When using the various functions described above, a user of the electronic device may wish to employ a wider screen.

SUMMARY

When a portable electronic display device is enlarged to provide a larger size screen (e.g., a display screen), the overall size of the electronic display device increases, which may deteriorate portability thereof. Accordingly, foldable portable electronic display devices are developed so that the screen size may be increased while maintaining portability of the devices.

A foldable electronic device (or a portable electronic device, a portable communication device, a foldable electronic device, or a foldable electronic device with a communication function) according to at least one embodiment of the disclosure includes a display, a first housing and a second housing, in which at least a portion of the display is received, a hinge structure connecting the first housing and the second housing, and a hinge housing, in which the hinge structure is seated, the hinge structure includes a fixing bracket fixed to the hinge housing and including a first rail and a second rail, a first rotation member including a first rail structure fastened to the first rail and being rotated about a first axis, and a second rail structure extending from the first rail structure and being rotated about a second axis, a second rotation member including a third structure fastened to the second rail and being rotated about a third axis, and a fourth rail structure extending from the third rail structure and being rotated about a fourth axis, a first link member including a third rail fastened the arc-shaped second rail structure and including a first slide holding part disposed adjacent to the third rail, a second link member including a fourth rail fastened the arc-shaped fourth rail structure and including a second slide holding part disposed adjacent to the fourth rail, a first arm member including a first slide structure held on the first slide holding part, and a second arm member including a second slide structure held on the second slide holding part.

A hinge structure employed in a portable communication device according to various embodiments includes a fixing bracket including an arc-shaped first rail and an arc-shaped second rail, a first rotation member including a first rail structure fastened to the first rail and rotated about a first axis, and a second rail structure extending from the first rail structure and rotated about a second axis, a second rotation member including a third rail structure fastened to the second rail and rotated about a third axis, and a fourth rail structure extending from the third rail structure and rotated about a fourth axis, a first link member including a first slide holding part including a third rail fastened to the arc-shaped second rail structure and disposed adjacent to the third rail, a second link member including a second slide holding part including a fourth rail fastened to the arc-shaped fourth rail structure and disposed adjacent to the fourth rail, a first arm member including a first slide structure, in which the first slide holding part is held, and a second arm member including a second slide structure, in which the second slide holding part is held.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 2A-2F are views respectively illustrating an example of a display structure of an electronic device according to an embodiment.

DETAILED DESCRIPTION

Figure 1:
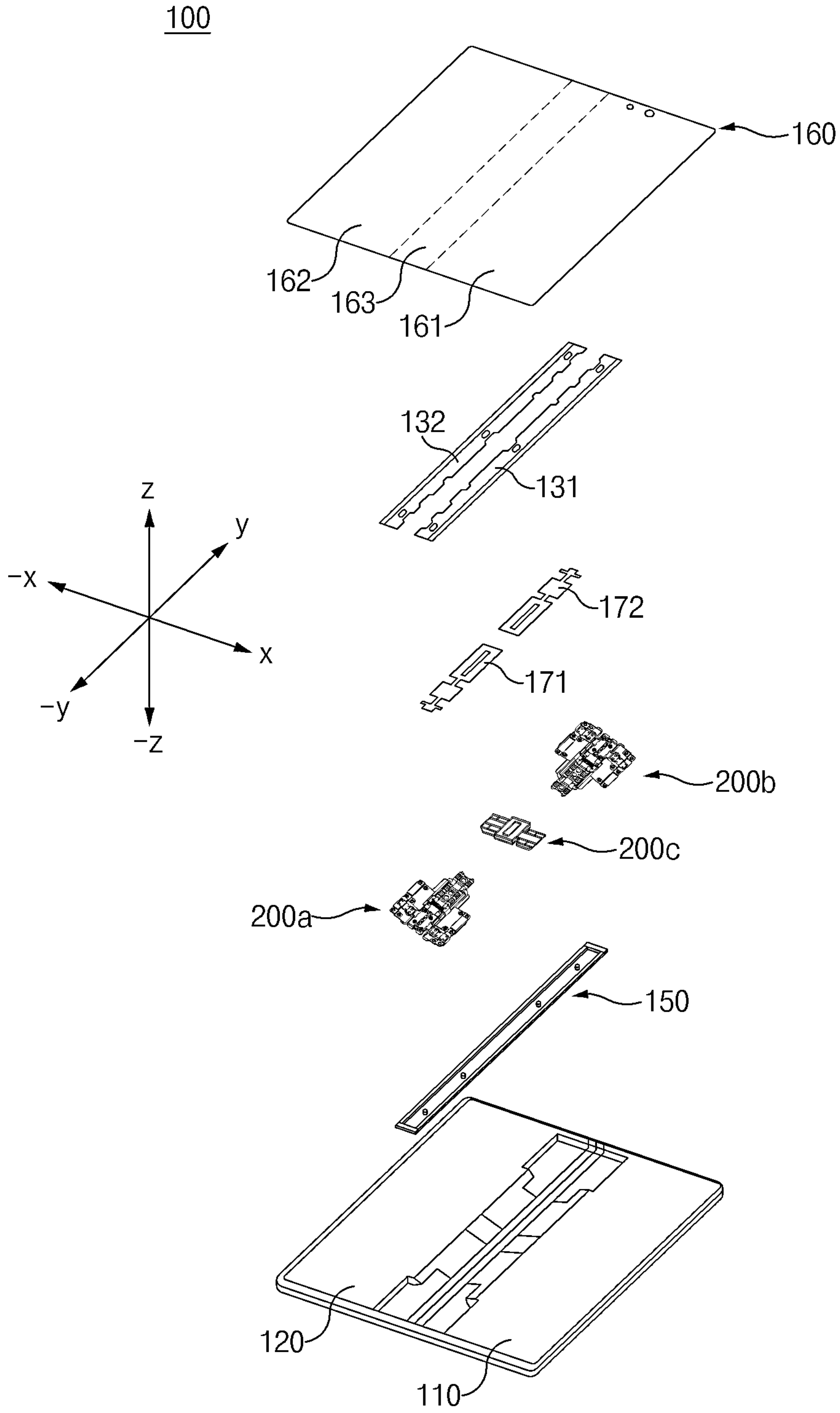
FIG. 1 is an exploded perspective view of an electronic device according to an embodiment.

Hereinafter, various embodiments of the disclosure will be described with reference to the accompanying drawings.

One or more embodiment of the disclosure described below provides a hinge structure in which at least a portion of a folding area of a display is received, and which maintains a folding area at which a display is folded. The folding area is maintained in a water drop shape, thereby reducing (or dispersing) stresses occurring in the folding area and decreasing deformation or damage to the display, and a foldable electronic device including the same.

Additionally, one or more embodiment of the disclosure also provides a hinge structure in which at least a portion of a folding area of display is received, and which may protect the folding area of the display using a smaller space compared to previous structures of foldable electronic devices and adhering housings which surround the display (or reducing ae space between the housings) to reduce introduction of foreign substances into a foldable electronic device, and a foldable electronic device including the same.

One or more embodiment of the present disclosure also provides a hinge structure at least a portion of a folding area of a display is received, and which may adjust a folding or unfolding structure of the foldable electronic device which receives the folding area of the display to ensure a robust feature to an external impact, and a foldable electronic device including the same.

At least a portion of the foldable electronic device providing the above-described effects may be achieved by at least one embodiment or at least a part of one embodiment described below.

A hinge structure which accommodates at least a portion of a folding area of a display and a foldable electronic device including the same according to an embodiment support folding the foldable electronic device into a parallel gap.

Furthermore, an embodiment may reduce stresses acting on the folding area of the display.

In addition, an embodiment may reduce introduction of foreign substances and provide robust characteristics to an external impact by tightly adhering an area which surrounds the display of the foldable electronic device.

In addition, various purposes and effects provided by the hinge structure and the electronic device including the same according to various embodiments may be mentioned according to the embodiments of the detailed description.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being related to another element such as being "on" another element, it can be directly on the other element or intervening elements may be present therebetween. In contrast, when an element is referred to as being related to another element such as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

FIG. 1 is an exploded perspective view of an electronic device according to an embodiment.

Referring to FIG. 1, an electronic device 100 (or a foldable electronic device, a portable electronic device, a portable communication device, a foldable electronic device, or a portable device) according to an embodiment may include a first housing 110, a second housing 120, a hinge housing 150, center plates 171 and 172, wing plates 131 and 132 (or plates), a display 160, and at least one hinge structure 200*a*, 200*b*, and 200*c*. As an example, in the electronic device 100, at least one of the center plates 171 and 172, the wing plates 131 and 132 (or the plates), the display 160, and the at least one hinge structure 200*a*, 200*b*, and 200*c* may be omitted. For example, the center plates 171 and 172 and the wing plates 131 and 132 may be omitted, and the electronic device 100 may include only the at least one hinge structure 200*a*, 200*b*, and 200*c*, the display 160, and the housings 110 and 120. Alternatively, at least one of the center plates 171 and 172 and the wing plates 131 and 132 may be omitted, and the electronic device 100 may include only the at least one hinge structure 200*a*, 200*b*, and 200*c*, the display 160, and the housings 110 and 120.

When the electronic device 100 is in a folded state, a folded area (or a folding area) of the display 160 is formed in a water drop shape (or a dumbbell shape), to which gravity is applied. That is, the foldable electronic device which is folded includes portions of the third area 163 facing each other together with the first area 161 and second area 162 facing each other and being closer to each other than the portions of the third area 163, to form the dumbbell shape. Thus, a folding radius (curvature) that prevents cracks or buckling from occurring in the folded area of the display 160 may be secured. Furthermore, a dumbbell-shaped display folded area is disposed in specific spaces of the housings 110 and 120. Thus, when the electronic device 100 is in the folded state, the housings 110 and 120 may be disposed to face each other such that a gap therebetween having a ⊓-shaped disposition state may be reduced. Through this, according to the electronic device 100, an overall size of the electronic device 100 may be reduced by decreasing the gap between the housings 110 and 120 in the folded state, and foreign substances may be prevented from being introduced between the housings 110 and 120.

The first housing 110 may be hingedly connected to the second housing 120 by using at least one hinge structure 200*a*, 200*b*, and 200*c*. The first housing 110 may include a bottom area on which the display 160 is seated, and a side wall or a separately provided frame which surrounds a periphery of the display 160 or a periphery of an area on which the display 160 is seated. Additionally, a rear cover may be disposed on a rear surface of the first housing 110. Here, the rear cover may be omitted.

At least a portion of the first housing 110 may be adhered to at least a portion of a first area 161 of the display 160. Alternatively, at least a portion of a periphery of the front surface (a surface facing the z-axis direction) of the first housing 110 may be adhered to at least a portion of a periphery of the first area 161 of the display 160. In this regard, an adhesion layer may be disposed between the front surface of the first housing 110 and the first area 161 of the display 160.

At least a portion of an inside of the first housing 110 may be hollow. At least one of at least one circuit board, at least one battery, and at least one camera module may be disposed in an interior of first housing 110. The circuit board and the battery disposed in the first housing 110 may be electrically connected to electronic elements (e.g., at least one circuit board and at least one battery) disposed in an interior of second housing 120 through a flexible board (not illustrated). For example, the flexible board (not illustrated) may extend from a partial area of the first housing 110 across the hinge housing 150 to a partial area of the second housing 120. A partial area of the flexible board (not illustrated) may be located in an interior of hinge housing 150. For example, a processor and a memory may be disposed on a circuit board disposed in the first housing 110.

At least a portion of the first housing 110 may be formed of a metallic material, or at least a portion thereof may be formed of a nonmetallic material. The first housing 110 may be formed of a material having a specific level of strength to support at least a portion of the display 160. In an embodiment, when the electronic device 100 is in an unfolded state, a portion of the first housing 110, which faces the second housing 120 (or a portion which is adjacent to the second housing 120) may include a recessed part, at least a portion of which is recessed so that the hinge housing 150 may be disposed therein.

The first housing 110 may be connected to the at least one hinge structure 200*a*, 200*b*, and 200*c*, and may be rotated in a counterclockwise direction relative to a rotation axis extended along the y-axis (e.g., a direction when the electronic device 100 is folded) or may be rotated in a clockwise direction (e.g., a direction when the electronic device 100 is unfolded) from an arbitrary point other than 0 between the −x-axis and the x-axis to an arbitrary point between the z-axis to the −z-axis due to an external pressure (e.g., a force applied by the user who holds the first housing 110), applied from the outside. When the electronic device 100 is in the folded state, the first housing 110 may be disposed in parallel to the z-axis or may be disposed in parallel to the second housing 120. While the first housing 110 is disposed in parallel to the second housing 120, at least portions of three peripheries (the remaining peripheries other than a periphery which is adjacent to the second housing 120 when the electronic device is in the unfolded state) of the first housing 110 may be disposed to contact three peripheries (the remaining peripheries except for a periphery which is adjacent to the first housing 110 when the electronic device 100 is in the unfolded state) of the second housing 120.

The second housing 120 may be hingedly connected to the first housing 110 through the at least one hinge structure 200*a*, 200*b*, and 200*c*. The second housing 120 may include a front surface (or a bottom surface), on which at least a portion (at least a portion of a second area 162) of the display 160 is seated, and a side wall or a separately provided frame which surrounds a periphery of at least a portion of the front surface or the second area 162 of the display 160. At least a portion of the second housing 120 may be adhered to at least a portion of the second area 162 of the display 160. Alternatively, at least a portion of a periphery of the front surface of the second housing 120 may be adhered to a periphery of the second area 162 of the display 160. In this regard, an adhesion layer may be disposed between the front surface of the second housing 120 and the second area 162 of the display 160.

Similar to the first housing 110, the second housing 120 may have a hollow at at least a portion of an inside thereof. At least one of the at least one circuit board and the at least one battery may be disposed in an interior of second housing 120. Alternatively, at least one battery may be disposed in any one or both of the first housing 110 or the second housing 120. At least one of the printed circuit board or the battery disposed in the second housing 120 may be electrically connected to a component (e.g., at least one of the printed circuit board or the battery) disposed in the first housing 110 through a flexible board.

Similar to the first housing 110, at least a portion of the second housing 120 may be formed of a metallic material, or at least a portion thereof may be formed of a nonmetallic material. The second housing 120 may be formed of a material having a specific level of strength to support at least a portion of the display 160. In an embodiment, when the electronic device 100 is in the unfolded state, a portion of the second housing 120, which faces the first housing 110 (or a portion which is adjacent to the first housing 110) may include a recessed part, at least a portion of which is recessed so that the hinge housing may be disposed therein. The recessed part of the second housing 120 may be disposed adjacent to the recessed part of the first housing 110. A rear cover may be disposed on the rear surface of the second housing 120. Here, the rear cover may be omitted.

At least a portion of the hinge housing 150 may be disposed in recessed parts which are formed at a portion which the first housing 110 and the second housing 120 faces or that is adjacent to the first housing 110 and the second housing 120 when the electronic device 100 is in the unfolded state. The hinge housing 150 may be provided in form which extends longer in the y-axis direction than the x-axis direction as a whole, where a plane may be defined by the y-axis and the x-axis direction crossing each other. However, the disclosure is not limited thereto, and depending on a type of electronic device 100, a length in the x-axis direction may be greater than a length in the y-axis direction. A structure (e.g., a boss or a hook) for fixing the at least one hinge structure 200*a*, 200*b*, and 200*c* may be disposed in a partial area of an inner surface of the hinge housing 150.

At least a portion of the display 160 may have flexibility. For example, the display 160 may include a first area 161 at least a portion of which is disposed on the first housing 110, a second area 162 at least a portion of which is disposed on the second housing 120, and a third area 163 (or a folded area or a folding area) which is located between the first area 161 and the second area 162 and at which the display 160 is foldable.

When the electronic device 100 is in the folded or unfolded state, at least portions of the first area 161 and the second area 162 may be disposed flat (e.g., non-folded area or non-folding area), and when the electronic device 100 is in the folded state, at least a portion of the third area 163 may be curved. For example, the first area 161 and the second area 162 may be maintained on a plane (a disposition location of the plane is changed) regardless of the folded state of the electronic device 100, and the third area 163 may be deformed into a curved state or a flat state in correspondence to the state of the electronic device 100. For example, the third area 163 may be in a planar state (or a flat state) when the electronic device 100 is in the unfolded state, and at least a portion thereof may be in a curved state when the electronic device 100 is in the folded state.

The display 160 may include various layers. For example, the display 160 may include an external protective layer (or a glass layer or a polymer layer) having a specific transparency and a specified size, a display panel layer (or a panel layer, a panel, or a display panel) which is disposed under the external protective layer to display the screen (e.g., provide an image on a display screen), and at least one first rear surface layer (or a rear surface panel or a rear surface portion) which is disposed under the display panel layer. The first rear surface layer may include at least one of a shock absorbing layer (or emboss) and a heat dissipating layer (or metal sheet layer). Additionally or alternatively, the first rear surface layer may further include an electromagnetic induction panel (e.g., digitizer). The display 160 may further include a second rear surface layer disposed on a lower side of the first rear surface layer. Additionally or alternatively, the first rear surface layer may further include an electromagnetic induction panel (e.g., a digitizer). The display 160 may further include a second rear surface layer which is disposed under the first rear surface layer. The second rear surface layer (or the rear surface panel or the rear surface portion) may include at least one metal layer (or a metal sheet), at least portion of which is formed of a metallic material. It may include a designated pattern (e.g., a lattice pattern or a slit pattern) so that at least a portion of the second rear surface layer may be bent. Alternatively, at least a portion of the second rear surface layer may be formed of another bendable material (e.g., a polymer material, plastic, rubber, a leather material). At least one of the first rear surface layer and the second rear surface layer may be omitted.

At least a portion of the at least one hinge structure among a plurality of hinge structures 200*a*, 200*b*, and 200*c* may be disposed in the hinge housing 150, and at least some (e.g., 200*a* and 200*b*) of the plurality of hinge structures 200*a*, 200*b*, and 200*c* may have similar structures and shapes. In FIG. 1, a structure, in which the two hinge structures 200*a* and 200*b* of similar shapes and the hinge structure 200*c* of a different shape are disposed in the hinge housing 150, has been described as an example, but the disclosure is not limited thereto, and three or more first hinge structures 200*a* and 200*b* having similar types of interlocking structures may be disposed, the second hinge structure 200*c* having a different type of a non-interlocking structure may be omitted, or two or more hinge structures may be mounted on the hinge housing 150. Among the at least one hinge structure 200*a*, 200*b*, and 200*c*, some hinge structures 200*a* and 200*b* may perform a hinge operation with respect to six axes extended in a rotation axis direction (or imaginary axes, or axes) and two sliding structures so that the display 160 supports the third area 163 of the display 160 to form a dumbbell shape of the display 160 which is folded.

The center plates 171 and 172 may be disposed between the display 160 and the hinge structures 200*a*, 200*b*, and 200*c*. As an example, among the center plates 171 and 172, the first center plate 171 may be disposed to cover at least a portion of a central area of the first hinge structure 200*a*. Alternatively, the first center plate 171 may be disposed to cover at least a portion of the third hinge structure 200*c* while covering at least a portion of the first hinge structure 200*a*. Among the center plates 171 and 172, the second center plate 172 may be disposed to cover at least a portion of a central area of the second hinge structure 200*b*. Alternatively, the second center plate 172 may be disposed to cover at least the remaining of at least portion of the third hinge structure 200*c* together with at least a portion of the central area of the second hinge structure 200*b*. The center plates 171 and 172 may be fastened and fixed to at least one of the hinge housing 150 and the hinge structures 200*a*, 200*b*, and 200*c*.

The wing plates 131 and 132 are coupled to at least one hinge structure 200*a*, 200*b*, and 200*c*, and are disposed to cover at least portion of a surface of the at least one hinge structure 200*a*, 200*b*, and 200*c* in the z-axis direction when the electronic device 100 is in the unfolded state. The wing plates 131 and 132 are provided separately from the housings 110 and 120. Accordingly, a gap may be formed between the wing plates 131 and 132 and the housings 110 and 120. The wing plates 131 and 132 may be disposed on opposite sides with the center plates 171 and 172 interposed therebetween. For example, the first wing plate 131 may be located in the x-axis direction of the center plates 171 and 172, and the second wing plate 132 is located in the −x-axis direction of the center plates 171 and 172. When the wing plates 131 and 132 are coupled to the hinge structures 200*a*, 200*b* and 200*c*, they may be disposed at the same height or at the same xy plane as those of the center plates 171 and 172 with respect to the z-axis.

The wing plates 131 and 132 may be rotated clockwise or counterclockwise about a rotation axis extended along the y-axis direction depending on the hinge operation of the at least one hinge structure 200*a*, 200*b*, and 200*c*. For example, while the first wing plate 131 is rotated counterclockwise, the second wing plate 132 may be rotated clockwise, and while the first wing plate 131 is rotated clockwise, the second wing plate 132 may be rotated counterclockwise. The first wing plate 131 may support the flat first surface of the third area 163 of the display 160, which is folded into a dumbbell shape (or a water drop shape, to which the gravity is applied), and the second wing plate 132 may support the flat second surface (a surface which is symmetrical to the first surface with respect to the z-axis) of the third area 163 of the foldable display 160, which is folded into a dumbbell shape.

FIGS. 2A-2F are views illustrating an example of a display structure of an electronic device according to an embodiment. In FIGS. 2A-2F, cross-sectional views 160*a* to 160*d* illustrate various types of display structures, plan view 311 illustrates the display of the electronic device in the unfolded state, and side view 312 illustrates the display of the electronic device in the folded state. Additionally, lattice areas 163*a*, 163*b*, and 163*c* illustrated in view 311 are illustrated for convenience of explanation, and when the display is disposed on the lattice areas 163*a*, 163*b*, and 163*c*, the corresponding lattice areas 163*a*, 162*b*, and 163*c* may not be observed on the front surface. Furthermore, in view 312, for convenience of description, the areas 161, 162, and 163 of the display 160 are indicated, and the structure expressed as a multi-layer in view 312 may mean a panel layer (e.g., the panel layer of FIGS. 2A to 2D, or a layer which is located on an inside) and a support layer or a support board (e.g., the panel protecting layer 160_3 of FIGS. 2A to 2D) (a layer which is located on an outside), on which the lattice areas 163*a*, 163*b*, and 163*c* are formed, while supporting the panel layer.

Referring to FIGS. 1 and 2A-2F, for the display 160 of the electronic device 100 illustrated in FIG. 1 (or at least one of the electronic devices described below), any one of various types of displays illustrated in FIGS. 2A-2F may be applied. Various types of displays, for example, may include any one of a first type display 160*a* including three layers (e.g., the front surface protecting layer 160_1, the panel layer 160_2, and the panel protecting layer 160_3), and second to fourth types of displays 160*b*, 160*c*, and 160*d* including fourth layers (the front surface protecting layer 160_1, the panel layer 160_2, a pen input layer 160_4 as an input sensing layer, and the panel protecting layer 160_3).

In the first to fourth types of displays 160*a*, 160*b*, 160*c*, and 160*d*, at least a portion of the front surface protecting layer 160_1 is formed to be transparent, and is disposed on an upper surface of the panel layer 160_2 to restrain or prevent the panel layer 160_2 from being damaged by an external pressure or a force. This front surface protecting layer 160_1 may be formed of at least one of various materials, such as glass, tempered glass, transparent plastic, and polymer. A plurality of pixels are disposed in the panel layer 160_2, at least some of the plurality of pixels are disposed in a matrix form, and an image is implemented by using electric power which is supplied from a power supply source (e.g., a battery). The panel layer 160_2 may further include a touch layer which may recognize an external input from outside the display 160, such as the touch by the user. The panel protecting layer 160_3 is disposed on a lower side of the panel layer 160_2 to protect the panel layer 160_2.

The panel protecting layer 160_3, for example, may include at least one layer selected from the group consisting of a shock absorbing layer (or embossing) and at least one heat dissipating layer (or at least one metal sheet layer). As an example, when the panel protecting layer 160_3 includes a metal layer, at least a portion of the metal layer may be formed of at least one of a stainless steel (SUS) and copper. At least a portion of the panel protecting layer 160_3 may include a lattice pattern. Alternatively, a portion of the panel protecting layer 160_3, which is disposed under the third area 163 of the display 160, may include a lattice pattern. The second type display 160*b* and the third type display 160*c* illustrate forms, in which a disposition sequence of the pen input layer 160_4 (or an integrated digitizer) and the panel protecting layer 160_3 are different. Additionally, when the panel protecting layer 160_3 includes an impact absorbing layer and at least one metal layer, the pen input layer 160_4 may be disposed between the impact absorbing layer and the metal layer.

The illustrated fourth type display 160*d* corresponds to a form, in which the pen input layer is separated. For example, the fourth type display 160*d* may include a first pen input layer 160_41 and a second pen input layer 160_42 which is separated from the first pen input layer 160_41, and a gap 160_40 may be formed between the first pen input layer 160_4 and the second pen input layer 160_4. The gap 160_40 may be disposed under the third area 163 of the display 160. In the above-described first to fourth type displays 160*a*, 160*b*, 160*c*, and 160*d*, the remaining layers except for the panel layer 160_2 may be selectively omitted.

The display 160 of the electronic device 100 may include a first area 161 (or a first part or a first position), a second area 162 (or a second part or a second position), and a third area 163 (or a third part, a third position, a folding area). The first to third areas 161, 162, and 163 may be connected to each other. The third area 163 is disposed between the first area 161 and the second area 162. Accordingly, one side (e.g., a left periphery with respect to the illustrated drawing) of the third area 163 is connected to a right periphery of the first area 161, and an opposite side (e.g., a right periphery with respect to the illustrated drawing) of the third area 163 is connected to a left periphery of the second area 162. That is, a boundary may be defined between the third area 163 and each of the first and second areas 161 and 162, respectively.

With respect to a longitudinal direction of the illustrated drawing (e.g., along the y-axis direction), the first area 161, the second area 162, and the third area 163 may have the same length. With respect to a transverse direction of the illustrated drawing (e.g., along the x-axis direction), widths of the first area 161 and the second area 162 may be the same or similar. The third area 163 may have the same or similar width to that of the first area 161 or the second area 162, or may have a smaller width. The division into the first to third areas 161, 162, and 163 may be applied to each or at least one of the various types of displays previously described in FIGS. 2A-2F.

The third area 163 may be an area which is folded when the electronic device 100 is in the folded state, that is, to be foldable with respect to the rotation axis. An entirety or a portion (or at least one rear surface layer disposed under the panel protecting layer) of the panel protecting layer (e.g., the panel protecting layer 160_2) disposed under the third area 163 may include a lattice pattern. Referring to the side view in FIG. 2F, for example, the third area 163 may form a water drop shape (or a dumbbell shape) which falls by the gravity from an upper toward a lower side of the illustrated drawing (e.g., in the −z-axis direction as a thickness direction of the electronic device 100). In this regard, the third area 163 may include a convex area 163*c* which is convex downward, flat areas 163*f*1 and 163*f*2 which extend from opposite sides of the convex area 163*c* to a boundary (or a peripheries) of the first area 161 and the second area 162, and curved areas 163*a* and 163*b* (areas having a reverse curvature when viewed from a curving direction of the convex area 163*c*) which are formed between the flat areas 163*f*1 and 163*f*2, and the first area 161 and the second area 162. The curved areas 163*a* and 163*b* may have a curvature in a direction which is different from a convex direction of the convex area 163*c*, such that an inflection point is defined between the convex area 163*c* and a respective curved area. In an embodiment, the foldable electronic device which is folded includes a change of curvature of the display 160 at boundaries respectively defined between the third area 163 and each of the first area 161 and the second area 162, and the boundaries correspond to the second axis 12 and the fourth axis 14, respectively.

A length UBL of the folded part (or the third area 163 or the folding area) of the display 160 may range from the curved areas 163*a* and 163*b* to an end point (a lowest point of the convex area 163*c*) of the convex area 163*c*, and the length UBL of the folded part may influence positions and a thicknesses of the center plates 171 and 172 described in FIG. 1, and sizes of the recessed parts of the first housing 110 and the second housing 120.

A curving direction of the lattice pattern corresponding to the convex area 163*c* may be different from a curving direction of the lattice pattern corresponding to the curved areas 163*a* and 163*b*. For example, the convex area 163*c* may be curved convexly from a direction in which a screen of the display 160 is displayed, toward a rear surface, and the curved areas 163*a* and 163*b* may be curved convexly from the rear surface of the display 160 toward the direction, in which the screen is displayed. The lattice pattern may be omitted in the panel protecting layer (e.g., the panel protecting layer 160_2 corresponding to the flat areas 163*f*1 and 163*f*2).

The lattice pattern formed in the curved areas 163*a* and 163*b* and the lattice pattern formed in the convex area 163*c* may have the same or similar shape. For example, the lattice pattern formed (or provided) in the curved areas 163*a* and 163*b* may include at least one of a half-etching type (e.g., a type, in which grooves or recesses of a specific pattern are formed from a surface of the metal layer and partially penetrating a thickness of the metal layer) or an etching hole type (e.g., a type, in which a plurality of holes or an empty space which passes through front and rear surfaces of the metal layer to completely penetrate a thickness thereof is disposed in a specific pattern). Alternatively, some of the lattice patterns of the curved areas 163*a* and 163*b* may be formed as a half-etching type and others may be formed as an etching hole type.

As another example, when the panel protecting layer 160_3 includes a material (e.g., carbon fiber reinforced plastics (CFRP), glass fiber reinforced plastics (GFRP)) having a ductility of a specific level or more, the etched shape may be omitted. Since the lattice pattern of the convex area 163*c* has a relatively higher curvature as compared to those of the curved areas 163*a* and 163*b*, a lattice pattern which is different from those of the curved areas 163*a*, 163*b* may be formed to take a more flexible form. For example, at least one of an etching size and an etching depth of the lattice pattern of the convex area 163*c* may be greater than those of the curved areas 163*a* and 163*b*, and an interval between the patterns (e.g., grooves or holes) may be smaller than those of the curved areas 163*a* and 163*b*.

Figure 3A:
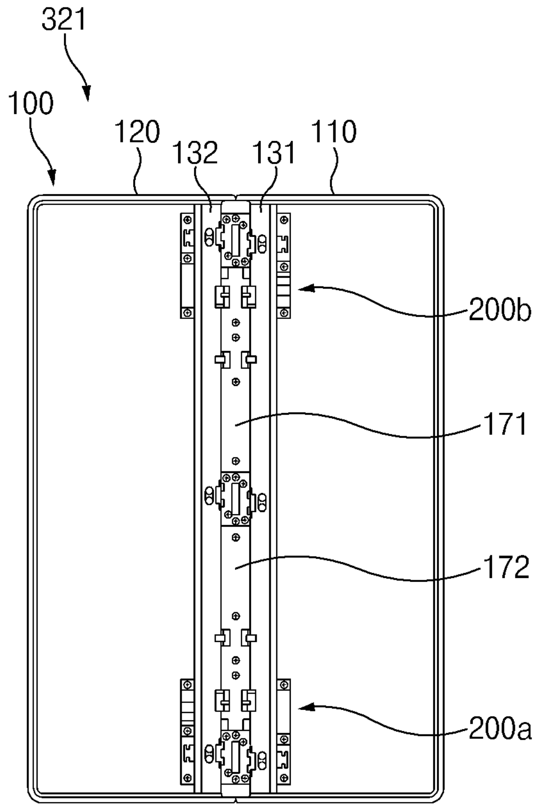
FIGS. 3A-3C are views illustrating an example of a coupled state of wing plates, among components of an electronic device according to an embodiment.
Figure 3B:
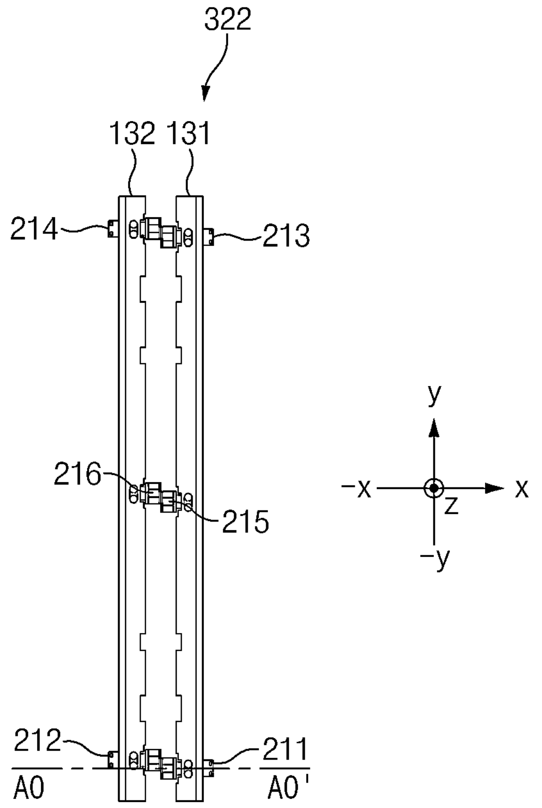
Figure 3C:
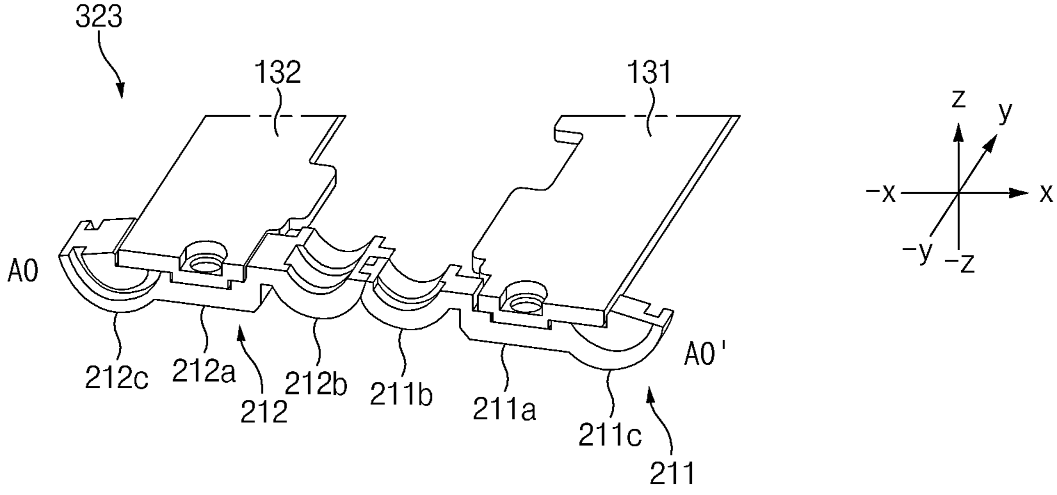

FIGS. 3A-3C are views illustrating an example of a coupled state of the wing plates, among the components of the electronic device configuration according to an embodiment. In FIGS. 3A-3C, view 321 is a plan view illustrating an example of a front surface of the housing on which the display is disposed when the electronic device including the hinge structure is in the unfolded state, and view 322 is a plan view illustrating a partial area, in which the wing plates and the rotation members are disposed in view 321, and view 323 is a perspective view illustrating an example of a cross section taken along A0-A0', among the areas, in which the rotation members are positions in view 322.

Referring to FIGS. 1 to 3C, the electronic device 100 may include a first housing 110, a second housing 120, at least one hinge structure 200*a*, 200*b*, and 200*c*, and wing plates 131 and 132. and center plates 171 and 172. The at least one hinge structure 200*a*, 200*b*, and 200*c* may be disposed between the first housing 110 and the second housing 120 when the electronic device 100 is in the unfolded state. In the at least one hinge structure 200*a*, 200*b*, and 200*c*, the hinge structures 200*a* and 200*b* disposed in a y-axis periphery and a –y-axis periphery and the hinge structure 200*c* disposed at a central portion may have different shapes or structures, but may commonly include rotation members.

Referring to the drawing, a first rotation member 211 and a second rotation member 212 may be disposed in the first hinge structure 200*a*, and a third rotation member 213 and a fourth rotation member 214 may be disposed in the second hinge structure 200*b*, and a fifth rotation member 215 and a sixth rotation member 216 may be disposed in the third hinge structure 200*c*. The first to sixth rotation members 211, 212, 213, 214, 215, and 216 may be fixedly coupled to the wing plates 131 and 132, respectively. For example, the first rotation member 211, the third rotation member 213, and the fifth rotation member 215 may be fastened to the first wing plate 131, and the second rotation member 212, the fourth rotation member 214, and the sixth rotation member 216 may be fastened to the second wing plate 132. The first wing plate 131 and the second wing plate 132 may be disposed to be spaced apart at a specific interval. For example, the first wing plate 131 and the second wing plate 132 may be disposed to be spaced apart from each other by an x-axis width of the first center plate 171 or the second center plate 172.

The first center plate 171 may be disposed between the first hinge structure 200*a* and the third hinge structure 200*c*, and the second center plate 172 may be disposed between the second hinge structure 200*b* and the third hinge structure 200*c*. Here, one side (e.g., a –y-axis periphery) of the first center plate 171 may vertically overlaps one side of the first hinge structure 200*a* when viewed in the z-axis direction, and one side (e.g., a y-axis periphery) of the second center plate 172 may vertically overlap one side of the second hinge structure 200*b* when viewed in the z-axis direction.

The first rotation member 211, for example, may include a first rotation body 211*a*, a first rail structure 211*b*, and a second rail structure 211*c*, and the second rotation member 212, for example, may include a second rotation body 212*a*, a third rail structure 212*b*, and a fourth rail structure 212*c*. At least one through-hole (e.g., a hole which passes in the z-axis direction) which may fastened to the first wing plate 131 and the second wing plate 132 may be disposed in the first rotation body 211*a* and the second rotation body 212*a*. One side (e.g., a –x-axis periphery) of the first rail structure 211*b* which is disposed to extend in the –x-axis direction from the first rotation member 211 and one side (e.g., an x-axis periphery) of the third rail structure 212*b* which is disposed to extend in the x-axis direction from the second rotation member 212 may be disposed to overlap each other when viewed in the –y-axis direction. In this regard, grooves may be formed such that one periphery of the first rail structure 211*b* and one periphery of the third rail structure 212*b* are hingedly engaged with each other.

Pairs among the third to sixth rotation members 213, 214, 215, and 216 also have the same shape and structure as those of the pair of the first rotation member 211 and the second rotation member, and may be disposed in the same form as those of the first rotation member 211 and the second rotation member 212.

Figure 4:
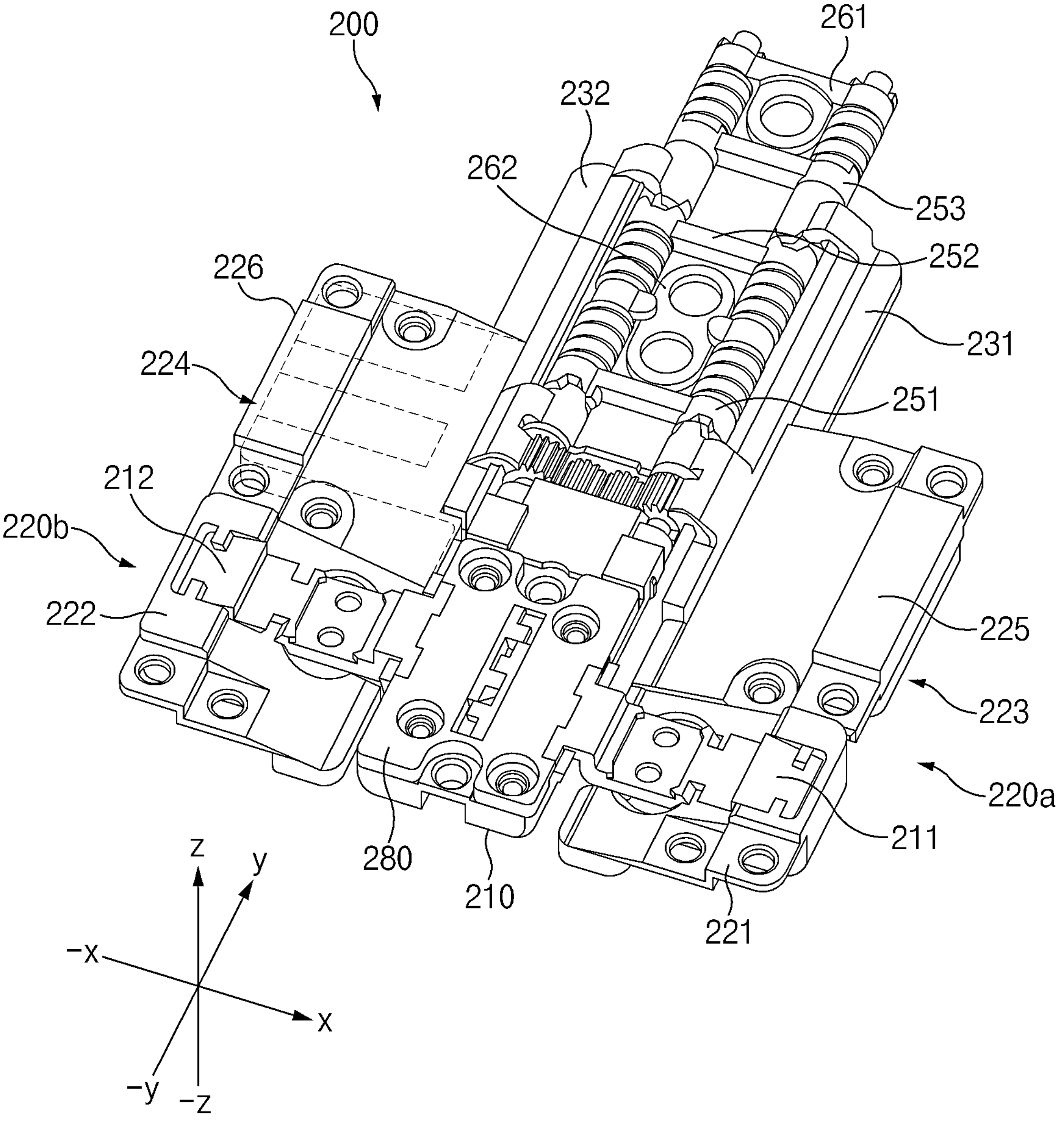
FIG. 4 is a perspective view illustrating an example of a hinge structure according to an embodiment.
Figure 5:
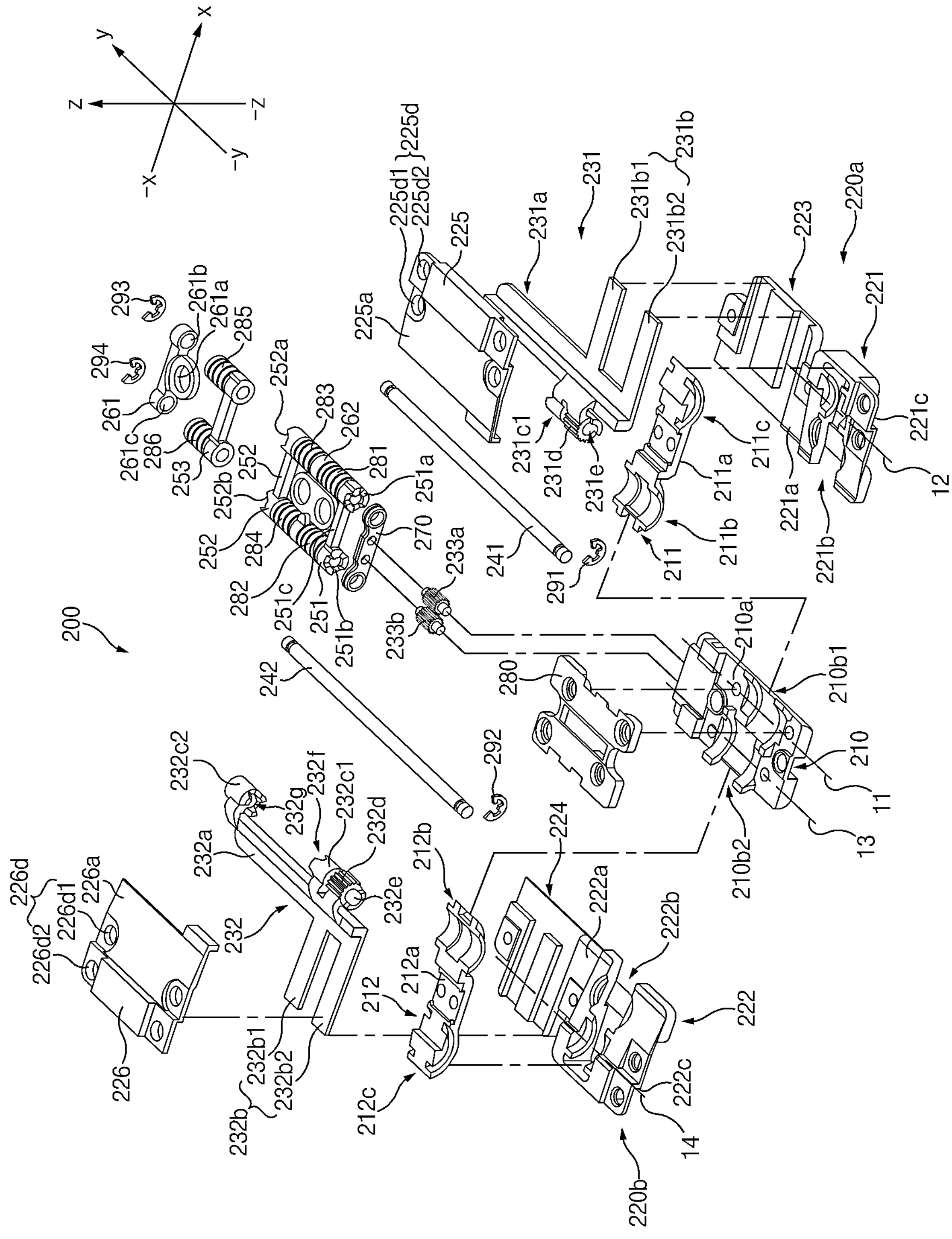
FIG. 5 is an exploded perspective view of a hinge structure according to an embodiment, when viewed in a first direction.
Figure 6:
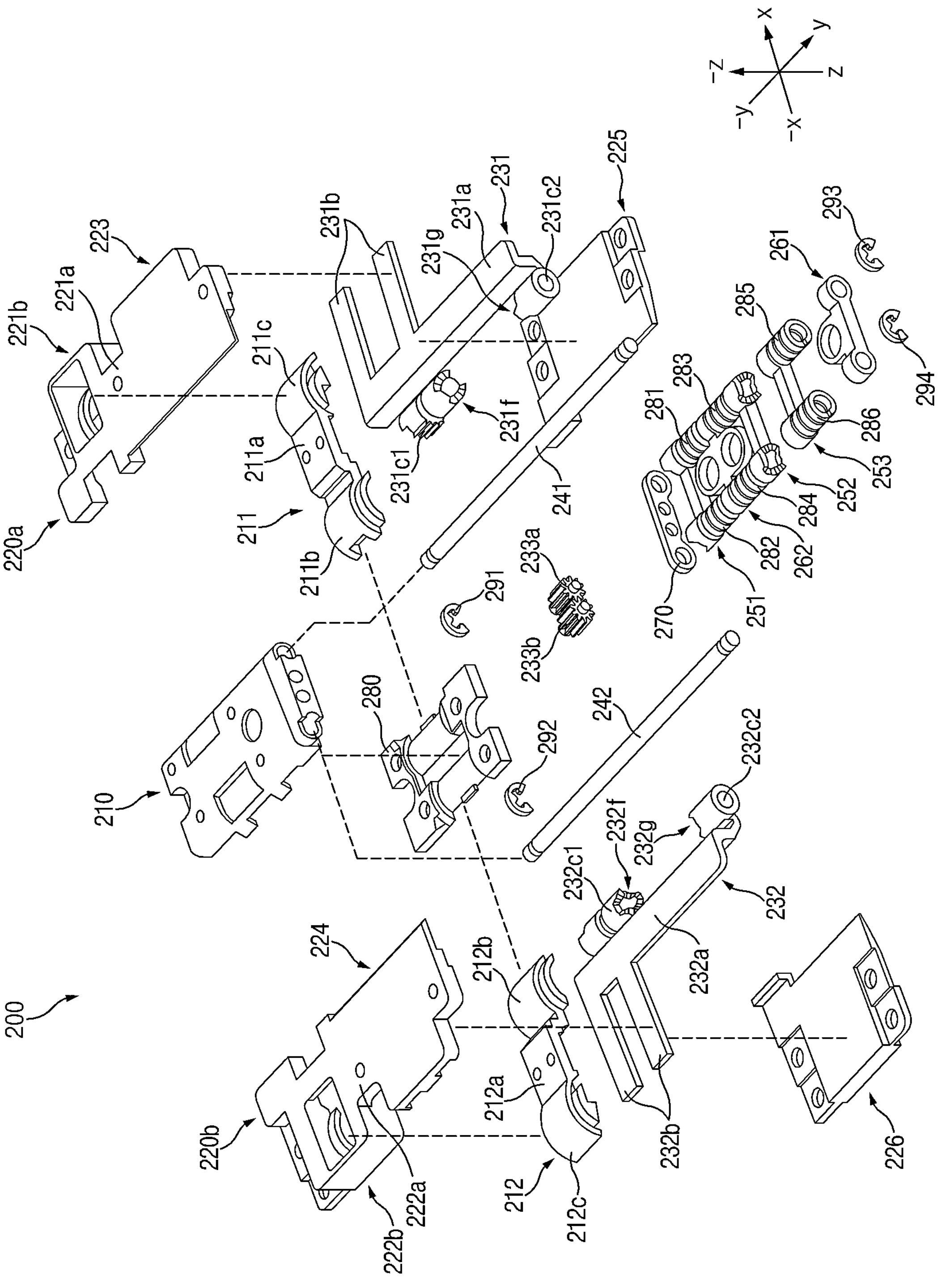
FIG. 6 is an exploded perspective view of a hinge structure according to an embodiment, when viewed in a second direction.
Figure 7B:
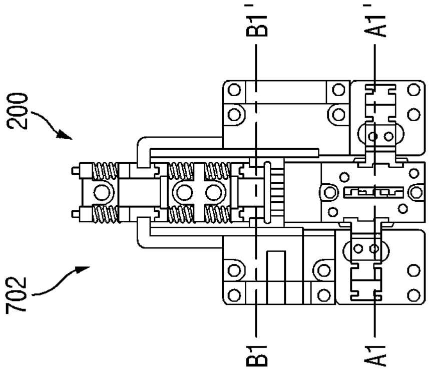
FIGS. 7A-7D are views illustrating an example of formation of axes of an electronic device including a first type hinge structure in an unfolded state of the electronic device according to an embodiment.
Figure 7A:
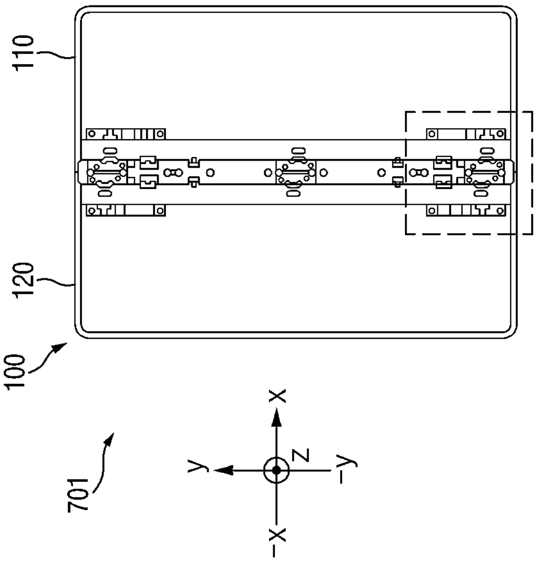
Figure 7C:
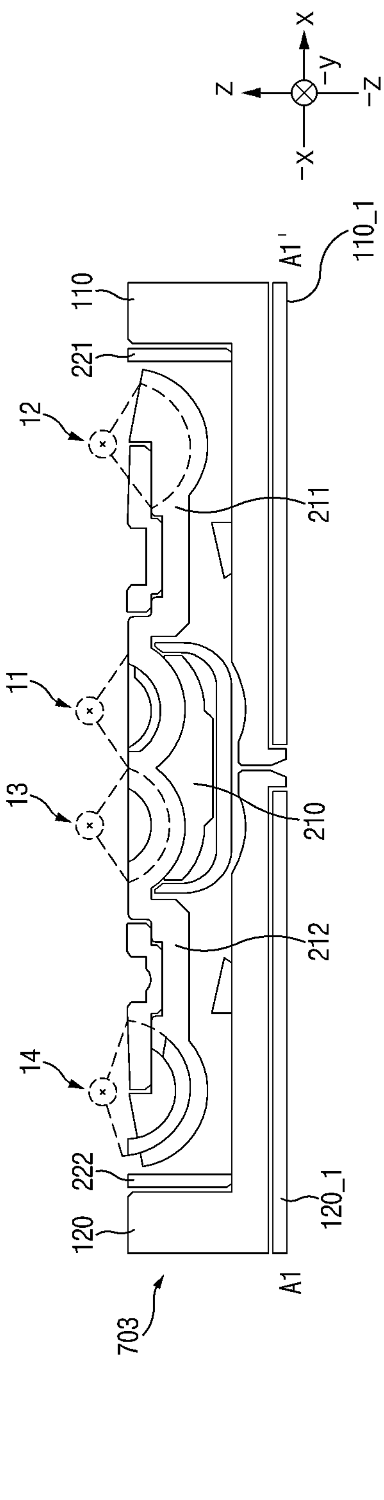
Figure 7D:
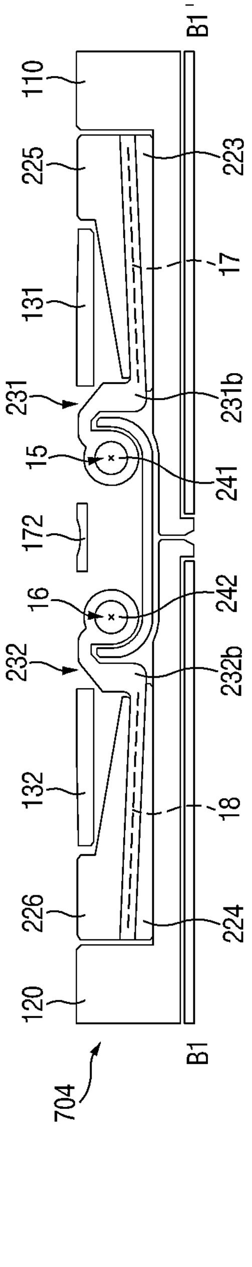
Figure 8A:
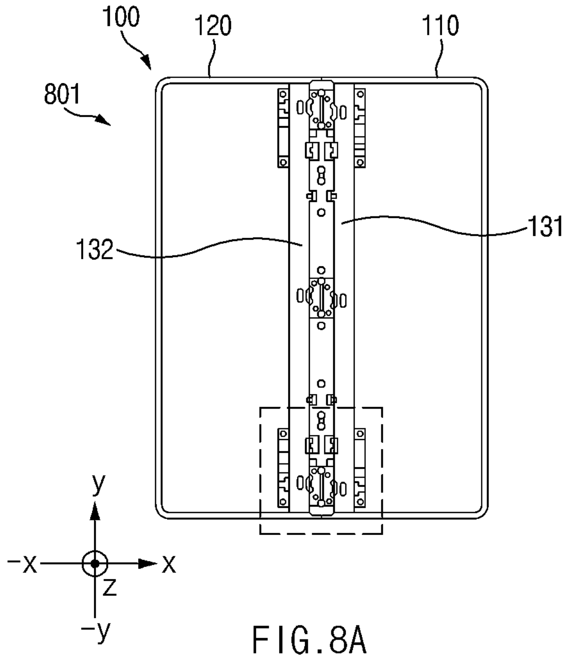
FIGS. 8A-8E are views illustrating an example of formation of axes of an electronic device including a first type hinge structure in a folded state of the electronic device according to an embodiment.
Figure 8B:
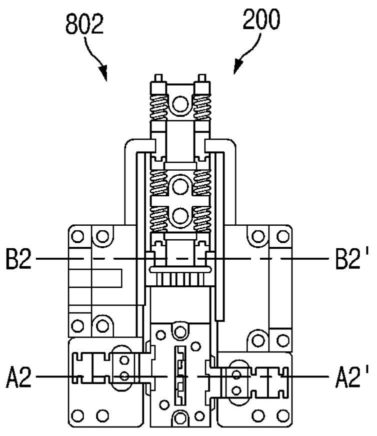
Figure 8C:
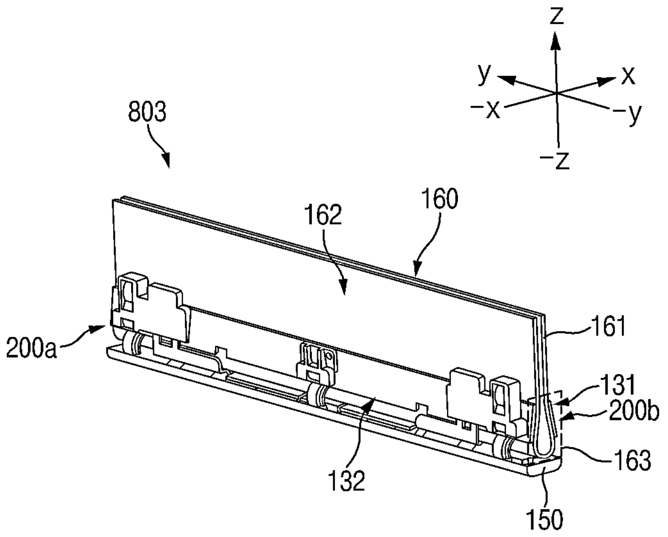
Figures 8D, 8E:
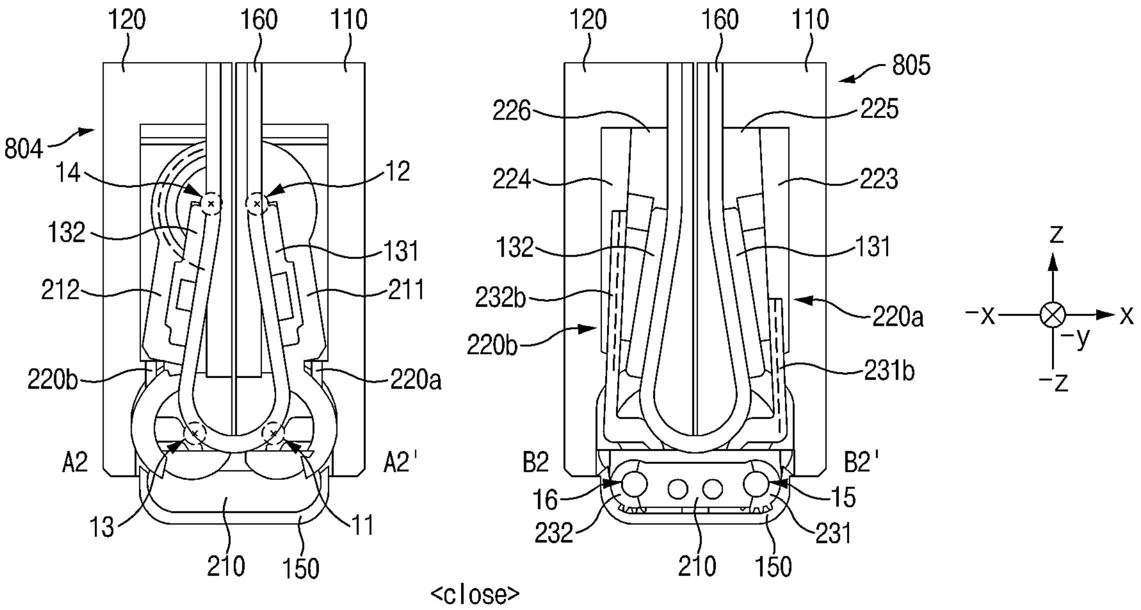

FIG. 4 is a perspective view illustrating an example of the hinge structure according to an embodiment, FIG. 5 is an exploded perspective view of the hinge structure according to an embodiment when observed in the first direction, and FIG. 6 is an exploded perspective view of the hinge structure according to an embodiment when observed in the second direction.

Referring to FIGS. 1 to 6, the first type hinge structure 200 may be at least one of the hinge structures 200*a* and 200*b* previously described in FIG. 1. The first type hinge structure 200 may include a fixing bracket 210 (or a bracket or a center bracket), a first rotation member 211 (or a first rotation structure or a first rotating body), a second rotation member 212 (or a second rotation structure or a second rotating body), a first link member 220*a* (or a first slide link, a first rotation support structure, or a first link rotation member), a second link member 220*b* (or a second slide link, a second rotation support structure, a second link rotation member), a first link cover 225, a second link cover 226, a first arm member 231 (or a first arm structure or a first arm), a second arm member 232 (or a second arm structure or a second arm), a first shaft 241, a second shaft 242, a first cam member 251 (or a first cam or a first cam structure), a second cam member 252 (or a second cam or a second cam structure), a third cam member 253 (or a third cam or a third cam structure), at least one idle gear 233*a* and 233*b*, a shaft fixing part 261, a shaft holder 262, a bracket cover 280, and elastic members 281, 282, 283, 284, 285, and 286. At least one of the first type hinge structures 200 may be omitted. For example, at least one of the shaft fixing part and the shaft holder may be omitted. Furthermore, at least some of the bracket cover 280 and the elastic members may be omitted. The link covers also may be omitted depending on a change in the structure. Gear structures (e.g., the first gear 231*d*, the second gear 232*d*, at least one idle gear 233*a* and 233*b*) which will be described below and a gear bracket 270 also may be omitted in correspondence to removal of the interlocking function.

The fixing bracket 210 may include a bracket body 210*a*, a first rail 210*b*1, and a second rail 210*b*2. The bracket body 210*a* may include at least one hole which is used for coupling with the bracket cover 280 and passes upward and downward (e.g., from the z-axis to –z-axis). On one side (e.g., a side wall which faces the y-axis direction) of the bracket body 210*a*, grooves, in which peripheries (e.g., –y-axis peripheries) of the first shaft 241 and the second shaft 242 may be held, may be formed. Grooves, in which the at least one idle gears 233*a* and 233*b* may be held, may be formed on one side (e.g., a side wall which faces the y-axis direction) of the bracket body 210*a*.

At least a portion of the fixing bracket 210 may be seated on and fixed to one side of the hinge housing 150. For example, the fixing bracket 210 may be fixed to the a –y-axis periphery or a y-axis periphery of the hinge housing 150. The fixing bracket 210 may include a structure (e.g., the first rail 210*b*1 and the second rail 210*b*2) which may be fastened such which a portion (e.g., the first rail structure 211*b* or the first rail structure of the first rotation member) of the first rotation member 211 and a portion (e.g., the third rail structure 212*b* or the first rail structure of the second rotation member) of the second rotation member 212 are rotatable.

The first rail 210*b*1 of the fixing bracket 210 may define an imaginary axis (e.g., a first axis 11, a first imaginary axis or a first fixed axis) which may be rotated in place while the first rail structure 211*b* is rotated. The first rail 210*b*1 may be formed in a structure corresponding to the first rail structure 211*b*. For example, the first rail 210*b*1 may include two arc-shaped or half-moon shaped rails. A portion (e.g., a second rail structure 211*c* or a second rail structure of the first rotation member) of an opposite side of the first rotation member 211 may be rotated or slid in a curved way with respect to a second axis 12 (or a second imaginary axis or a first movement axis) which is different from the first axis 11. The second rail 210*b*2 defines an imaginary axis (e.g., a third axis 13, a third imaginary axis, or a second fixed axis) which may be rotated in place while the second rail structure 211*c* is rotated. A portion (e.g., a fourth rail structure 212*c* or a second rail structure of the second rotation member) of an opposite side of the second rotation member 212 may be rotated or slid in a curved way with respect to a fourth axis 14 (or a fourth imaginary axis or a first movement axis) which is different from the third axis 13.

The first axis 11 and the third axis 13 may be located on the same first xy plane, and the second axis 12 and the fourth axis 14 may be located on a second xy plane which is different from which of the first axis 11 and the third axis 13. Accordingly, a distance (or a shortest distance or a minimum straight line distance) between the first axis 11 and the display 160 may be the same as a distance (or a shortest distance or a minimum straight line distance) between the third axis 13 and the display 160. A distance (or a shortest distance or a minimum straight line distance) between the second axis 12 and the display 160 may be the same as a distance (or a shortest distance or a minimum straight line distance) between the fourth axis 14 and the display 160. According to an embodiment, when the electronic device 100 is in the unfolded state, a distance (or a shortest distance or a minimum straight line distance) between the first axis 11 and the third axis 13, and the rear surface of the display 160 may be different from a distance (or a shortest distance or a minimum straight line distance) between the second axis 12 and the fourth axis 14, and the rear surface of the display 160. Alternatively, when the electronic device 100 is in the unfolded state, a distance (or a shortest distance or a minimum straight line distance between the first axis 11 and the third axis 13), and the rear surface of the display 160 may be shorter than a distance (or a shortest distance or a minimum straight line distance) between the second axis 12 and the fourth axis 14, and the rear surface of the display 160.

The fixing bracket 210 may be formed of a material (e.g., a metallic material or reinforced plastic of a specific strength) having a specific strength to support the movement of the first rotation member 211 and the second rotation member 212 in a hinge operation process (an operation, in which an angle between the first housing 110 and the second housing 120 is changed from 0 degrees to 180 degrees or they are held at a specific angle between 0 degrees and 180 degrees). In the above description, it has been described as an example that the fixing bracket 210 is a structure which is fixed to the hinge housing 150, but the hinge housing 150 may be provided in a shape of the fixing bracket 210.

The first rotation member 211 may include a first rotation body 211*a*, a first rail structure 211*b* disposed in the first direction (e.g., the −x-axis direction) of the first rotation body 211*a*, and a second rail structure 211*c* disposed in the second direction (e.g., the x-axis direction) of the first rotation body 211*a*. Alternatively, the first rotation member 211 may include a portion (e.g., the first rail structure 211*b*) which is fastened to one side (e.g., a first rail 210*b*1) of the fixing bracket 210 and then fastened to enable a hinge operation, and a portion (e.g., the second rail structure 211*c*) which is fastened to one side (e.g., the third rail 221*b* or the first rail of the first link member) of the first link member 220*a*. While the first link member 220*a* coupled to the first housing 110 performs a hinge operation (or counterclockwise or clockwise rotation), the first rail structure 211*b* of the first rotation member 211, which is fastened to the fixing bracket 210 may be rotated in place (e.g., rotated counterclockwise or clockwise), and the second rail structure 211*c* coupled to the first link member 220*a* may be rotated (or slid) in the first link member 220*a* (e.g., the third rail 221*b*) while being moved in one direction (counterclockwise while the electronic device 100 is folded from the unfolded state or clockwise while the electronic device 100 is unfolded from the folded state).

The first rotation body 211*a* may include a structure (e.g., at least one hole which passes upward and downward) which may be coupled to the first wing plate 131. The first rotation member 211 may experience friction with the fixing bracket 210 and the first link member 220*a* while the hinge operation is repeated, and may be formed of a material (e.g., a metallic material) having a specific strength or higher to withstand this. A portion of the first wing plate 131, among the wing plates 131 and 132, may be fixed to the first rotation member 211. At least one of the center plates 171 and 172 may be disposed or fixed on a central portion of the first rotation member 211. For example, the first center plate 171 may be disposed at a center of the first rotation member disposed in the first hinge structure 200*a*, and the second center plate 172 may be disposed at a center of the first rotation member disposed in the second hinge structure 200*b*.

The second rotation member 212 may include a second rotation body 212*a*, a third rail structure 212*b* which is disposed in the second direction (e.g., the −x-axis direction) of the second rotation body 212*a*, and a fourth rail structure 212*c* which is disposed in the first direction (e.g., the x-axis direction) of the second rotation body 212*a*. Alternatively, the second rotation member 212 may include a portion (e.g., the third rail structure 212*b*) which is fastened to an opposite side (e.g., the second rail 210*b*2) of the fixing bracket 210 and then fastened to enable a hinge operation, and a portion (e.g., the fourth rail structure 212*c*) which is coupled to one side (e.g., the fourth rail 222*b* or the first rail of the second link member) of the second link member 220*b*. The second rotation member 212 is rotated (or slid) in the second link member 220*b* (e.g., the fourth rail 222*b*) while the third rail structure 212*b* fastened to the fixing bracket 210 is rotated in place and the fourth rail structure 212*c* coupled to the second link member 220*b* is moved in one direction (e.g., counterclockwise while the electronic device is folded from the unfolded state or clockwise the electronic device 100 is unfolded from the folded state) while the second link member 220*b* coupled to the second housing 120 performs a hinge operation (clockwise or counterclockwise rotation).

The second rotation body 212*a* may include a structure (e.g., at least one hole which passes upward and downward) which may be coupled to the second wing plate 132. Similar to the first rotation member 211, the second rotation member

212 may experience friction with the fixing bracket 210 and the second link member 220*b* while the hinge operation is repeated, and may be formed of a material (e.g., a metallic material) having a specific strength or higher to withstand this. For example, the second rotation member 212 may be formed of the same material as that of the first rotation member 211. A portion of the second wing plate 132, among the wing plates 131 and 132, may be fixed to the second rotation member 212. At least one of the center plates 171 and 172 may be disposed or fixed on a central portion of the second rotation member 212. For example, the first center plate 171 may be disposed at a center of the second rotation member 212 disposed in the first hinge structure 200*a*, and the second center plate 172 may be disposed at a center of the second rotation member 212 disposed in the second hinge structure 200*b*.

The second rotation member 212 may be moved in a direction which is opposite to the first rotation member 211. For example, while the first rail structure 211*b* of the first rotation member 211 is rotated counterclockwise in place, the third rail structure 212*b* of the second rotation member 212 may be rotated clockwise in place. While the second rail structure 211*c* is slid (the sliding is relative, and thus, the third rail 221*b* of the first link member 220*a* is slid clockwise with respect to the second rail structure 211*c*) counterclockwise in the third rail 221*b* of the first link member 220*a* while the second rail structure 211*c* of the first rotation member 211 is rotated counterclockwise, the fourth rail structure 212*c* of the second rotation member 212 may be slid (the sliding motion is relative, and thus, the fourth rail 222*b* of the second link member 220*b* is slid clockwise with respect to the fourth rail structure 212*c*) counterclockwise in the fourth rail 222*b* of the second link member 220*b* while the fourth rail structure 212*c* of the second rotation member 212 is rotated counterclockwise.

The first axis 11 (an imaginary axis which is formed as the first rail structure 211*b* is rotated along the first rail 210*b*1 of the fixing bracket 210) corresponding to a reference, about which the first rail structure 211*b* of the first rotation member 211 is rotated, and the third axis 13 (an imaginary axis which is formed as the third rail structure 212*b* is rotated along the second rail 210*b*2 of the fixing bracket 210) corresponding to a reference, about which the third rail structure 212*b* of the second rotation member 212 is rotated, may be fixed axes, about which the rail structures (the first rail structure 211*b* and the third rail structure 212*b*) are rotated in place. The second axis 12 (an imaginary axis which is formed as the second rail structure 211*c* is slid or rotated in the third rail 221*b* while the first link member 220*a* is moved) corresponding to a reference, about which the second rail structure 211*c* of the first rotation member 211 is rotated, and the fourth axis 14 (an imaginary axis which is formed as the fourth rail structure 212*c* is slid or rotated in the fourth rail 222*b* while the second link member 220*b* is moved) corresponding to a reference, about which the fourth rail structure 212*c* of the second rotation member 212 is rotated, may be movement axes which are formed as the rail structures (the second rail structure 211*c* and the fourth rail structure 212*c*) are moved.

The first link member 220*a* includes a structure (e.g., a first link fixing part 221*c*) which is coupled and fixed to one side of the first housing 110. In this regard, the first link member 220*a* includes a first rail member 221 (e.g., the first rail member 221, to which the third rail 221*b* or the first rail of the first link member 220*a* is fastened), on which a portion (e.g., the second rail structure 211*c*) of the first rotation member 211 is seated. The first link member 220*a* includes a structure (e.g., the first slide holding part 223), on which a portion (e.g., the first slide structure 231*b*: 231*b*1 and 231*b*2) of the first arm member 231 is seated. The first link member 220*a* may be formed to be longer in the y-axis or −y-axis direction than in the x-axis direction to accommodate a structure (e.g., the first rail member 221 including the third rail 221*b*), on which the second rail structure 211*c* is seated, and a structure (e.g., the first slide holding part 223), on which the first slide structure 231*b*: 231*b*1 and 231*b*2 is seated. In this regard, the first link member 220*a* may include a first rail member 221 including a third rail 221*b* (or the first rail of the first link member 220*a*) which is disposed in one direction (e.g., the −y-axis direction) of the first link body 221*a* fixed to the first housing 110, and a first slide holding part 223 which is disposed in an opposite direction (e.g., the y-axis direction) of the first link body 221*a*. Additionally or alternatively, a structure (e.g., a through-hole) which is used for coupling with the first link cover 225 may be formed adjacent to the first slide holding part 223. A fastening member (e.g., a screw or a bolt) may be inserted into the through-hole aligned with the first link cover 225, and the fastening member may be disposed such that the first link cover 225 and the first slide holding part 223 are fastened to the first housing 110. As another example, the first link cover 225 may be coupled to at least a portion of the first wing plate 131.

The first link member 220*a* may move (rotate counterclockwise or clockwise) the first rotation member 211 and the first arm member 231 while the coupled first housing 110 is rotated in one direction (e.g., counterclockwise or clockwise). In this regard, positions of the axis (e.g., the second axis 12) related to the third rail 221*b* and the first slide holding part 223 may be changed (e.g., moved counterclockwise or clockwise) in correspondence to the movement of the first housing 110. When the electronic device 100 is in the unfolded state, the second axis 12 may be formed over an upper surface of the fixing bracket 210 with respect to the upper surface (e.g., a surface which faces the z-axis) of the fixing bracket 210. The first slide holding part 223 may vary depending on the number of slides formed on the first arm member 231. For example, in the illustrated drawing, it is illustrated that the first slide holding part 223 has a structure, in which two rail grooves (or at least one rail groove) formed along the x-axis are disposed adjacent to each other, but the first slide holding part 223 may include one rail groove when one slide is provided in the first arm member 231. The at least one rail groove may be formed along an extension direction (or a prolongation direction or a protrusion direction) of the first slide structure 231*b* (or formed in parallel to the extension direction). While the electronic device 100 is changed from the unfolded state to the folded state (or while changed from the folded state to the unfolded state), the first slide structure 231*b* seated on the first slide holding part 223 may be linearly moved in a first direction (e.g., a direction from the −x-axis to the x-axis, or an outward direction from the center of the hinge structure, or a direction collected in the direction, in which the display 160 is folded) along the at least one rail groove.

The first link cover 225 may be disposed to cover the first slide holding part 223. In this regard, the first link cover 225 may include a first cover body 225*a*, and coupling holes 225*d* which are formed on one side of the first cover body 225*a*. The first cover body 225*a* may be disposed to cover the first slide holding part 223 after the first slide structure 231*b* of the first arm member 231 is seated on the first slide holding part 223, and may be disposed such that the first slide structure 231*b* may be moved (or slid) in one direction (e.g., the x-axis direction or the −x-axis direction) in the first slide holding part 223. In this regard, one surface (e.g., a surface which faces the −z-axis) of the first cover body 225*a*, which covers the first slide holding part 223, may be formed flat. The coupling holes 225*d* may include at least one hole 225*d*1 which is used to couple the first link cover 225 to the first slide holding part 223, and at least one hole 225*d*2 which is used to couple the first link cover 225 to the first housing 110. The hole 225*d*1 used to couple the first link cover 225 and the first slide holding part 223 and the hole 225*d*2 used to couple the first slide holding part 223 to the first housing 110 may be disposed in a stepped structure. As another example, the second link cover 226 may be coupled to the second wing plate 132.

The second link member 220*b* includes a structure (e.g., a second link fixing part 222*c*) which is coupled and fixed to one side of the second housing 120. The second link member 220*b* includes a structure (e.g., the fourth rail 222*b* or the second rail member 222 including the first rail of the second link member 220*b*), on which a portion (e.g., the fourth rail structure 212*c*) of the second rotation member 212 is seated. The second link member 220*b* includes a structure (e.g., the second slide holding part 224 or the second rail of the second link member 220*b*), on which a portion (e.g., the second slide structure 232*b*: 232*b*1 and 232*b*2) of the second arm member 232 is seated. The second link member 220*a* may be formed to be longer in the y-axis or −y-axis direction than in the x-axis direction to accommodate a structure (e.g., the second rail member 222 including the fourth rail 222*b*), on which the fourth rail structure 212*c* is seated, and a structure (e.g., the second slide holding part 224), on which the second slide structure 232*b*: 232*b*1 and 232*b*2 is seated. In this regard, the second link member 220*b* may include a second link body 222*a* which is fixed to the second housing 120, a second rail member 222 including a fourth rail 222*b* (or the second rail of the second link member 220*b*) which is formed on one side (e.g., the −y-axis direction) of the second link body 222*a*, and a second slide holding part 224 (or the second rail of the second link member 220*b*) which is disposed on an opposite side (e.g., the y-axis direction) of the second link body 222*a*.

The second link member 220*b* moves (rotates clockwise or counterclockwise) the second rotation member 212 and the second arm member 232 while the coupled second housing 120 is rotated in one direction (e.g., clockwise or counterclockwise). In this regard, a position of an axis (e.g., the fourth axis 14) related to the fourth rail 222*b* may be changed (e.g. moved counterclockwise or clockwise) in correspondence to movement of the second housing 120. When the electronic device 100 is in the unfolded state, the fourth axis 14 may be formed over an upper surface (e.g., a surface which faces the z-axis) of the fixing bracket 210 with respect to the upper surface of the fixing bracket 210. When the electronic device 100 is in the folded state, the fourth axis 14 may be located inside the housings 110 and 120 of the electronic device 100 in the folded state. Additionally or alternatively, a structure (e.g., a through-hole) which is used for coupling with the second link cover 226 may be formed adjacent to the second slide holding part 224. A fastening member (e.g., a screw or a bolt) may be inserted into the through-hole aligned with the second link cover 226, and the fastening member may be disposed such that the second link cover 226 and the second slide holding part 224 are fastened to the second housing 120. The second slide holding part 224 may include at least one rail groove. The at least one rail groove formed in the second slide holding part 224 may be formed along an extension direction (or a prolongation direction or a protrusion direction) of the second slide structure 232*b* (or formed in parallel to the extension direction). While the electronic device 100 is changed from the unfolded state to the folded state (or while changed from the folded state to the unfolded state), the second slide structure 232*b* seated on the second slide holding part 224 may be linearly moved in a second direction (e.g., a direction from the x-axis to the −x-axis, or an outward direction from the center of the hinge structure, or a direction collected in the direction, in which the display 160 is folded) along the at least one rail groove.

The second link member 220*b* may move (rotate clockwise or counterclockwise) the second rotation member 212 and the second arm member 232 while the coupled second housing 120 is rotated in one direction (e.g., clockwise or counterclockwise). In this regard, a position of the axis (e.g., the fourth axis 14) related to the fourth rail 222*b* and the second slide holding part 224 may be changed (e.g., moved clockwise or counterclockwise) in correspondence to the movement of the second housing 120. When the electronic device 100 is in the unfolded state, the fourth axis 14 may be formed over an upper surface of the fixing bracket 210 with respect to the upper surface (e.g., a surface which faces the z-axis) of the fixing bracket 210. The second slide holding part 224 may vary depending on the number of slides formed on the second arm member 232. For example, in the illustrated drawing, it is illustrated that the second slide holding part 224 has a structure, in which two rail grooves formed along the −x-axis are disposed adjacent to each other, but the second slide holding part 224 may include one rail groove when one slide is provided in the second arm member 232. Alternatively, the second slide holding part 224 (or the first slide holding part 223) may be configured to include three or more rail grooves.

The second link cover 226 may be disposed to cover the second slide holding part 224. In this regard, the second link cover 226 may include a second cover body 226*a*, and coupling holes 226*d*1 and 226*d*2 which are formed on one side of the second cover body 226*a*. The second cover body 226*a* may be disposed to cover the second slide holding part 224 after the second slide structure 232*b* of the second arm member 232 is seated on the second slide holding part 224, and may be disposed such that the second slide structure 232*b* may be moved (or slid) in one direction (e.g., the −x-axis direction or the x-axis direction) in the second slide holding part 224. In this regard, one surface (e.g., a surface which faces the −z-axis) of the second cover body 226*a*, which covers the second slide holding part 224, may be formed flat. The coupling holes 226*d*1 and 226*d*2 may include at least one hole 226*d*1 which is used to couple the second link cover 226 to the second slide holding part 224, and at least one hole 226*d*2 which is used to couple the second link cover 226 to the second housing 120. The hole 226*d*1 used to couple the second link cover 226 and the second slide holding part 224 and the hole 226*d*2 used to couple the second slide holding part 224 to the second housing 120 may be disposed in a stepped structure.

The first arm member 231 may include a structure (e.g., the first slide structure 231*b*: 231*b*1 and 231*b*2 or the rail structure of the first arm member 231) which is fastened to the first link member 220*a* coupled to the first housing 110. The first slide structure 231*b*: 231*b*1 and 231*b*2 may be linearly moved (e.g., slid) along the −x-axis or x-axis in the first slide holding part 223 formed in the first link member 220*a*. The first arm member 231 may include a first arm body 231*a*, and a first shaft holding part 231*c*1 (or the first shaft holding part of the first arm member 231) and a second shaft holding part 231*c*2 (or the second shaft holding part of the first arm member 231) which extend in the −x-axis direction from the first arm body 231*a* and may be fastened to the first shaft 241. The first shaft holding part 231*c*1 and the second shaft holding part 231*c*2 may be disposed to be spaced apart from each other in the y-axis direction. A first gear 231*d* may be disposed on one side of the first shaft holding part 231*c*1. A hole which passes in the y-axis or −y-axis direction may be formed in the first shaft holding part 231*c*1 and the second shaft holding part 231*c*2 so that the first shaft 241 may be held therein. The first shaft holding part 231*c*1 may include a first cam structure 231*f* which is engaged with a cam member (e.g., one side cam of the first cam member 251). The second shaft holding part 231*c*2 may include a second cam structure 231*g* which is engaged with a cam member (e.g., one side cam of the second cam member 252). A first stopper 231*e* which limits a rotation angle of the first arm member 231 may be disposed on a side wall of the first shaft holding part 231*c*1 in the −y-axis direction. Accordingly, the first cam structure 231*f* may be disposed on a side wall of the first shaft holding part 231*c*1 in the y-axis direction. In the illustrated drawing, it is illustrated that the second shaft holding part 231*c*2 has a structure, in which the second cam structure 231*g* is disposed on a side surface thereof in the −y-axis direction, but the disclosure is not limited thereto. For example, a cam structure may be disposed on a side wall of the second shaft holding part 231*c*2 in the y-axis direction. The first arm member 231 may be rotated counterclockwise and clockwise about a real axis of the first shaft 241.

The second arm member 232 includes a structure (e.g., the second slide structure 232*b*: 232*b*1 and 232*b*2 or the slide structure of the second arm member 232) which is fastened to the second link member 220*b* coupled to the second housing 120. The second slide structure 232*b*: 232*b*1 and 232*b*2 may be linearly moved (e.g., slid) along the −x-axis or x-axis in the second slide holding part 224 formed in the second link member 220*b*. The second arm member 232 may include a second arm body 232*a*, and a third shaft holding part 232*c*1 (or the first shaft holding part of the second arm member 232) and a fourth shaft holding part 232*c*2 (or the second shaft holding part of the second arm member 232) which extend in the x-axis direction from the second arm body 232*a* and may be fastened to the second shaft 242. The third shaft holding part 232*c*1 and the fourth shaft holding part 232*c*2 may be disposed to be spaced apart from each other in the y-axis direction. The third shaft holding part 232*c*1 and the fourth shaft holding part 232*c*2 may be spaced apart from each other by a spacing distance which is the same as a spacing distance between the first shaft holding part 231*c*1 and the second shaft holding part 231*c*2. A second gear 232*d* may be disposed on one side of the third shaft holding part 232*c*1. A hole which passes in the y-axis or −y-axis direction may be formed in the third shaft holding part 232*c*1 and the fourth shaft holding part 232*c*2 so that the second shaft 242 may be held therein. The third shaft holding part 232*c*1 may include a third cam structure 232*f* which is engaged with a cam member (e.g., an opposite side cam of the first cam member). The fourth shaft holding part 232*c*2 may include a fourth cam structure 232*g* which is engaged with a cam member (e.g., an opposite side cam of the second cam member 252. A second stopper 232*e* which limits a rotation angle of the second arm member 232 may be disposed on a side wall of the third shaft holding part 232*c*1 in the −y-axis direction. The third cam structure 232*f* may be disposed on a side wall of the third shaft holding part 232*c*1 in the y-axis direction. In the drawing, it is illustrated that the fourth shaft holding part 232*c*2 has a structure, in which the fourth cam structure 232*g* is disposed on a side surface thereof in the −y-axis direction, but the disclosure is not limited thereto. For example, a cam structure may be disposed on a side wall of the fourth shaft holding part 232*c*2 in the y-axis direction. The second arm member 232 may be rotated counterclockwise and clockwise about a real axis of the second shaft 242.

The first cam member 251 may include a first cam 251*a* which is engaged with the first cam structure 231*f* of the first arm member 231, a second cam 251*b* which is engaged with the third cam structure 232*f* of the second arm member 232, and a support member 251*c* which connects the first cam 251*a* and the second cam 251*b*. A through-hole, through which the first shaft 241 may pass, may be formed at a center of the first cam 251*a*, and a through-hole, through which the second shaft 242 may pass, may be formed at a center of the second cam 251*b*. A first elastic member 281 and a second elastic member 282 may be disposed on a rear surface of the first cam member 251 to provide an elastic force which pushes the first cam member 251 toward the first cam structure 231*f* and the third cam structure 232*f*.

The second cam member 251 may include a third cam 252*a* which is engaged with the second cam structure 231*g* of the first arm member 231, a fourth cam 252*b* which is engaged with the fourth cam structure 232*g* of the second arm member 232, and a support member 251*c* which connects the third cam 252*a* and the fourth cam 252*b*. A through-hole, through which the first shaft 241 may pass, may be formed at a center of the third cam 252*a*, and a through-hole, through which the second shaft 242 may pass, may be formed at a center of the fourth cam 252*b*. A third elastic member 283 and a fourth elastic member 284 may be disposed on a rear surface of the second cam member 252 to provide an elastic force which pushes the second cam member 252 toward the second cam structure 231*g* and the fourth cam structure 232*g*.

The third cam member 253 may include a first part which faces a side wall of the second shaft holding part 231*c*2 of the first arm member 231 in the y-axis direction, a second part which faces a side wall of the fourth shaft holding part 232*c*2 of the second arm member 232 in the y-axis direction, and a support part which connects the first part and the second part. In the drawing, a structure, in which separate mountains and valleys are not formed in the third cam member 253, is illustrated, and correspondingly, a structure, in which separate mountains and valleys are not formed on a side wall of the second shaft holding part 231*c*2 in the y-axis direction and a side wall of the fourth shaft holding part 232*c*2 in the y-axis direction either, is illustrated, but the disclosure is not limited thereto. For example, cams having mountains and valleys may be disposed on side walls of the first part and the second part of the third cam member 253 in the −y-axis direction, and correspondingly, cam structures having mountains and valleys corresponding to the first part and the second part of the third cam member 253 may be disposed on side walls of the second shaft holding part 231*c*2 and the fourth shaft holding part 232*c*2 in the y-axis direction. Additionally, a fifth elastic member 285 and a sixth elastic member 286 may be disposed of the third cam member 253 in the y-axis direction to provide an elastic force which pushes the third cam member 253 in the −y-axis direction. Meanwhile, in the above description, it is illustrated that the electronic device 100 has a structure including the first to third cam members 251, 252, and 253, but the disclosure is not limited thereto. For example, in the electronic device 100 of the disclosure, at least one of the first to third cam members 251, 252, and 253 may be omitted.

The shaft fixing part 261 may be disposed at one periphery (e.g., a y-axis periphery) of the hinge structure 200. The shaft fixing part 261 may include a fixing structure 261*a* (e.g., a through-hole in the z-axis direction) which may fix the hinge structure 200 to the hinge housing 150. Furthermore, the shaft fixing part 261 may include shaft holding holes 261*b* and 261*c*, into which the first shaft 241 and the second shaft 242 disposed in the y-axis direction may be inserted. Sizes of the shaft holding holes 261*b* and 261*c* of the shaft fixing part 261 may be greater than those of the first shaft 241 and the second shaft 242. The first shaft 241 may be inserted into and disposed in the first shaft holding hole 261*b*, and the second shaft 242 may be inserted into and disposed in the second shaft holding hole 261*c*.

The shaft holder 262 may be disposed between the first cam member 251 and the second cam member 252. The shaft holder 262 may include at least one coupling hole, and shaft holding holes which may support the coupling holes. It is illustrated that the shaft holder 262 has two coupling holes which pass in the z-axis direction, but the disclosure is not limited thereto, and the number thereof may be one or three or more. The shaft holding holes disposed in the shaft holder 262 may have a structure which is substantially the same as or similar to those of the shaft holding holes 261*b* and 261*c* previously described in the shaft fixing part 261, and at least portions of the first shaft 241 and the second shaft 242 may pass therethrough and be held therein. The shaft holding holes formed in the shaft holder 262 may serve to support the first to fourth elastic members 281, 282, 283, 284, 285, and 286.

The gear bracket 270 may be disposed between the first cam member 251 and at least one idle gear 233*a* and 233*b*. For example, the gear bracket 270 may include holes, through which the first shaft 241 and the second shaft 242 may pass to be held, and holding holes, through which one side of at least one idle gear 233*a* and 233*b* is held.

The first gear 231*d* may be disposed in a gear pattern on one side of the first shaft holding part 231*c*1 of the first arm member 231. For example, the first gear 231*d* may be gear-coupled to the first idle gear 233*a*. The second gear 232*d* may be disposed in a gear pattern on one side of the third shaft holding part 232*c*1 of the second arm member 232. The second gear 232*d* may be gear-coupled to the second idle gear 233*b*. The first idle gear 233*a* and the second idle gear 233*b* may be gear-coupled to each other. As the above-described first gear 231*d*, first idle gear 233*a*, second idle gear 233*b*, and second gear 232*d* are gear-connected to each other, the first arm member 231 and the second arm member 232 may interlock with each other.

The bracket cover 280 may be disposed to cover an upper side of the fixing bracket 210. The bracket cover 280 may prevent the first rotation member 211 and the second rotation member 212 coupled to the fixing bracket 210 from being separated from the fixing bracket 210 during a hinge operation. In this regard, the bracket cover 280 may include a cover part which is configured to cover at least an upper portion of the fixing bracket 210, and at least one coupling hole which is used to couple the bracket cover 280 to the hinge housing 150.

At least one coupling member 291, 292, 293, and 294 may include a first coupling member 291 which passes the gear bracket 270 and fixes a −y-axis periphery of the first shaft 241 disposed to pass through a y-axis periphery of the fixing bracket 210, and a second coupling member 292 which passes through the gear bracket 270 and fixes a −y-axis periphery of the second shaft 242 disposed to pass one side of a y-axis periphery of the fixing bracket 210. Furthermore, the at least one coupling member 291, 292, 293, and 294 may include a third coupling member 293 for fixing one side of the first shaft 241 which protrudes in the y-axis direction via the first shaft holding hole 261*b*, and a fourth coupling member 294 for fixing one side of the second shaft 242 which protrudes in the y-axis direction via the second shaft holding hole 261*c*. The at least one coupling members 291, 292, 293, and 294 described above, for example, may include a form of an E-ring.

FIGS. 7A-7D are views illustrating an example of formation of axes of an electronic device including the first type hinge structure in the unfolded state of the electronic device according to an embodiment. In FIGS. 7A-7D, view 701 is a plan view illustrating an example of a front surface of a housing, on which the display is disposed when the electronic device including the first type hinge structure is in the unfolded state, and view 702 is an enlarged plan view illustrating an example of the first type hinge structure indicated at the dotted line box in view 701, view 703 illustrates an example of cross-section A1-A1' of the first type hinge structure when the electronic device including the first type hinge structure is in the unfolded state, and view 704 illustrates an example of cross-section B1-B1' of the first type hinge structure when the electronic device including the first type hinge structure is in the unfolded state.

Prior to a description, a relationship of formations of the axes of the electronic device described in FIGS. 7A-7D is illustrated when the electronic device 100 is in the unfolded (open) state, and may be equally applied to the structure of the electronic device previously described in FIGS. 1 to 6. In the illustrated drawing, cutting surface A1-A1' illustrates an example of a cross-section which is obtained cutting positions, in which the rotation members 211 and 212 are disposed in the hinge structure 200, and cutting surface B1-B1' illustrates an example of a cross-section which is obtained by cutting positions, in which the slide structures 231*b* and 232*b* are disposed in the hinge structure 200.

Referring to FIGS. 1 to 7D, the electronic device 100 may be disposed in the unfolded (open) state. When cutting line A1-A1' is viewed when the electronic device 100 is in the unfolded (open) state, one surface (e.g., a surface, on which the first area 161 of the display 160 is seated) of the first housing 110 and one surface (e.g., a surface, on which the second area 162 of the display 160 is seated) of the second housing 120 may be disposed to face the z-axis direction in the same way. Here the one surfaces may be coplanar with each other. A rear surface (e.g., a surface observed from the −z-axis) of the hinge housing 150 may be covered by the first housing 110 and the second housing 120. In the illustrated drawing, it is illustrated that rear covers 110_1 and 120_1 are disposed on a rear surface of the first housing 110 and a rear surface of the second housing 120, respectively. However, the disclosure is not limited thereto, and the rear covers 110_1 and 120_1 may be omitted, or the rear covers 110_1 and 120_1 may be integrally formed with the housings 110 and 120, respectively.

The first rail structure 211*b* of the first rotation member 211 may be fastened to one side (e.g., the first rail 210*b*1) of the fixing bracket 210, and the third rail structure 212*b* of the second rotation member 212 may be fastened to an opposite side (e.g., the second rail 210*b*2) thereof. The first rail 210*b*1 and the second rail 210*b*2 of the fixing bracket 210 may be disposed such that at least portions thereof overlap each other when viewed in the x-axis direction from a point on the y-axis. Accordingly, when cross-section A1-A1' is viewed in the −y-axis direction, one periphery (e.g., a −x-axis periphery) of the first rail structure 211*b* and one periphery (e.g., an x-axis periphery) of the third rail structure 212*b* may be disposed to partially overlap each other. The first rail structure 211*b* may be rotated about the first axis 11 (or a first imaginary axis) while being rotated counterclockwise or clockwise in the first rail 210*b*1. Here, the first axis 11 is fixed rotation axis regardless of a change in the folded state or unfolded (open) state of the electronic device 100, and thus, may become the first fixing axis of the fixing bracket 210.

The second rail structure 211*c* of the first rotation member 211 may be rotated (or slid) with respect to the second axis 12 (or the second imaginary axis) in the third rail 221*b* of the first link member 220*a*. Then, the second rail structure 211*c* and the third rail 221*b* may be rotated counterclockwise while the first link member 220*a* is rotated (e.g., while the electronic device 100 is changed from the unfolded (open) state to the folded state, and may be moved counterclockwise or clockwise in correspondence to the clockwise direction while the electronic device 100 is changed from the folded state to the unfolded (open) state. Accordingly, the second axis 12 may be a movement rotation axis which is moved counterclockwise or clockwise as the first link member 220*a* is moved.

Similarly, the third rail structure 212*b* of the second rotation member 212 may be rotated about the third axis 13 (or the third imaginary axis) while being rotated clockwise or counterclockwise in the second rail 210*b*2. Here, the third axis 13 is fixed regardless of a change in the folded state or unfolded (open) state of the electronic device 100, and thus may become a second fixing axis of the fixing bracket 210.

The fourth rail structure 212*c* of the second rotation member 212 may be rotated (or slid) with respect to the fourth axis 14 (or the fourth imaginary axis) in the fourth rail 222*b* of the second link member 220*b*. Then, the fourth rail structure 212*c* and the fourth rail 222*b* may be rotated clockwise while the second link member 220*b* is rotated (e.g., while the electronic device 100 is changed from the unfolded (open) state to the folded state, and may be moved clockwise or counterclockwise in correspondence to the counterclockwise direction while the electronic device 100 is changed from the folded state to the unfolded (open) state. Accordingly, the fourth axis 14 may be a movement axis which is moved counterclockwise or clockwise as the second link member 220*b* is moved.

The first axis 11 and the third axis 13 may be located together on a first xy plane, and the second axis 12 and the fourth axis 14 are located together on a second xy plane which is different from the first xy plane. Accordingly, when viewed based on the z-axis, the first axis 11 and the third axis 13 may be formed in positions which is different from the second axis 12 and the fourth axis 14. A distance (or a shortest distance or a minimum straight line distance) between the first axis 11 and the third axis 13 may be formed to be smaller than a distance (or a shortest distance or a minimum straight line distance) between the first axis 11 and the second axis 12.

When cutting surface B1-B1' is viewed, the first shaft 241 fixed to one side (e.g., an x-axis periphery of the side wall in the y-axis direction) of the fixing bracket 210 may be fastened to the first arm member 231, and the second shaft 242 fixed to an opposite side (e.g., a −x-axis periphery of the side wall in the y-axis direction) of the fixing bracket 210 may be fastened to the second arm member 232. The first slide structure 231*b* of the first arm member 231 may be seated on the first slide holding part 223, and a z-axis direction thereof may be covered by the first link cover 225. The second slide structure 232*b* of the second arm member 232 may be seated on the second slide holding part 224, and a z-axis direction thereof may be covered by the second link cover 226. A portion of the first shaft 241 may be disposed on one side (e.g., a through-hole of the first shaft holding part 231*c*1) of the first arm member 231, and a portion of the second shaft 242 may be disposed on one side (e.g., a through-hole of the second shaft holding part 231*c*2) of the second arm member 232. Here, the first shaft 241 may serve as a fifth axis 15 (or a first real axis), about which the first arm member 231 is rotated, and the second shaft 242 may serve as a sixth axis 16 (or a second actual axis), about which the second arm member 232 is rotated.

A shortest distance from the fifth axis 15 and the sixth axis 16 to the rear surface of the display 160 may be formed to be greater than a shortest distance from the first axis 11 and the third axis 13 to the rear surface of the display 160. A shortest distance from the fifth axis 15 and the sixth axis 16 to the rear surface of the display 160 may be formed to be greater than a shortest distance from the second axis 12 and the fourth axis 14 of the display 160 to the rear surface of the display 160. For example, when the electronic device 100 is in the unfolded state, the shortest distance between the fifth axis 15 and the sixth axis 16 may be different from the shortest distance between the first axis 11 and the third axis 13. For example, when the electronic device 100 is in the unfolded state, the shortest distance between the fifth axis 15 and the sixth axis 16 may be greater than the shortest distance between the first axis 11 and the third axis 13.

While the first arm member 231 is rotated counterclockwise or clockwise, the first slide structure 231*b* may be linearly moved in the first slide holding part 223. That is, these elements may be moveable together with each other. As an example, while the electronic device 100 is changed from the unfolded (open) state to the folded state, the first arm member 231 may be rotated counterclockwise, and an interval between one end of the first slide structure 231*b* and one end of the first slide holding part 223 may be changed. For example, while the electronic device 100 is changed from the unfolded (open) state to the folded state, an interval between one end of the first slide structure 231*b* and one end of the first slide holding part 223 increases to a specific angle (e.g., an angle which is greater than 0 degrees and less than about 45 degrees) and then decreases to a specific angle (e.g., an angle which is greater than about 45 degrees and less than about 90 degrees) so that the interval between the ends (e.g., one end of the first slide structure 231*b* and one end of the first slide holding part 223) in the unfolded (open) state (e.g., 0 degrees or about 180 degrees) and the folded state (e.g., about 90 degrees) may be formed to be the same.

Similarly, while the second arm member 232 is rotated clockwise or counterclockwise, the second slide structure 232*b* may be linearly moved in the second slide holding part 224. As an example, while the electronic device 100 is changed from the unfolded (open) state to the folded state, the second arm member 232 may be rotated clockwise, and an interval between one end of the second slide structure 232*b* and one end of the second slide holding part 224 may be changed. For example, while the electronic device 100 is changed from the unfolded (open) state to the folded state, a distance between the ends increases until a certain angle (e.g., 45 degrees) in a state, in which there is no initial interval between one end of the second slide structure 232*b* and one end of the second slide holding part 224, and the distance between the ends becomes smaller after a specific angle (e.g., 45 degrees) so that there may become no gap between the ends in the folded state.

Meanwhile, the first wing plate 131 may be disposed on the first link cover 225, and the second wing plate 132 may be disposed on the second link cover 226. The second center plate 172 (or the first center plate 171) may be disposed at a central portion (e.g., a central area, in which the link covers 225 and 226 do not overlap each other) of the hinge structure 200.

FIGS. 8A-8E is a view illustrating an example of formation of axes of an electronic device including the first type hinge structure in the folded state of the electronic device according to an embodiment. In FIGS. 8A-8E, view 801 is a plan view illustrating an example of a front surface of a housing, on which the display is disposed when the electronic device including the first type hinge structure is in the unfolded state, view 802 is an enlarged plan view illustrating an example of the first type hinge structure indicated at the dotted line box in view 801, view 803 is a perspective view illustrating an example of a disposition state of the first type hinge structure, the hinge housing, and the display when the electronic device is in the folded state, view 804 illustrates an example of cross-section A2-A2' of the first type hinge structure when the electronic device is in the folded state, and view 805 is a view illustrating an example of cross-section B2-B2' of the first type hinge structure when the electronic device is in the folded state.

Prior to a description, a relationship of formations of the axes of the electronic device described in FIGS. 8A-8E are views illustrating when the electronic device 100 is in the folded (closed) state, and may be equally applied to the structure of the electronic device previously described in FIGS. 1 to 6. Meanwhile, in the illustrated drawing, that is, in the drawing illustrating only the electronic device 100 and the hinge structure, the unfolded state is illustrated, but this is to facilitate confirmation of the disposition of the cutting lines, and the cutting surfaces illustrates that cutting lines A2-A2' and B2-B2' are applied to the electronic device in the folded (closed) state. In the illustrated drawing, for example, cutting surface A2-A2' illustrates an example of a cross-section which is obtained cutting positions, in which the rotation members 211 and 212 are disposed in the hinge structure 200, and cutting surface B2-B2' illustrates an example of a cross-section which is obtained by cutting positions, in which the slide structures 231*b* and 232*b* are disposed in the hinge structure 200.

Referring to FIGS. 1 to 8E, the electronic device 100 may be disposed in the folded (closed) state. When cutting line A2-A2' is viewed when the electronic device 100 is in the folded (closed) state, one surface (e.g., a surface, on which the first area 161 of the display 160 is seated) of the first housing 110 and one surface (e.g., a surface, on which the second area 162 of the display 160 is seated) of the second housing 120 may be disposed to face each other. A convex portion of the third area 163 (or a folding area) disposed between the first area 161 and the second area 162 of the display 160 may be disposed to face the −z-axis direction. Here, the foldable electronic device which is folded includes respective ends (e.g., the lower ends) of the first slide holding part 223 and the second slide holding part 224 which are closest to the fixing bracket 210 together with the third area 163 of the display 160 being closer to the fixing bracket 210 than each of the respective ends.

As the first housing 110 and the second housing 120 are disposed in a 11 shape, at least portions of the first link member 220*a* coupled to the first housing 110 and the second link member 220*b* coupled to the second housing 120 may be disposed in parallel in the z-axis direction. The second rail structure 211*c* coupled to the first link member 220*a* and the fourth rail structure 212*c* coupled to the second link member 220*b* may be disposed adjacent to each other while the display 160 being interposed therebetween in correspondence to movement (counterclockwise and clockwise movements when the unfolded (open) state is changed to the folded (closed) state) of the first link member 220*a* and the second link member 220*b*. Here, the first rotation member 211 including the second rail structure 211*c* and the second rotation member 212 including the fourth rail structure 212*c* may define an included angle which is smaller than 90 degrees with respect to the z-axis. When the electronic device 100 is in the folded (closed) state, a spacing distance in the −z-axis direction between the first rotation member 211 and the second rotation member 212 may be formed to be greater than a spacing distance in the z-axis direction. The first axis 11 defined by the first rail structure 211*b* and the first rail 210*b*1 of the fixing bracket 210, and the third axis 13 defined by the second rail structure 211*c* and the second rail 210*b*2 of the fixing bracket 210 are fixed axes, and the positions thereof in the unfolded (open) state and the folded (closed) state may be the same. The second axis 12 related to the second rail structure 211*c* and the fourth axis 14 related to the fourth rail structure 212*c* may be disposed at a point, at which a constant curvature is formed in the third area 163 of the display 160. For example, the second axis 12 may be formed at a point, at which a curvature which is in an opposite direction to a curvature of the convex area which is formed in the −z-axis direction of the third area at a boundary between the third area 163 and the first area 161, and the fourth axis 14 may be formed at a point, at which a curvature which is in an opposite direction to a curvature of the convex area which is formed in the −z-axis direction of the third area at a boundary between the third area 163 and the second area 162. When the electronic device 100 is in the folded (closed) state, a distance between the second axis 12 and the fourth axis 14 may be smaller than a distance between the first axis 11 and the third axis 13

When the electronic device 100 is in the folded (closed) state, at least portions of the first arm member 231 coupled to the first link member 220*a* and the second arm member 232 coupled to the second link member 220*b*, as illustrated, may be disposed in parallel to face the z-axis direction. In correspondence to the movement of the link members 220*a* and 220*b*, the positions of the first slide holding part 223 and the second slide holding part 224 may be moved, and correspondingly, the first slide structure 231*b* and the second slide holding part 224 also may be disposed to face the z-axis direction.

When the electronic device 100 is in the folded (closed) stated, the portions of the first wing plate 131 and the second wing plate 132 coupled to the first rotation member 211 and the second rotation member 212 may support one side and an opposite side (e.g., a portion in the x-axis direction and a portion in the −x-axis direction) of the third area 163 of the display 160 in correspondence to the rotations of the rotation members 211 and 212, respectively. Similarly, when the electronic device 100 is in the folded (closed) state, the first link cover 225 and the second link cover 226 may support parts of the first wing plate 131 and the second wing plate 132. While the first link cover 225 and the second link cover 226 are rotated in correspondence to rotation of the link members 220*a* and 220*b*, the first slide structure 231*b* and the second slide structure 232*b* of the first arm member 231 also may be disposed such that the first link cover 225 and the second link cover 226 support parts of the third areas 163 of the wing plates 131 and 132, while being moved and also being linearly moved in the slide holding parts 223 and 224. Then, the first slide structure 231*b* and the second slide structure 232*b* may be rotated about real axes (e.g., the fifth axis 15 and the sixth axis 16) defined by the first shaft 241 and the second shaft 242, respectively. The fifth axis 15 and the sixth axis 16 may be located below the first axis 11 and the third axis 13 in the −z-axis direction. A distance between the fifth axis 15 and the sixth axis 16 may be greater than a distance between the first axis 11 and the third axis 13.

Here, the display 160 includes a periphery at each of opposing sides of the display 160 along the direction crossing the rotation axis (e.g., along the x-axis direction), the display 160 being adhered to the first housing 110 and the second housing 120 at the peripheries, respectively. Then, the foldable electronic device which is folded slides the first slide holding part and the second holding part along the first slide structure and the second slide structure to decrease a distance of the first slide holding part and the second holding part from the peripheries of the display, respectively. That is, the foldable electronic device which is folded slides the first slide holding part 223 and the second holding part 224 along the first slide structure 231*b* and the second slide structure 232*b* to increase distances of the first slide holding part 223 and the second holding part 224 from the fifth axis 15 and the sixth axis 16, respectively.

Figure 9B:
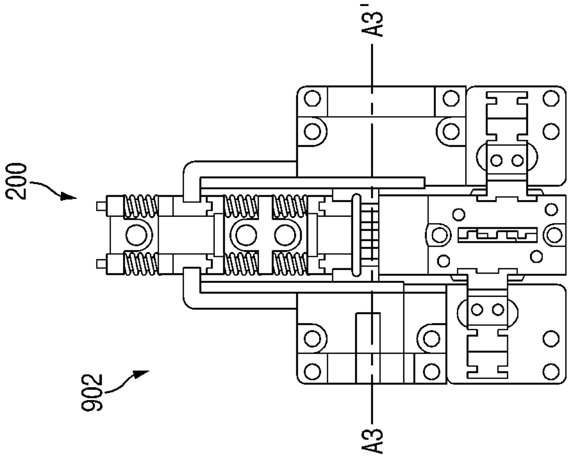
FIGS. 9A-9C is a view illustrating an example of disposition of link members of a first type hinge structure in an unfolded (open) state of an electronic device according to an embodiment.
Figure 9A:
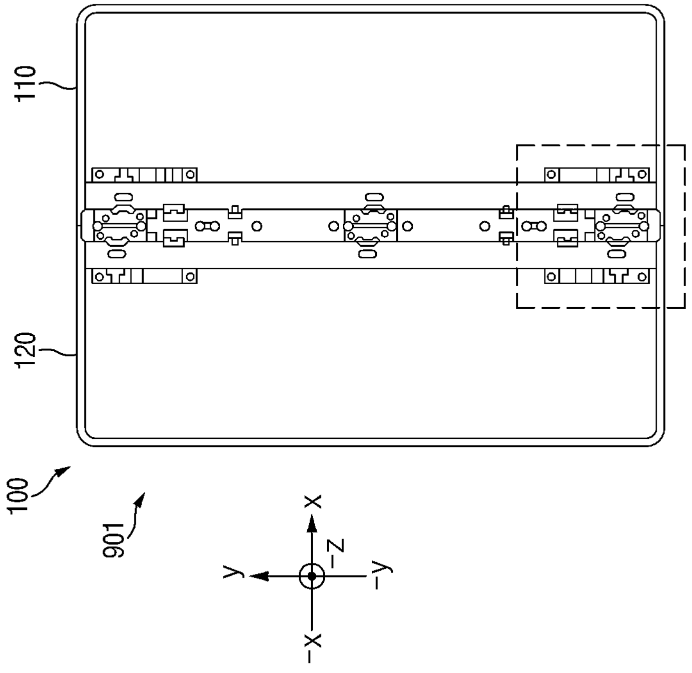
Figure 9C:
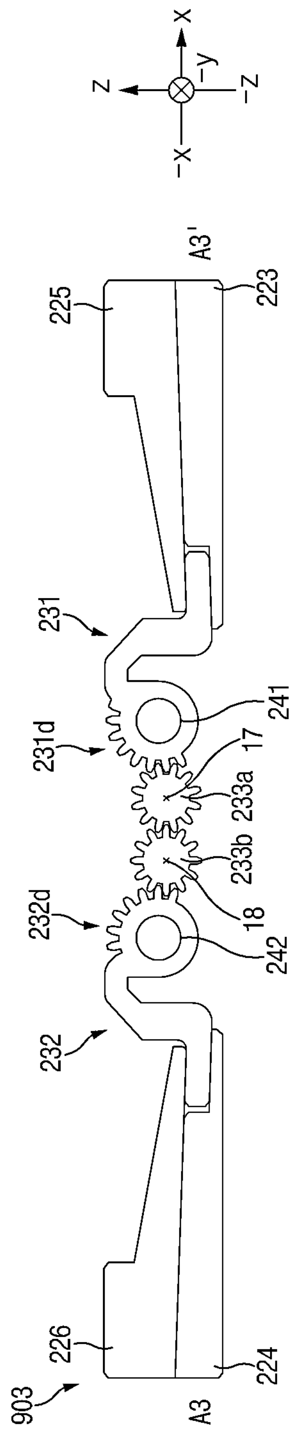
Figure 10B:
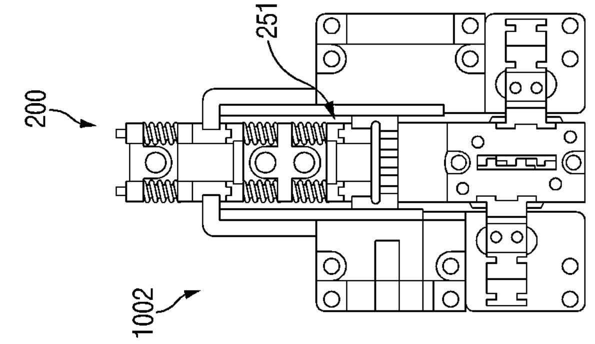
FIGS. 10A-10E are views illustrating an example of a shape of a cam of a hinge structure according to an embodiment.
Figure 10A:
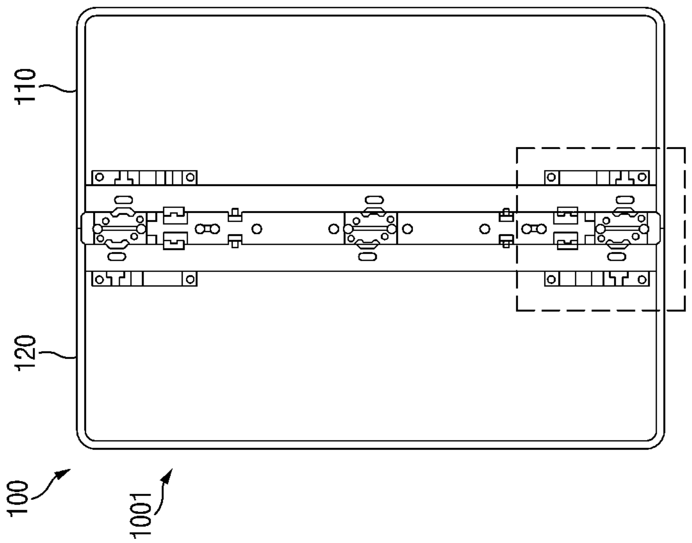
Figures 10C, 10D, 10E:
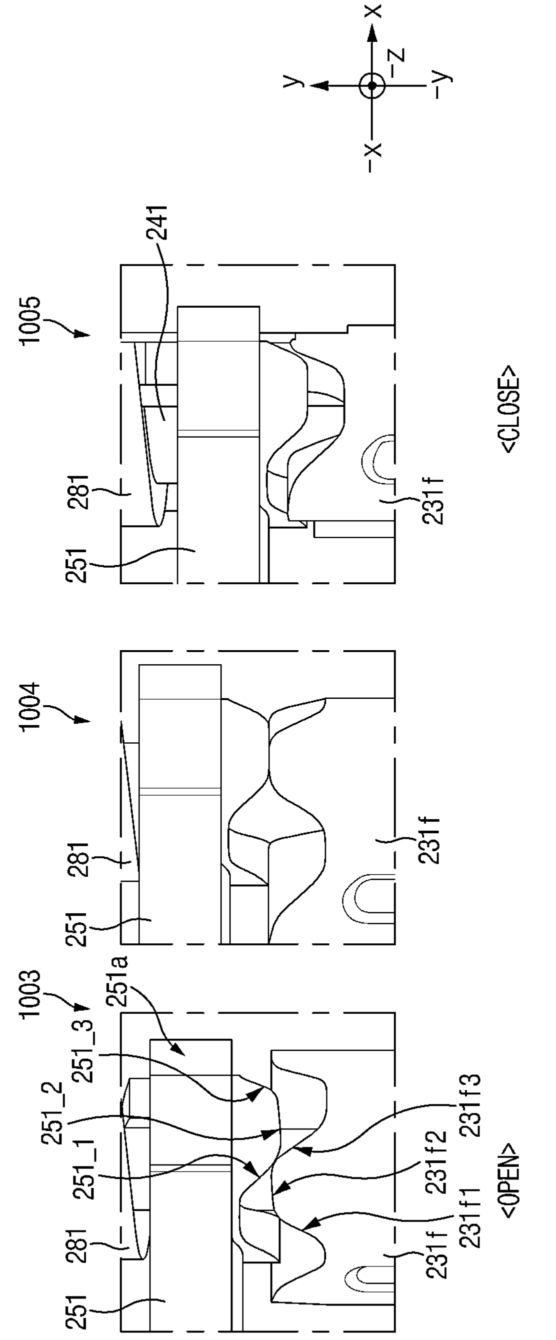

FIGS. 9A-9C are views illustrating an example of disposition of the link members of the first type hinge structure in the unfolded (open) state of an electronic device according to an embodiment. Cutting line A3-A3' illustrated in FIG. 9B may be disposed in an area of the hinge structure 200, in which the gears are disposed. In FIGS. 9A-9C, view 901 is a view illustrating an example of a front surface of the housing, on which the display is disposed, when the electronic device including the first type hinge structure is in the unfolded state, and view 902 is a view illustrating an example of the first type hinge structure, and view 903 is a view illustrating an example of cross-section A3-A3' of the first type hinge structure when the electronic device is in the unfolded state.

Referring to FIGS. 1 to 9C, the electronic device 100 may be disposed in the unfolded (open) state. When the electronic device 100 is in the unfolded (open) state, one surface (e.g., a surface, on which the first area 161 of the display 160 is seated) of the first housing 110 and one surface (e.g., a surface, on which the second area 162 of the display 160 is seated) of the second housing 120 may be disposed to face the z-axis direction in the same way. When the electronic device 100 is in the unfolded (open) state, the third area 163 disposed between the first area 161 and the second area 162 of the display 160 may be maintained flat.

When the electronic device 100 is in the unfolded (open) state, among at least portions of the hinge structures 200, the first gear 231*d* disposed on the first arm member 231, the second gear 232*d* disposed in the second arm member 232, and at least one idle gear 233*a* and 233*b* may be aligned in the x-axis direction. The first gear 231*d* may be disposed in a pattern on one side of the shaft holding part of the first arm member 231, and similar to the first gear 231*d*, and the second gear 232*d* also may be disposed in a pattern on one side of the shaft holding part of the second arm member 232. Correspondingly, the shaft holding part (e.g., the first shaft holding part 231*c*1) of the first arm member 231 and the shaft holding part (e.g., the third shaft holding part 232*c*1) of the second arm member 232 may include a partially formed gear pattern.

Here, the first shaft 241 inserted into the first arm member 231 and the second shaft 242 inserted into the second arm member 232 may define the fifth axis 15 and the sixth axis 16, as described above, and at least one idle gear 233*a* and 233*b* may be rotated about separate real axes (e.g., a seventh axis 17 and an eighth axis 18). The fifth axis 15 and the sixth axis 16 may be disposed in positions which are different from those of the seventh axis 17 and the eighth axis 18 with respect to the z-axis direction. For example, the fifth axis 15 and the sixth axis 16 may be disposed above the seventh axis 17 and the eighth axis 18 with respect to the z-axis direction.

When the electronic device 100 is changed from the unfolded (open) state to the folded (closed) state, the first gear 231*d* may be rotated counterclockwise while the first arm member 231 is rotated by the first link member 220*a*, and the second gear 232*d* may be rotated clockwise while the second arm member 232 is rotated by the second link member 220*b*. Correspondingly, the first idle gear 233*a* connected to the first gear 231*d* may be rotated clockwise, and the second idle gear 233*b* connected to the second gear 232*d* may be rotated counterclockwise. Through the above-described rotation, the first arm member 231 may be interlocked with the second arm member 232 through at least one idle gear 233*a* and 233*b*.

A portion of the first link member 220*a* and a portion of the first link cover 225 which covers the first link member 220*a* may be disposed on one periphery, for example, an x-axis periphery of the first arm member 231. A portion of the second link member 220*b* and a portion of the second link cover 226, which covers the second link member 220*b*, may be disposed at one periphery of the second arm member 232, for example, a −x-axis periphery.

FIGS. 10A-10E are views illustrating an example of a cam shape of the hinge structure according to an embodiment. Prior to a description, the cam shape described in FIGS. 10A-10E may be applied to at least some of the cams of the hinge structure previously described in FIGS. 1 to 9C. In FIGS. 10A-10E, view 1001 is a view illustrating an example of a front surface of the housing, on which the display is positioned when the electronic device including the first type hinge structure is in the unfolded state, and view 1002 is a view illustrating an example of the first type hinge structure, and in drawings 1003 to 1005, view 1003 is a view illustrating a disposition state of the cam member and the cam structure of the first type hinge structure when the electronic device is in the unfolded state, view 1004 is a view illustrating a disposition state of the cam member and the cam structure of the first type hinge structure when a folding angle of the electronic device is greater than 0 degrees and smaller than 180 degrees, and view 1005 is a view illustrating a disposition state of the cam member and the cam structure of the first type hinge structure when the electronic device is in the folded state.

Referring to FIGS. 5 to 10E, an electronic device 100 according to an embodiment includes a first housing 110 and a second housing 120, and a hinge structure 200 may be disposed to connect the first housing 110 and the second housing 120. The electronic device 100 may have the unfolded (open) state, the folded (closed) state, and a holding state at a specific angle, and in this process, to maintain the holding state at the specific angle, the hinge structure 200 may include a cam member and a corresponding cam structure. According to an embodiment, the hinge structure 200 may include at least one cam member and a cam structure which is formed in a shaft holding part engaged with the cam member. With reference to the illustrated drawing, the hinge structure 200 may include at least a first cam structure 231*f* disposed in the first cam member 251 and the first shaft holding part, a first elastic member 281 which exerts an elastic force to a first cam 251*a* of the first cam member 251, and a first shaft 241 which is disposed to pass through the first elastic member 281, the first cam member 251, and the first cam structure 231*f* of the first shaft holding part.

For example, the first cam 251*a* may include a mountain which protrudes in the −y-axis direction and a valley which is formed adjacent to the mountain. The mountain of the first cam 251*a* may include a protruding first apex part 251_2, a first left part 251_1, and a first right part 251_3 which define left and right sides of the first apex part 251_2, and. Here, a slope (or inclination) of the first left part 251_1 may be different from a slope (or inclination) of the first right part 251_3. For example, the slope (or inclination) of the first left part 251_1 may be gentler (or lower) than the slope (or inclination) of the first right part 251_3. Furthermore, the first apex part 251_2 may be formed to have a constant inclination with respect to the −y-axis. For example, the first apex part 251_2 may have a shape, in which the slope gradually decreases from the boundary part connected to the first left part 251_1 to the boundary part connected to the first right part 251_3. Alternatively, a height of a boundary part of the first apex part 251_2, which is connected to the first left part 251_1, may be higher than a height of a boundary part connected to the first right part 251_3.

The first cam structure 231*f* may include a valley which is formed in the y-axis direction and a mountain which is formed adjacent to the valley. The mountain of the first cam structure 231*f* may include a protruding second apex part 231*f*2, and a second left part 231*f*1 and a second right part 231*f*3 which define the left and right sides of the second apex part 231*f*2. Here, a slope (or inclination) of the second left part 231*f*1 may be different from a slope (or inclination) of the second right part 231*f*3. For example, the slope (or inclination) of the second left part 231*f*1 may be rapider (or higher) than the slope (or inclination) of the second right part 231*f*3. Furthermore, the second apex part 231*f*2 may be formed to have a constant inclination with respect to the y-axis. For example, the second apex part 231*f*2 may have a shape, in which the slope gradually increases from the boundary part connected to the second left part 231*f*1 to the boundary part connected to the second right part 231*f*3. Alternatively, a height of a boundary part of the second apex part 231*f*2, which is connected to the second left part 231*f*1, may be lower than a height of a boundary part which is connected to the second right part 231*f*3. Alternatively, the second apex part 231*f*2 may have an inclination shape which is opposite to that of the first apex part 251_2 of the first cam 251*a*.

According to the shape of the cam and cam structure described above, when the electronic device 100 is in the folded (closed) state at a specific angle (e.g., an angle which is greater than 90 degrees and less than 180 degrees), at least a portion of a repulsive force for unfolding the folded display 160 may be offset. Through this, the electronic device 100 may more stably provide a free-stop function for holding it at a specific angle.

Figure 11:
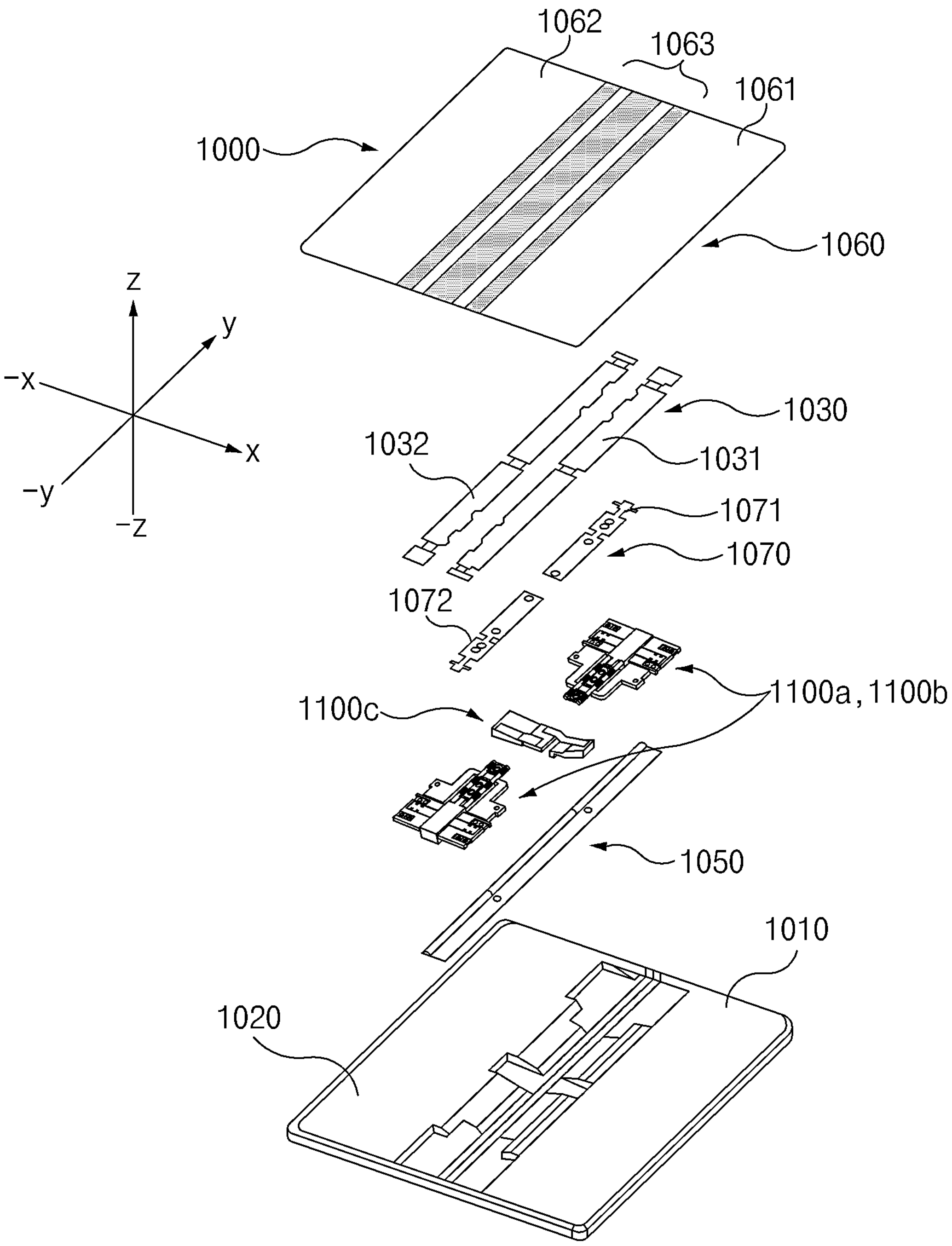
FIG. 11 is an exploded perspective view of an electronic device, to which a second type hinge structure is applied, according to an embodiment.
Figure 12:
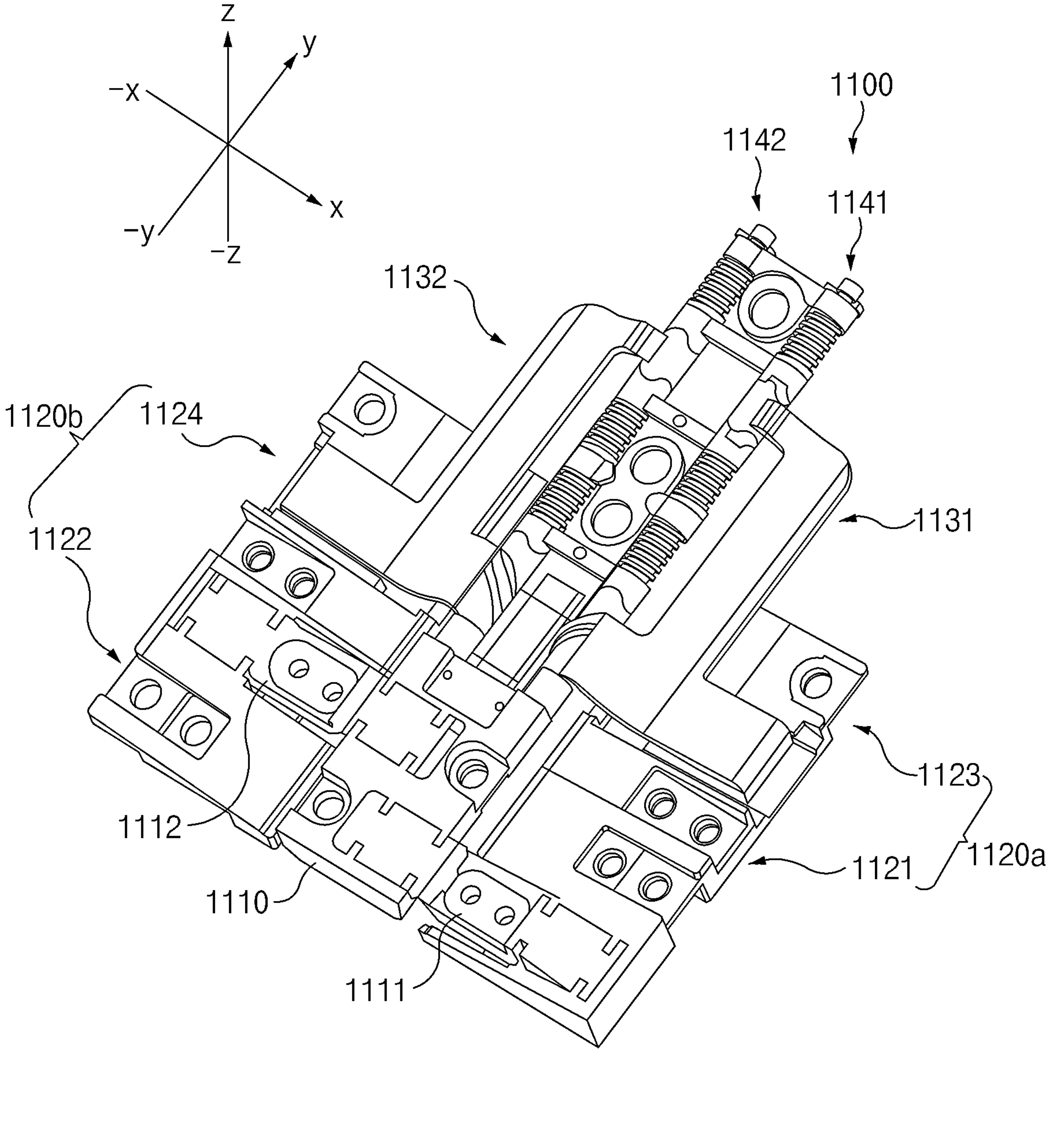
FIG. 12 is a perspective view illustrating an example of an external appearance of a second type hinge structure of FIG. 11 according to an embodiment.
Figure 13:
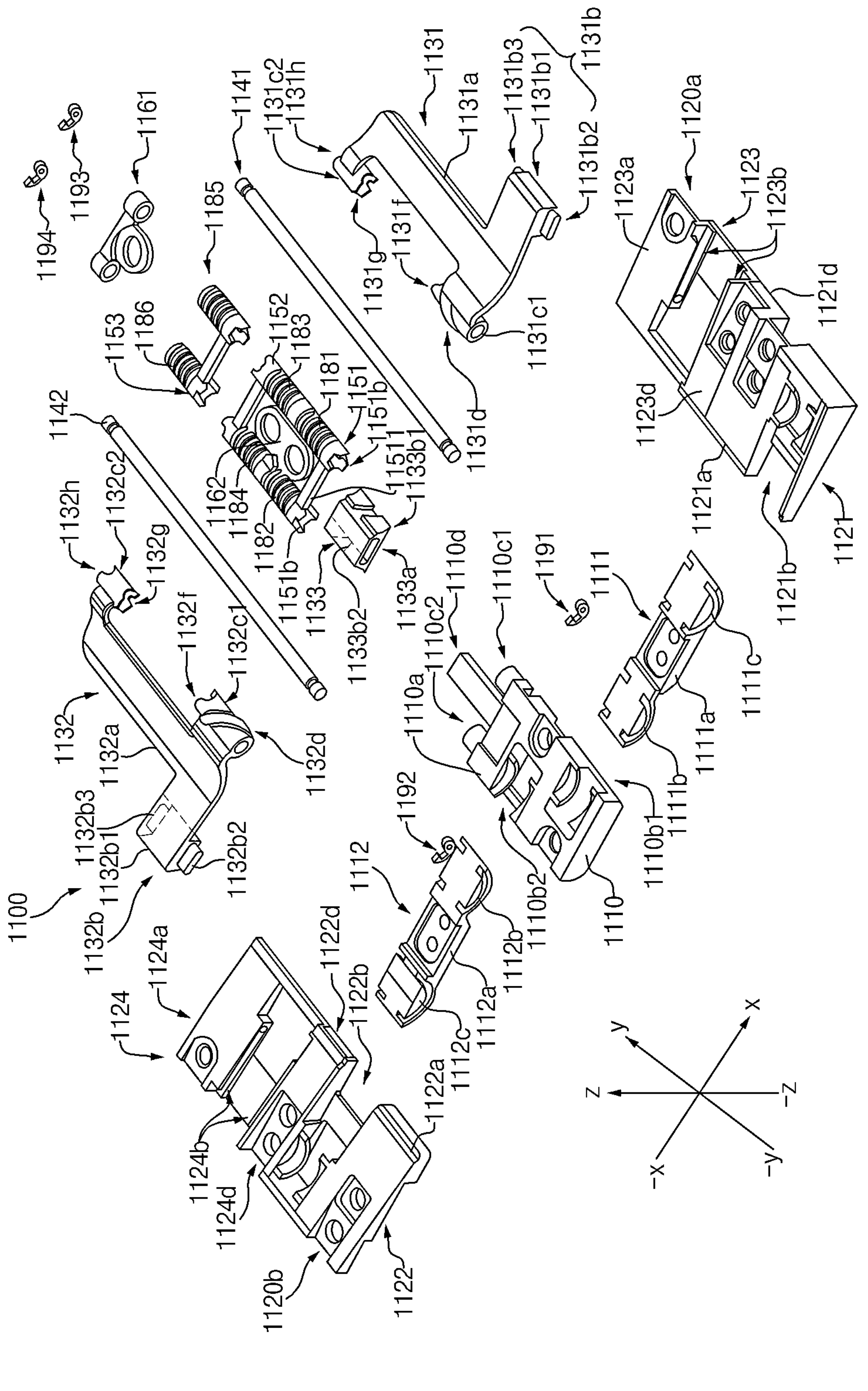
FIG. 13 is an exploded perspective view of a second type hinge structure according to an embodiment in a first direction.
Figure 14:
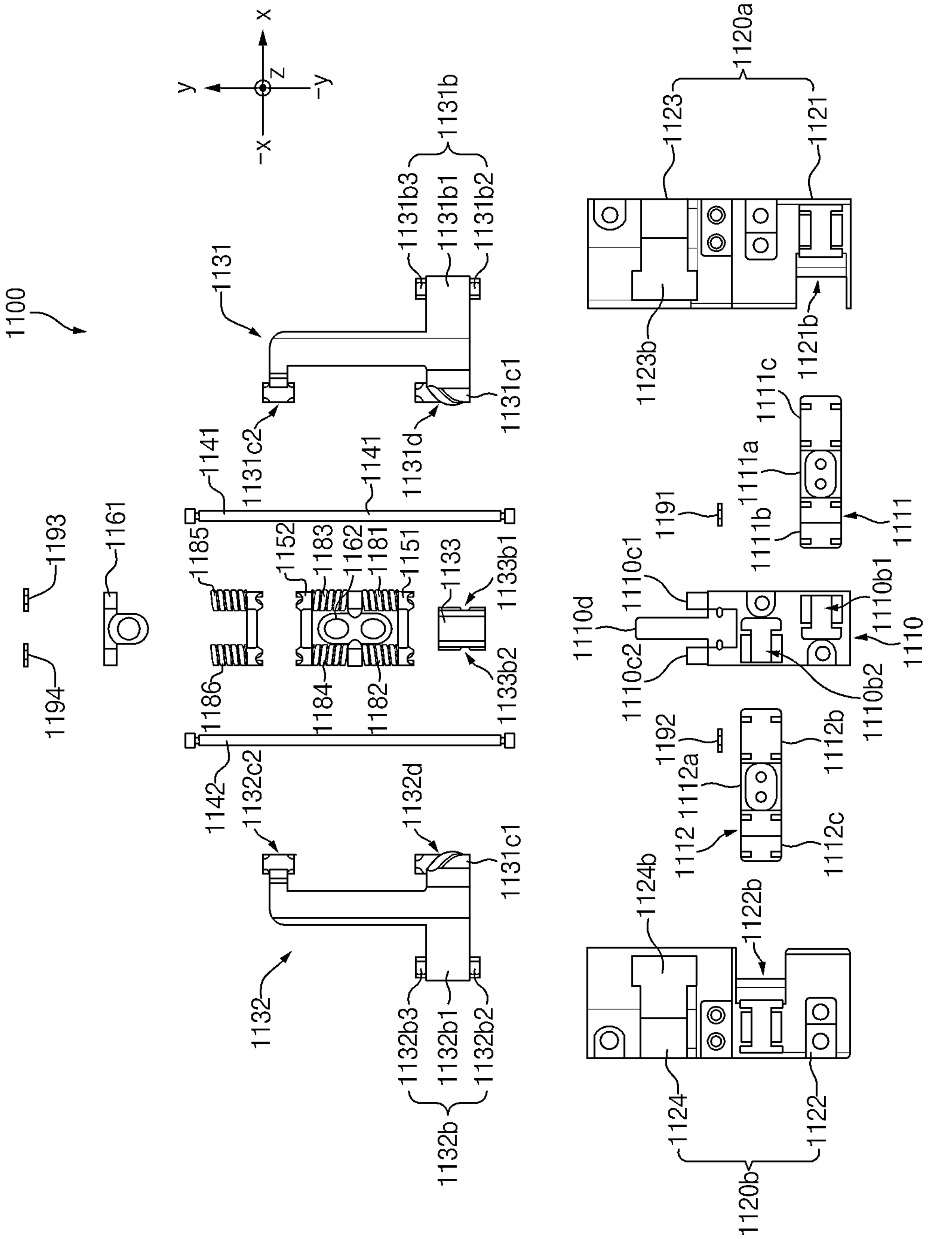
FIG. 14 is an exploded perspective view of a second type hinge structure according to an embodiment in a second direction.
Figure 15B:
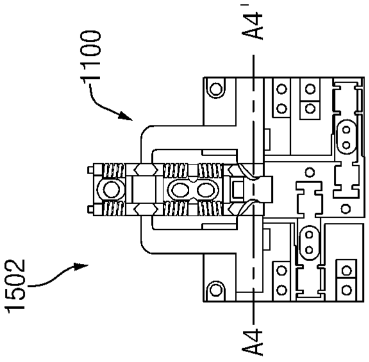
FIGS. 15A-15D are views illustrating an example of a configuration of an interlocking member of an electronic device according to an embodiment.
Figure 15A:
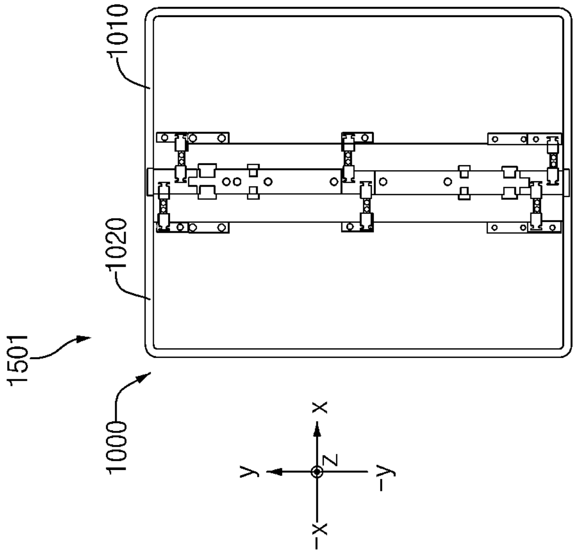
Figure 15D:
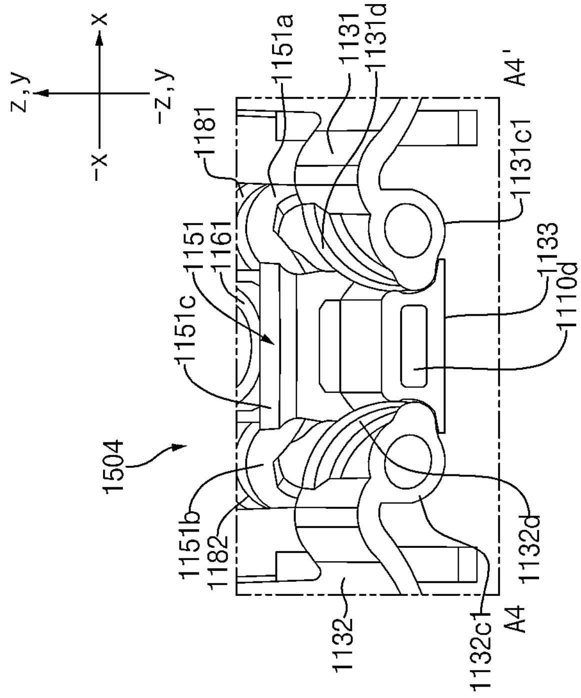
Figure 15C:
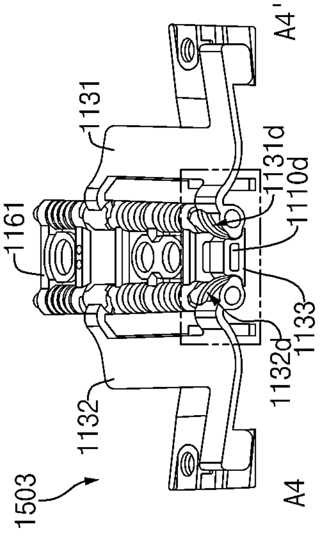

FIG. 11 is a view illustrating an exploded perspective view of the electronic device, to which the second type hinge structure is applied, according to an embodiment, and FIG. 12 is a view illustrating an example of an external appearance of the second type hinge structure of FIG. 11. FIG. 13 is a first directional exploded perspective view of the second type hinge structure according to an embodiment, and FIG. 14 is a second directional exploded perspective view of the second type hinge structure according to an embodiment.

Referring to FIGS. 11 to 14, an electronic device 1000 according to an embodiment includes a first housing 1010 and a second housing 1020, a hinge housing 1050, hinge structures 1100*a*, 1100*b*, and 1100*c*, wing plates 1030:1031 and 1032, center plates 1070:1071 and 1072, and a display 1060. For example, a length of the electronic device 1000 in the x-axis direction may be smaller than a length thereof in the y-axis direction.

As an example, in the electronic device 1000, at least one of the center plates 1071 and 1072, the wing plates 1031 and 1032 (or the plates), the display 1060, and the at least one hinge structure 1000*a*, 1000*b*, and 1000*c* may be omitted. For example, the center plates 1071 and 1072 and the wing plates 1031 and 1032 may be omitted, and the electronic device 1000 may include only the at least one hinge structure 1100*a*, 1100*b*, and 1100*c*, the display 1060, and the housings 1010 and 1020. Alternatively, at least one of the center plates 1071 and 1072 and the wing plates 1031 and 1032 may be omitted, and the electronic device 1000 may include only the at least one hinge structure 1100*a*, 1100*b*, and 1100*c*, the display 1060, the housings 1010 and 1020, and the hinge housing 1050.

The display 1060 may have a length in the x-axis direction which is smaller than a length in the y-axis direction, and may have the folded (closed) state or the unfolded (open) state with respect to a point in the x-axis direction (e.g., a center point of an x-axis width). The display 1060 may include a first area 1061 which is supported by the first housing 1010, a second area 1062 which is supported by the second housing 1020, a third area 1063 (or a folding area) which is disposed between the first area 1061 and the second area 1062. At least one lattice pattern may be formed at at least a portion of a rear surface of the display 1060 in the third area 1063. The display 1060 may be formed as any one of the various types of displays previously described in FIGS. 2A-2F and 3A-3C.

The wing plates 1031 and 1032 may include a first wing plate 1031 and a second wing plate 1032 which are disposed between the rear surface of the display 1060 and the hinge structures 1100*a*, 1100*b*, and 1100*c*, and are disposed long in the y-axis direction. Sides of the first wing plate 1031 and the second wing plate 1032 may be fixed to the first hinge structure 1100*a*, opposite sides thereof may be fixed to the second hinge structure 1100*b*, and a central portion thereof may be fixed to the third hinge structure 1100*a*. The wing plates 1031 and 1032 may support the folding area of the rear surface of the display 1060 when the state of the electronic device 1000 is changed.

The center plates 1071 and 1072 may include a first center plate 1071 which is disposed in the y-axis direction in a boundary area between the first housing 1010 and the second housing 1020, and a second center plate 1072 which is disposed in the −y-axis direction. When the electronic device 1000 is in the unfolded (open) state, the center plates 1071 and 1072 may be disposed between the wing plates 1031 and 1032. When the electronic device 1000 is in the folded (closed) stated, the center plates 1071 and 1072 which are maintained at fixed positions may be disposed to be spaced apart from the wing plates 1031 and 1032 which have been rotated.

The disposition state of the first housing 1010 and the second housing 1020 may vary depending on the folded (closed) state or the unfolded (open) state of the electronic device 1000. For example, when the electronic device 1000 is in the folded (closed) state, one surface (e.g., a surface, on which the first area 1061 of the display 1060, in which the screen is displayed, is disposed) of the first housing 1010 and one surface of the second housing 1020 (e.g., a surface, on which the second area 1062 of the display 1060, in which the screen is displayed, is disposed) may be disposed to face each other. When the electronic device 1000 is in the unfolded (open) state, an upper surface (e.g., a surface, on which the first area 1061 of the display 1060, in which the screen is displayed, is disposed) of the first housing 1010 and an upper surface (e.g., a surface, on which the first area 1061 of the display 1060, in which the screen is displayed, is disposed) of the second housing 1020 may be disposed to face the same direction (e.g., a direction which faces the z-axis). When the electronic device 1000 is in the unfolded (open) state, recessed parts may be formed in areas, in which the first housing 1010 and the second housing 1020 are disposed adjacent to each other, and at least portions of the hinge housing 1050 and the hinge structures 1100*a*, 1100*b*, and 1100*c* may be seated in the recessed parts.

Hinge structures 1100*a*, 1100*b*, and 1100*c*, for example, may include a first hinge structure 1100*a*, at least a portion of which is seated at a −y-axis periphery of the hinge housing 1050, a second hinge structure 1100*b*, at least a portion of which is seated at a y-axis periphery of the hinge housing 1050, and a third hinge structure 1100*c* which is disposed between the first hinge structure 1100*a* and the second hinge structure 1100*b*. The first hinge structure 1100*a* and the second hinge structure 1100*b* may have substantially the same shape and size, and may be disposed in different directions. The third hinge structure 1100*c* may include some configurations of the first hinge structure 1100*a* (or the second hinge structure 1100*b*). Meanwhile, the second type hinge structure 1100 illustrated in FIGS. 12 to 14 may be any one of the first hinge structure 1100*a* and the second hinge structure 1100*b* described in FIG. 11.

The second type hinge structure 1100 may include a fixing bracket 1110, a first rotation member 1111, a second rotation member 1112, a first link member 1120*a*, a second link member 1120*b*, and a first arm member 1131, a second arm member 1132, and an interlocking member 1133.

The fixing bracket 1110 may have a similar shape to that of the fixing bracket 210 of the first type hinge structure 200 previously described in FIG. 5, except for some structures. For example, the fixing bracket 1110 has the same or similar structure to that of the fixing bracket 210 of the first type hinge structure 200, except for the interlocking/fastening part 1110*d* which is fastened to the interlocking member 1133. For example, the fixing bracket 1110 may include a bracket body 1110*a*, rails 1110*b*1 and 1110*b*2, to which the first rotation member 1111 and the second rotation member 1112 are coupled, shaft fixing holes 1110*c*1 and 1110*c*2, into which the first shaft 1141 and the second shaft 1142 are inserted, and an interlocking/fastening part 1110*d*.

The first rail 1110*b*1 includes a partial area which is opened from the x-axis in the −x-axis direction of the bracket body 1110*a*, and the first rail structure 1111*b* of the first rotation member 1111 may be fastened thereto. The first rail 1110*b*1 may include a structure (e.g., rail protrusions which protrude from the surfaces of opposite side walls) corresponding to the first rail structure 1111*b*. The second rail 1110*b*2 includes a partial area which is opened from the −x-axis in the x-axis direction of the bracket body 1110*a*, and the third rail structure 1112*b* of the second rotation member 1112 may be fastened thereto. The second rail 1110*b*2 may include a structure (e.g., rail protrusions which protrude from the surfaces of opposite side walls) corresponding to the third rail structure 1112*b*. The second rail 1110*b*2 may have substantially the same structure as that of the first rail 1110*b*1. The second rail 1110*b*2 is formed adjacent to the first rail 1110*b*1 and may be disposed not to meet each other with respect to the y-axis direction. At least one hole (e.g., a hole which passes in the z-axis direction) which is used to fix the fixing bracket 1110 to the hinge housing 1050 may be disposed in areas (e.g., an area of the first rail 1110*b*1 and an area in the −x-axis direction and an area of the second rail 1110*b*2 in the x-axis direction) which are adjacent to the first rail 1110*b*1 and the second rail 1110*b*2.

The interlocking/fastening part 1110*d* may extend in the y-axis direction from one periphery (e.g., a y-axis periphery) of the bracket body 1110*a*. The interlocking/fastening part 1110*d* is a bar-type and has a specific width and length, and may be formed to be longer than a y-axis width of the interlocking member 1133. For example, the interlocking/fastening part 1110*d* may have a shape, in which a length thereof in the y-axis direction is larger than a length in the x-axis direction to be inserted into and fastened to the interlocking member 1133. The interlocking/fastening part 1110*d* may be disposed between the shaft fixing holes 1110*c*1 and 1110*c*2.

The shaft fixing holes 1110*c*1 and 1110*c*2 may include a first shaft fixing groove 1110*c*1, in which the first shaft 1141 is held, and a second shaft fixing groove 1110*c*2, in which the second shaft 1142 is held. A groove or hole, into which coupling members 1191 and 1192 (e.g., E-rings) may be inserted, may be formed on at least one side of a column which defines the shaft fixing holes 1110*c*1 and 1110*c*2. Accordingly, after the first shaft 1141 and the second shaft 1142 are inserted into the shaft fixing holes 1110*c*1 and 1110*c*2, they may be fixed by the coupling members 1191 and 1192.

The first rotation member 1111 may include a first rotation body 1111*a*, a first rail structure 1111*b* which extends in the −x-axis direction from the first rotation body 1111*a* and is inserted into the first rail 1110*b*1 of the fixing bracket 1110, and a second rail structure 1111*c* which extends from the first rotation body 1111*a* in the x-axis direction. The upper surface (a surface which faces the z-axis) of the first rail structure 1111*b*, an upper surface of the first rotation body 1111*a*, and an upper surface of the second rail structure 1111*c* may have a flat shape as a whole. A through-hole which passes through upper and lower sides may be formed in the first rotation body 1111*a*. The through-hole formed in the first rotation body 1111*a* may be used to couple the wing plate (e.g., the first wing plate 1031) to the first rotation member 1111. The first rail structure 1111*b* and the second rail structure 1111*c* may include an arc-shaped rail groove (or rail protrusions which define the rail groove) which is convex in the −z-axis direction. The second rail structure 1111*c* may be fastened to the third rail 1121*b* of the first link member 1120*a*.

The second rotation member 1112 may include a second rotation body 1112*a*, a third rail structure 1112*b* which extends in the x-axis direction from the second rotation body 1112*a* and is inserted into the second rail 1110*b*2 of the fixing bracket 1110, and a fourth rail structure 1112*c* which extends from the second rotation body 1112*a* in the −x-axis direction. The second rotation body 1112*a*, the third rail structure 1112*b*, and the fourth rail structure 1112*c* described above may have the same or similar shape and size as that of the first rotation body 1111*a* of the first rotation member 1111, the first rail structure 1111*b*, and the second rail structure 1111*c* described above. For example, the upper surfaces of the second rotation body 1112*a*, the third rail structure 1112*b*, and the fourth rail structure 1112*c* may be formed to be flat as a whole, and a through-hole which is used for coupling to the wing plate (e.g., the second wing plate 1032) may be formed on one side of the second rotation body 1112*a*. The third rail structure 1112*b* and the fourth rail structure 1112*c* may include an arc-shaped rail groove (or rail protrusions which define the rail groove) which is convex in the same direction as that of the first rail structure 1111*b* and the second rail structure 1111*c*. The fourth rail structure 1112*c* may be fastened to a fourth rail 1122*b* of the second link member 1120*b*.

The first link member 1120*a* may have a structure which is similar to that of the first link member 220*a* of the first type hinge structure 200 previously described in FIG. 5. For example, the first link member 1120*a* may include a first rail link 1121 and a first slide holding part 1123.

The first rail link 1121 may include a first link body 1121*a*, a first link connection part 1121*d*, and a third rail 1121*b*. At least one hole which is used to fix the first link member 1120*a* to the first housing 1010 may be disposed in the first link body 1121*a*. The third rail 1121*b* may be disposed in the −y-axis direction of the first link body 1121*a*. The second rail structure 1111*c* of the first rotation member 1111 may be fastened to the third rail 1121*b*. The first link connection part 1121*d* is provided in a shape which is stepped from the first link body 1121*a* and may be disposed to extend from the first link body 1121*a* in the y-axis direction. A first slide connection part 1123*d* may overlap an upper portion or a lower portion of the first link connection part 1121*d* with respect to the z-axis direction. At least one through-hole (or a groove) which is used for coupling to the first slide connection part 1123*d* may formed in the z-axis direction in the first link connection part 1121*d*. The first slide holding part 1123 may include a first slide body 1123*a*, a first slide connection part 1123*d*, and a first holding part 1123*b*. At least one hole for fixing the first slide holding part 1123 to the first housing 1010 may be disposed in one direction of the first slide body 1123*a*, for example, in the y-axis direction. A first slide structure 1131*b* formed on the first arm member 1131 may be fastened to the first holding part 1123*b*. The first holding part 1123*b* may be disposed in the −y-axis direction from the first slide body 1123*a*, and a straight rail protrusion for preventing the first slide structure 1131*b* from deviating in the z-axis direction after being seated, or for guiding the corresponding movement while the first slide structure 1131*b* is linearly moved may be disposed in the first holding part 1123*b*. The rail protrusions may be disposed to face each other on opposite side walls which define the first holding part 1123*b*. The first slide connection part 1123*d* may be formed to extend from the first holding part 1123*b* in the −y-axis direction. The first holding part 1123*b* and the first slide connection part 1123*d* may be disposed to be stepped. According to one example, the first slide connection part 1123*d* may include at least one through-hole which is disposed at an upper portion of the first link connection part 1121*d* and passes upward and downward. The through-hole formed in the first slide connection part 1123*d* may be aligned with the through-hole formed in the first link connection part 1121*d* in an upward/downward direction.

Meanwhile, in the above description, a form, in which the first link member 1120*a* includes a first link rail 1121 and a first slide holding part 1123 which are separated from each other, and is coupled to the first link connection part 1121*d* disposed in the first link rail 1121 by using the first slide connection part 1123*d* disposed in the first slide holding part 1123, has been illustrated, but the disclosure is not limited thereto. The above-described separation structure is for convenience of assembly of the components, and the first link connection part 1121*d* and the first slide connection part 1123*d* may be provided integrally.

The second link member 1120*b* may have substantially the same or similar structure to the previously described first link member 1120*a*, except for the symmetrical portion. For example, the second link member 1120*b* may include a second rail link 1122 and a second slide holding part 1124.

The second rail link 1122 may include a second link body 1122*a*, a second link connection part 1122*d*, and a fourth rail 1122*b*. At least one hole which is used to fix the second link member 1120*b* to the second housing 1020 may be disposed in the second link body 1122*a*. The second link connection part 1122*d* is provided in a shape which is stepped from the second link body 1122*a* and may extend from the second link body 1122*a* in the y-axis direction. A second slide connection part 1124*d* may overlap an upper portion or a lower portion of the second link connection part 1122*d* with respect to the z-axis direction. At least one through-hole (or a groove) which is used for coupling to the second slide connection part 1124*d* may formed in the z-axis direction in the second link connection part 1122*d*. The second slide holding part 1124 may include a second slide body 1124*a*, a second slide connection part 1124*d*, and a second holding part 1124*b*. At least one hole for fixing the second slide holding part 1124 to the second housing 1020 may be disposed in one direction of the second slide body 1124*a*, for example, in the y-axis direction. A second slide structure 1132*b* formed on the second arm member 1132 may be fastened to the second holding part 1124*b*. The second holding part 1124*b* may be disposed in the −y-axis direction from the second slide body 1124*a*, and a straight rail protrusion for preventing the second slide structure 1132*b* from deviating in the z-axis direction after being seated, or for guiding the corresponding movement while the second slide structure 1132*b* is linearly moved may be disposed to face the opposite side walls. The second slide connection part 1124*d* may be formed to extend from the second holding part 1124*b* in the −y-axis direction. The second holding part 1124*b* and the second slide connection part 1124*d* may be disposed to be stepped. According to one example, the second slide connection part 1124*d* may include at least one through-hole which is disposed at an upper portion of the second link connection part 1122*d* and passes upward and downward. The through-hole formed in the second slide connection part 1124*d* may be aligned with the through-hole formed in the second link connection part 1122*d* in an upward/downward direction. In the second link member 1120*b*, the second rail link 1122 and the second slide holding part 1124 may be provided integrally.

The first arm member 1131 includes a structure (e.g., a first slide structure 1131*b*) which is fastened to a first link member 1120*a* coupled to the first housing 1010. The first slide structure 1131*b* may be linearly moved (e.g., slid) along the −x-axis or x-axis in the first slide holding part 1123 formed in the first link member 1120*a*. The first slide structure 1131*b* may include a first main body 1131*b*1 which extend in the x-axis direction from a first arm body 1131*a*, a first wing 1131*b*2 which protrudes in the −y-axis direction from a periphery of the first main body 1131*b*1, and a second wing 1131*b*3 which protrudes in the y-axis direction. The first wing 1131*b*2 and the second wing 1131*b*3 may be engaged with the rail protrusions formed in the first holding part 1123*b* to guide linear movement thereof while the first main body 1131*b*1 is linearly moved in the first holding part 1123*b*, and may prevent the first main body 1131*b*1 from deviating in the z-axis direction.

The first arm member 1131 may include a first arm body 1131*a*, and a first shaft holding part 1131*c*1 and a second shaft holding part 1131*c*2 which extend from the first arm body 1131*a* in the −x-axis direction and may be fastened to the first shaft 1141. The first shaft holding part 1131*c*1 and the second shaft holding part 1131*c*2 may be disposed to be spaced apart from each other in the y-axis direction. A first spiral structure 1131*d* (or a first spiral pattern, a first spiral protrusion, or a first spiral gear) may be disposed on one side of the first shaft holding part 1131*c*1. A hole which passes in the y-axis or −y-axis direction may be formed in the first shaft holding part 1131*c*1 and the second shaft holding part 1131*c*2 so that the first shaft 1141 may be held therein. The first shaft holding part 1131*c*1 may include a first cam structure 1131*f* which protrudes in the y-axis direction and is engaged with a cam member (e.g., one side cam of a first cam member 1151). For example, a first cam structure 1131*f* may be formed on one side of the first spiral structure 1131*d*. The first spiral structure 1131*d* may be fastened to a first spiral groove 1133*b*1 formed in the interlocking member 1133. The first spiral structure 1131*d* may be rotated according to the rotation of the first arm member 1131, and the interlocking member 1133, in which the first spiral groove 1133*b*1 is formed, may be moved linearly in the y-axis direction (or a direction which is parallel to a direction, in which the display 160 is folded, in correspondence to the rotation of the first spiral structure 1131*d*. The second shaft holding part 1131*c*2 may include a second cam structure 1131*g* which is engaged with one side cam of a second cam member 1152, and a third cam structure 1131*h* which is engaged with one side cam of a third cam member 1153. The first arm member 1131 may be rotated counterclockwise and clockwise about a real axis of the first shaft 1141.

The second arm member 1132 includes a structure (e.g., a second slide structure 1132*b*) which is fastened to a second link member 1120*b* coupled to the second housing 1020. The second slide structure 1132*b* may be linearly moved (e.g., slid) along the −x-axis or x-axis in the second slide holding part 1124 formed in the second link member 1120*b*. The second slide structure 1132*b* may have a structure which is substantially the same or similar to that of the first slide structure 1131*b* described above. For example, the second slide structure 1132*b* may include a second main body 1132*b*1, a third wing 1132*b*2, and a fourth wing 1132*b*3, the second main body 1132*b*1 may be moved linearly in the x-axis or the −x-axis direction in the second holding part 1124*b*, and the third wing 1132*b*2 and the fourth wing 1132*b*3 may guide the linear movement of the second main body 1132*b*1 along the rail protrusions formed in the second holding part 1124*b*.

The second arm member 1132 may include a second arm body 1132*a*, and a third shaft holding part 1132*c*1 and a fourth shaft holding part 1132*c*2 which extend from the second arm body 1132*a* in the x-axis direction and may be fastened to the second shaft 1142. The third shaft holding part 1132*c*1 and the fourth shaft holding part 1132*c*2 may be disposed to be spaced apart from each other in the y-axis direction. The third shaft holding part 1132*c*1 and the fourth shaft holding part 1132*c*2 may be spaced apart from each other by a spacing distance which is the same as a spacing distance between the first shaft holding part 1131*c*1 and the second shaft holding part 1131*c*2. A second spiral structure 1132*d* (or a second spiral protrusion or a second spiral gear) may be disposed on one side of the third shaft holding part 1132*c*1. The second spiral structure 1132*d* may be rotated according to the rotation of the second arm member 1132, and the interlocking member 1133, in which a second spiral groove 1133*b*2 is formed, may be moved linearly in the y-axis direction (or the −y-axis direction) in correspondence to the rotation of the second spiral structure 1132*d*.

A hole which passes in the y-axis or −y-axis direction may be formed in the third shaft holding part 1132*c*1 and the fourth shaft holding part 1132*c*2 so that the second shaft 1142 may be held therein. The third shaft holding part 1132*c*1 may include a fourth cam structure 1132*f* which is engaged with a cam member (e.g., an opposite cam of the first cam member 1151). For example, a fourth cam structure 1132*f* may be formed on one side of the second spiral structure 1132*d*. The fourth shaft holding part 1132*c*2 may include a fifth cam structure 1132*g* which is engaged with an opposite side cam of the second cam member 1152, and a sixth cam structure 1132*h* which is engaged with an opposite side cam of the third cam member 1153. The second arm member 1132 may be rotated counterclockwise and clockwise about a real axis of the second shaft 1142.

The first cam member 1151 may include a first cam 1151*a* which is engaged with the first cam structure 1131*f* of the first arm member 1131, a second cam 1151*b* which is engaged with the fourth cam structure 1132*f* of the second arm member 1132, and a support member 1151*c* which connects the first cam 1151*a* and the second cam 1151*b*. A through-hole, through which the first shaft 1141 may pass, may be formed at a center of the first cam 1151*a*, and a through-hole, through which the second shaft 1142 may pass, may be formed at a center of the second cam 1151*b*. A first elastic member 1181 and a second elastic member 1182 may be disposed on a rear surface of the first cam member 1151 to provide an elastic force which pushes the first cam member 1151 toward the first cam structure 1131*f* and the third cam structure 1131*h*. The second cam member 1152 and the third cam member 1153 may have the same or similar structure as that of the first cam member 1151. That is, it may include two spaced cams, and a support member which connects the cams. The third cam (not illustrated) of the second cam member 1152 may be fastened to the second cam structure 1131*g* of the second shaft holding part 1131*c*2, and the fourth cam (not illustrated) of the second cam member 1152 may be fastened to the third cam structure 1131*h* of the second shaft holding part 1131*c*2. The fifth cam (not illustrated) of the third cam member 1153 may be fastened to the fifth cam structure 1132*g* of the fourth shaft holding part 1132*c*2, and the sixth cam (not illustrated) of the third cam member 1153 may be fastened to the sixth cam structure 1132*h* of the fourth shaft holding part 1132*c*2. The third elastic member 1183 and the fourth elastic member 1184 may provide an elastic force to the second cam member 1152, and the fifth elastic member 1185 and sixth elastic member 1186 may exert an elastic force to the third cam member 1153.

The shaft fixing part 1161 and the shaft holder 1162 may have the same or similar configuration to those of the shaft fixing part 261 and the shaft holder 262 of the first type hinge structure 200 previously described in FIG. 5. Accordingly, the related description will be replaced with the description of the shaft fixing part 261 and the shaft holder 262 previously described in FIG. 5.

At least one coupling member 1191, 1192, 1193, and 1194 may include ring members 1191 and 1192 which fix the −y-axis peripheries of the first shaft 1141 and the second shaft 1142, which are fixed to the shaft fixing holes 1110*c*1 and 1110*c*2 of the fixing bracket 1110, and ring members 1193 and 1194 which fix the y-axis peripheries of the first shaft 1141 and the second shaft 1142. The at least one coupling members 1191, 1192, 1193, and 1194 described above, for example, may include a form of an E-ring.

The interlocking member 1133*b* may include an interlocking body 1133*a*, in which a through-hole is formed in the y-axis direction (or the −y-axis direction), and a first spiral groove 1133*b*1 and a second spiral groove 1133*b*2 are engraved on side surfaces (e.g., side surfaces in the −x-axis and x-axis directions) of the interlocking body 1133*a*. The first spiral groove 1133*b*1 and the second spiral groove 1133*b*2 may be formed as diagonally engraved grooves in the z-axis direction and the −z-axis direction. The first spiral groove 1133*b*1 and the second spiral groove 1133*b*2 may be formed in opposite diagonal directions. For example, when the first spiral groove 1133*b*1 is formed in a direction from the −z-axis to the z-axis and diagonally upward to the right side, the second spiral groove 1133*b*2 may formed in a direction from the −z-axis to the z-axis and diagonally upward to the left side. The first spiral groove 1133*b*1 may be fastened to the first spiral structure 1131*d* formed in the first arm member 1131, and the second spiral groove 1133*b*2 may be fastened to the second spiral structure 1132*d* formed in the second arm member 1132. A portion of the interlocking/fastening part 1110*d* of the fixing bracket 1110 may be inserted into the through-hole formed at a central portion of the interlocking body 1133*a*. Accordingly, the interlocking member 1133 may move linearly in the y-axis direction or the −y-axis direction along the interlocking/fastening part 1110*d* of the fixing bracket 1110.

FIGS. 15A-15D are views illustrating an example of a configuration of the interlocking member of the electronic device according to an embodiment. In FIGS. 15A-15D, view 1501 is a view illustrating an example of a front surface of the housing, on which the display is disposed when the electronic device including the second type hinge structure is in the unfolded state, view 1502 is a view illustrating an example of the second type hinge structure, view 1503 is a view illustrating an example of cross-section A4-A4' of the second type hinge structure when the electronic device is in the unfolded state, and view 1504 is a view illustrating a partial area of view 1503 in more detail.

Referring to FIGS. 11 to 15D, the electronic device 1000 according to an embodiment includes a first housing 1010, a second housing 1020, and a hinge structure 1100 which connects the first housing 1010 and the second housing 1020. In FIGS. 15A-15D, cutting line A4-A4' may be disposed in an area including the interlocking member 1133 of the hinge structure 1100. The hinge structure 1100 may include at least a first arm member 1131 and a second arm member 1132.

The first arm member 1131 may include a first shaft holding part 1131*c*1, through which at least the first shaft 1141 passes and at least a portion thereof is disposed. A first spiral structure 1131*d* may be disposed on an outer surface of the first shaft holding part 1131*c*1. The first spiral structure 1131*d* may include an embossed protrusion which swirls around an outer surface of the cylindrical first shaft holding part 1131*c*1. Then, the first spiral structure 1131*d* may include protrusions which are disposed diagonally from an inside to an outside (or from the −x-axis in the x-axis direction) and from the −y-axis in the y-axis direction. The first spiral structure 1131*d* may be formed to be thicker as it approaches the outer surface of the first shaft holding part 1131*c*1 and thinner as it goes away from the outer surface of the first shaft holding part 1131*c*1. The above-described first spiral structure 1131*d* may be fastened to the first spiral groove 1133*b*1 formed in the interlocking member 1133. The first spiral groove 1133*b*1 may be provided in a shape corresponding to at least a portion of the first spiral structure 1131*d*. For example, the first spiral groove 1133*b*1 may be formed as an engraving on an x-axis side wall of the interlocking member 1133, and as the depth of the engraved part becomes deeper, a width of the groove may become smaller.

Meanwhile, a first cam structure 1131*f* formed on a side surface in the y-axis direction may be formed in the first shaft holding part 1131*c*1 formed in the first arm member 1131, and the first cam structure 1131*f* may be disposed to be engaged with the first cam member 1151*a* of the first cam member 1151. When the first arm member 1131 is rotated counterclockwise, the first cam structure 1131*f* may perform a cam operation while being rotated along the surfaces of the mountains and valleys of the fixed first cam 1151*a*. The first cam 1151*a* may be maintained in a close contact with the first cam structure 1131*f* by an elastic force which is transmitted from the first elastic member 1181.

The second arm member 1132 may include a third shaft holding part 1132*c*1, through which at least the second shaft 1142 passes and at least a portion thereof is disposed. A second spiral structure 1132*d* may be disposed on an outer surface of the third shaft holding part 1132*c*1. The second spiral structure 1132*d* may include an embossed protrusion which swirls around the outer surface of the cylindrical third shaft holding part 1132*c*1, similar to the first spiral structure 1131*d*. Then, the second spiral structure 1132*d* may include a protrusion which is disposed diagonally in a direction which is opposite to the first spiral structure 1131*d*, for example, from an outside to an inside (or from the x-axis in the −x-axis direction) and from the −y-axis in the y-axis direction. The second spiral structure 1131*d* may be formed to be thicker as it approaches the outer surface of the third shaft holding part 1132*c*1 and thinner as it goes away from the outer surface of the third shaft holding part 1132*c*1. The above-described second spiral structure 1132*d* may be fastened to the second spiral groove 1133*b*2 formed in the interlocking member 1133. The second spiral groove 1133*b*2 may be provided in a shape corresponding to at least a portion of the second spiral structure 1132*d*. For example, the second spiral groove 1133*b*2 may be formed as an engraving on a −x-axis side wall of the interlocking member 1133, and as the depth of the engraved part becomes deeper, a width of the groove may become smaller. The engraved direction of the second spiral groove 1133*b*2 may have a diagonal direction opposite to the direction in which the first spiral groove 1133*b*1 is formed.

Meanwhile, the third shaft holding part 1132*c*1 formed in the second arm member 1132 may have a fourth cam structure 1132*f* on a side surface in the y-axis direction, and the fourth cam structure 1132*f* may be disposed to be engaged with the second cam 1151*b* connected through the support member 1151*c* of 1151. When the second arm member 1132 is rotated clockwise, the fourth cam structure 1132*f* may perform a cam operation while being rotated along the surfaces of the mountains and valleys of the fixed second cam 1151*b*. The second cam 1151*b* may be maintained in a close contact with the fourth cam structure 1132*f* by an elastic force which is transmitted from the second elastic member 1182.

When the first arm member 1131 and the second arm member 1132 are rotated counterclockwise and clockwise (or clockwise and counterclockwise), respectively, the interlocking member 1133 which is fastened to the first spiral structure 1131*d* and the second spiral structure 1132*d* may be moved linearly in the −y-axis direction (or the y-axis direction). In this way, the first spiral structure 1131_d_ and the second spiral structure 1132_d_ may interlock the pressures applied to the first arm member 1131 and the second arm member 1132 while converting the rotation of the first arm member 1131 and the second arm member 1132 to a linear movement.

Figure 16C:
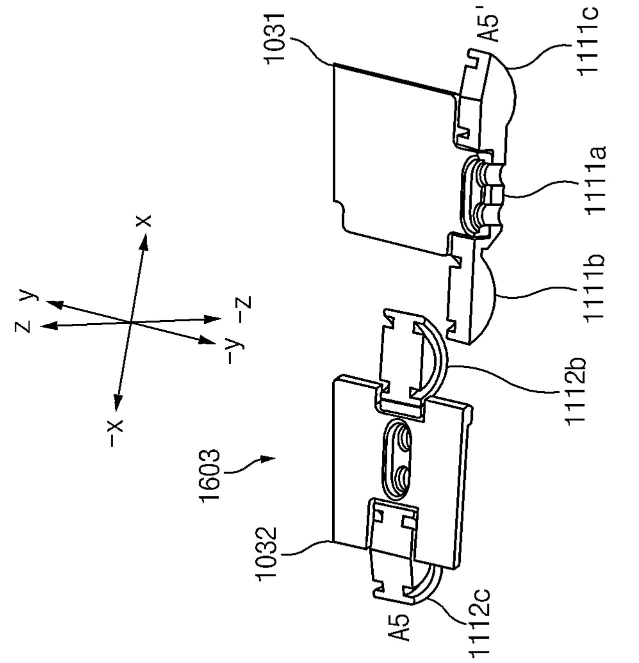
FIGS. 16A-16C is a view illustrating an example of coupling of wing plates and rotation members according to an embodiment.
Figure 16B:
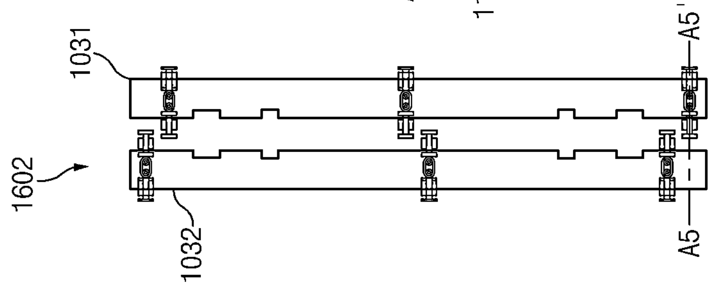
Figure 16A:
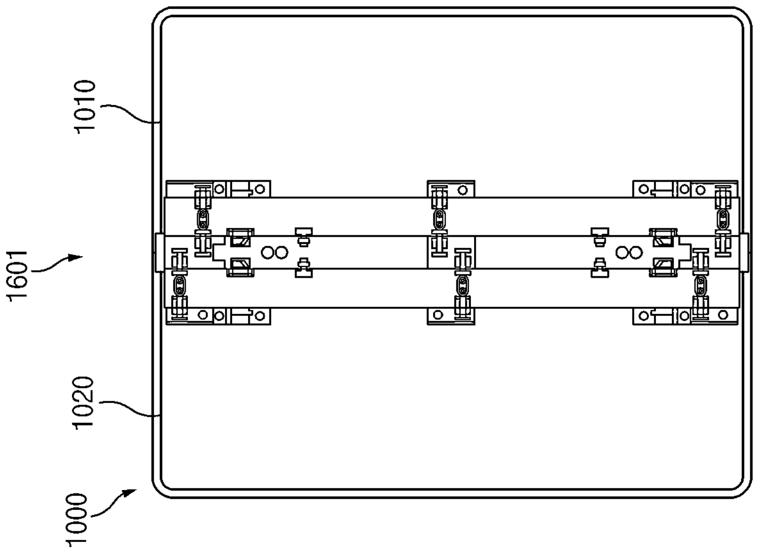

FIGS. 16A-16C are views illustrating an example of coupling of the wing plates and the rotation members of the electronic device including the second type hinge structure according to an embodiment. In FIGS. 16A-16C, view 1601 is a view illustrating an example of a front surface of the housing, in which the display is disposed when the electronic device including the second type hinge structure is in the unfolded state, and view 1602 is a view illustrating a partial area, in which the wing plates and the rotation members are disposed in view 1601, and view 1603 is a view illustrating an example of a cross section taken along A5-A5', among the areas, in which the rotation members are positions in view 1602.

FIGS. 11 to 16C, the electronic device 1000, for example, may include a first housing 1010 and a second housing 1020, and may include at least a first rotation member 1111 and a second rotation member 1112 included in the hinge structure which connects the first housing 1010 and the second housing 1020.

The first rotation member 1111, for example, may include a first rotation body 1111_a_, a first rail structure 1111_b_ and a second rail structure 1111_c_ which are disposed on the left and right sides with respect to the first rotation body 1111_a_. At least one through-hole (or a groove) which is used for coupling to the first wing plate 1031 may be formed in the first rotation body 1111_a_. Correspondingly, holes corresponding to the through-holes formed in the first rotation body 1111_a_ also may be formed in the first wing plate 1031. After the hole formed in the first wing plate 1031 and the through-hole formed in the first rotation body 1111_a_ are aligned, an additional structure (e.g., a fastening member, such as a screw) may be used to fasten the first wing plate 1031 and the first rotation body 1111_a_.

Similar to the first rotation member 1111, for example, the second rotation member 1112 may include a second rotation body 1112_a_, and a third rail structure 1112_b_ and a fourth rail structure 1112_c_ which are disposed on the left and right sides with respect to the second rotation body 1112_a_. The second rotation body 1112_a_ may include at least one through-hole (or a groove) which is used for coupling to the second wing plate 1032, and may be aligned with the holes formed in the second wing plate 1032 in the z-axis direction. After the hole formed in the second wing plate 1032 and the through-hole formed in the second rotation body 1112_a_ are aligned, an additional structure (e.g., a fastening member, such as a screw) may be used to fasten the second wing plate 1032 and the second rotation body 1112_a_.

Meanwhile, the first wing plate and the second wing plate 1032 may be coupled to the rotation members disposed in various positions. For example, referring to FIG. 11, the rotation members disposed in the three hinge structures 1100_a_, 1100_b_, and 1100_c_, respectively, may be coupled to the wing plates 1031 and 1032.

Figure 17B:
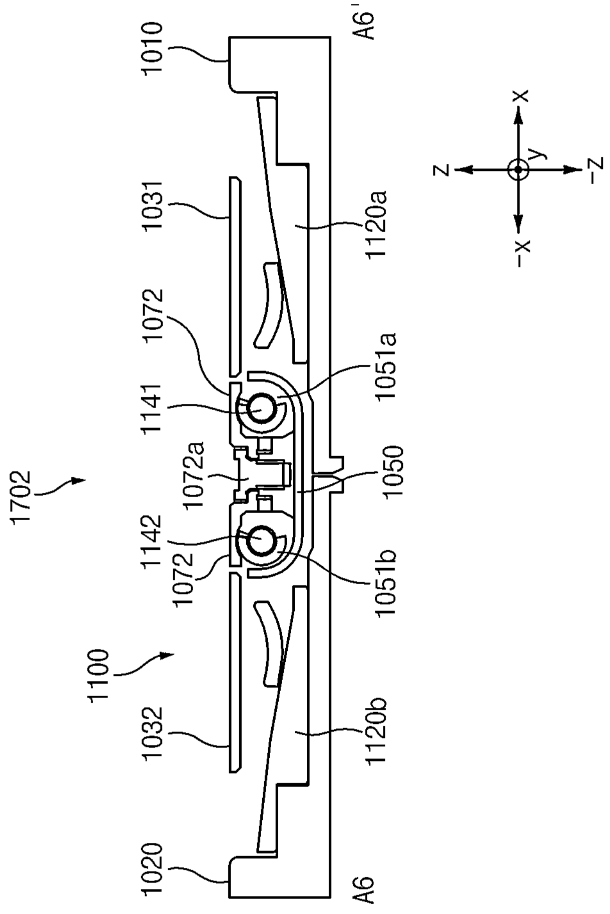
FIGS. 17A and 17B are views illustrating an example of a disposition form of a center plate and wing plate according to an embodiment.
Figure 17A:
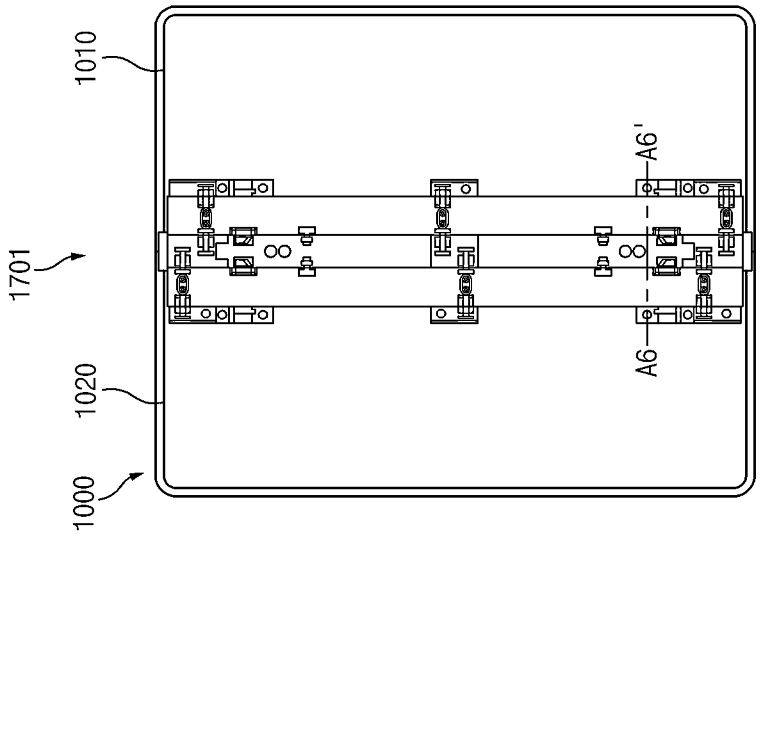

FIGS. 17A and 17B are views illustrating an example of a disposition form of the center plate and the wing plate according to an embodiment. In FIGS. 17A and 17B, view 1701 illustrates an example of a front surface of the housing, on which the display is disposed when the electronic device including the second type hinge structure is in the unfolded state, and view 1702 is a view illustrating an example of cross-section A6-A6' of an area, in which the second type hinge structure is positioned in view 1701.

Referring to FIGS. 11 to 17B, the electronic device 1000 may include a first housing 1010, a second housing 1020, and a hinge structure 1100. Furthermore, the electronic device 1000 may include center plates 1071 and 1072 which are disposed in the boundary area of the first housing 1010 and the second housing 1020 in the unfolded (open) state, and wing plates 1031 and 1032. The center plates 1071 and 1072 and the wing plates 1031 and 1032 may be disposed to cover at least a portion of the hinge structure 1100.

For example, the center plates 1071 and 1072 may be disposed long in the y-axis direction at a central portion (e.g., an area corresponding to a width of the hinge housing 1050) of the hinge structure 1100. For example, the center plates 1071 and 1072 may be fixed to one side of the hinge structure 1100. For example, the center plates 1071 and 1072 may be coupled to a hole structure which is opened in the z-axis direction in the shaft fixing part 1161 or the shaft holder 1162 described in FIG. 11 by using a fastening member 1072_a_. The central area (e.g., the third area 1063) of the display 1060 may be disposed on the center plates 1071 and 1072. A first shaft 1141 and a second shaft 1142, a first elastic member 1181, through which the first shaft 1141 is disposed to pass, and a second elastic member 1182, through which the second shaft 1142 is disposed to pass, may be disposed between lower portions of the center plates 1071 and 1072 and the hinge housing 1050.

The wing plates 1031 and 1032, for example, may include a first wing plate 1031 which is disposed in the x-axis direction with respect to the center plates 1071 and 1072 or the hinge structure 1100, and a second wing plate 1032 which is disposed in the −x-axis direction. When the electronic device 1000 is in the unfolded (open) state, a −x-axis periphery of the first wing plate 1031 may be disposed adjacent to peripheries (e.g., x-axis peripheries) of the center plates 1071 and 1072. When the electronic device 1000 is in the unfolded (open) state, an x-axis periphery of the second wing plate 1032 may be disposed adjacent to the peripheries (e.g., the −x-axis peripheries) of the center plates 1071 and 1072. At least a portion of the first link member 1120_a_ and at least a portion of the second link member 1120_b_ may be disposed on a lower side of the wing plates 1031 and 1032.

Meanwhile, a spiral structure (e.g., the interlocking member 1133, the first spiral structure 1131_d_, and the second spiral structure 1132_d_) described above in FIGS. 11 to 15 may be replaced with the gear structure of the electronic device previously described in FIGS. 1 to 10.

Figure 18:
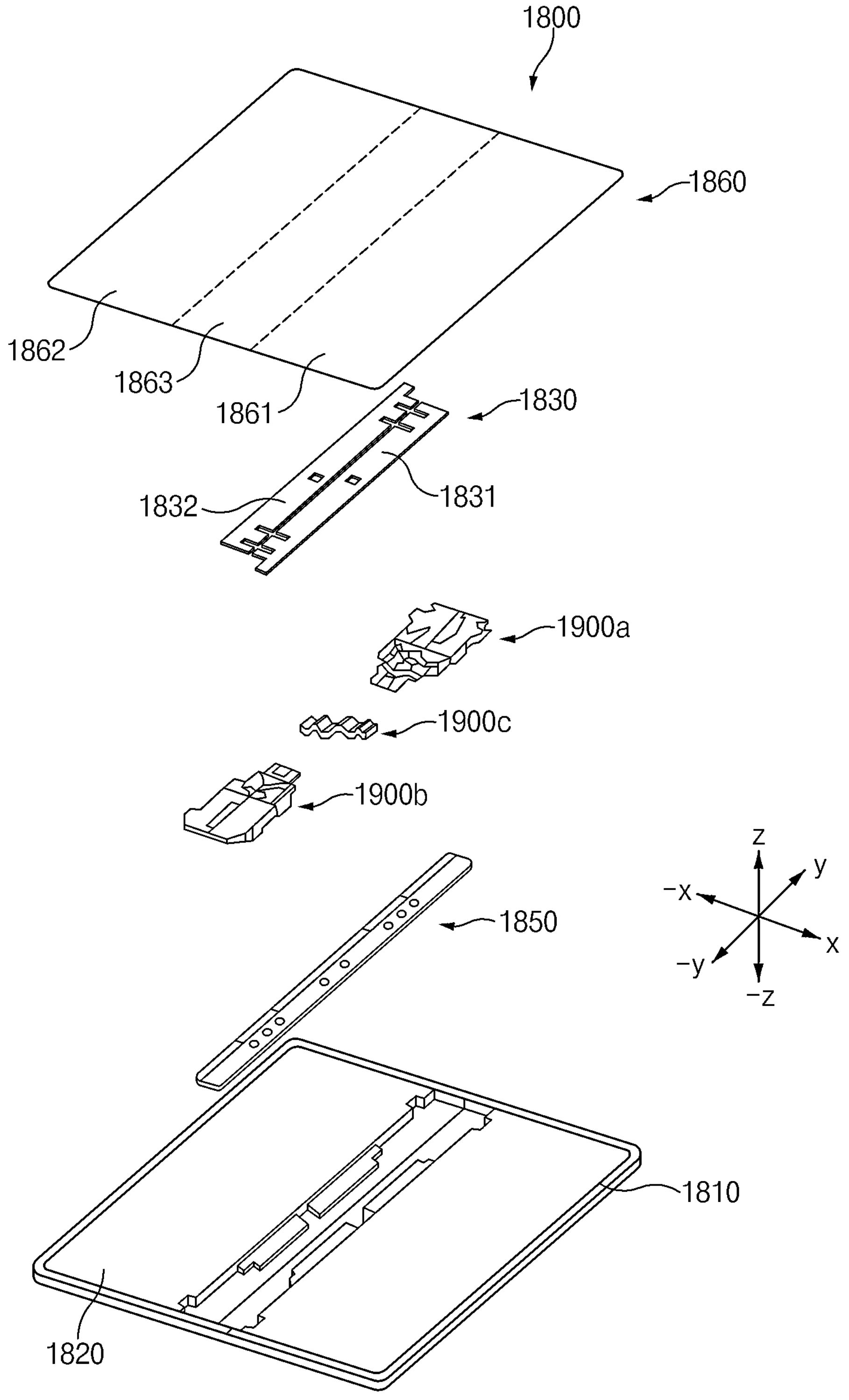
FIG. 18 is an exploded perspective view of an electronic device, to which a third type hinge structure is applied, according to an embodiment.
Figure 19A:
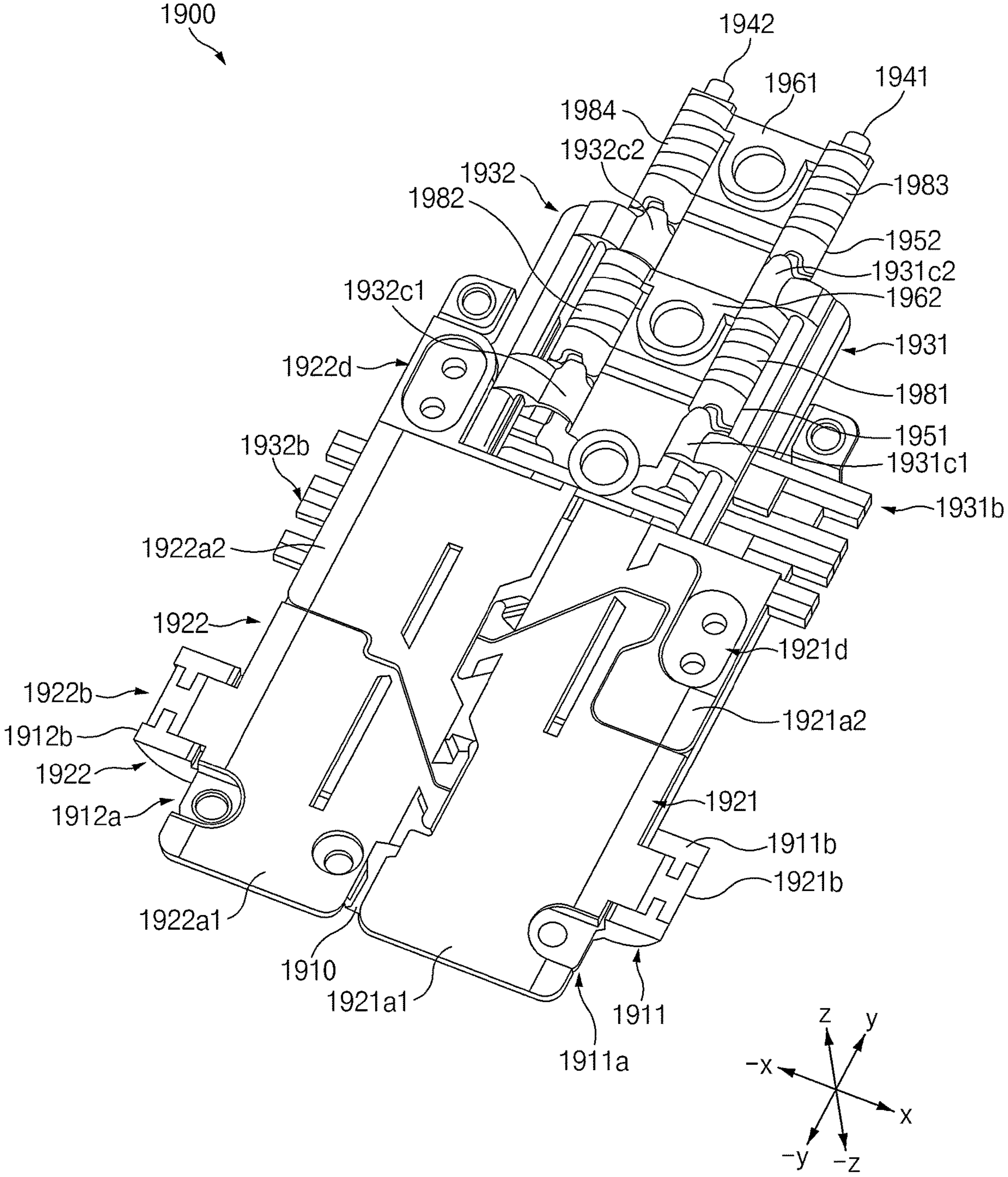
FIG. 19A is a perspective view illustrating an external appearance of a third type hinge structure applied to FIG. 18 according to an embodiment.

FIG. 18 is a view illustrating an exploded perspective view of the electronic device, to which the third type hinge structure is applied, according to an embodiment, and FIG. 19A is a view illustrating an example of an external appearance of the third type hinge structure applied to FIG. 18.

Referring to FIGS. 18 and 19A, an electronic device 1800 may include a first housing 1810, a second housing 1820, a hinge housing 1850, at least one hinge structure 1900_a_, 1900_b_, and 1900_c_, a wing plate 1830, and a display 1860.

As an example, in the electronic device 1800, at least one of the wing plates 1831 and 1832 (or plates), the display 1860, and at least one hinge structure 1900_a_, 1900_b_, and 1900_c_ may be omitted. For example, in the electronic device 1000, the wing plates 1831 and 1832 may be omitted, and the electronic device 1000 may include only at least one hinge structure 1900_a_, 1900_b_, and 1900_c_, a display 1860, and housings 1810 and 1820.

The first housing, the second housing, the hinge housing 1850, the wing plates 1830, and the display 1860 have the same or similar configurations as the configurations of the electronic device 1800 described above with reference to FIGS. 1 to 17, and a detailed description thereof will be replaced with the contents described above. For example, the display 1860 may include a first area 1861 and a second area 1862 which maintain a flat shape in the folded (closed) state or the unfolded (open) state, and a third area 1863 which forms a water drop shape in the folded (closed) state. The third type hinge structure described in FIG. 19A may correspond to at least some (e.g., the first hinge structure 1900*a* and the second hinge structure 1900*b*) of the at least one hinge structure illustrated in FIG. 18.

Figure 19B:
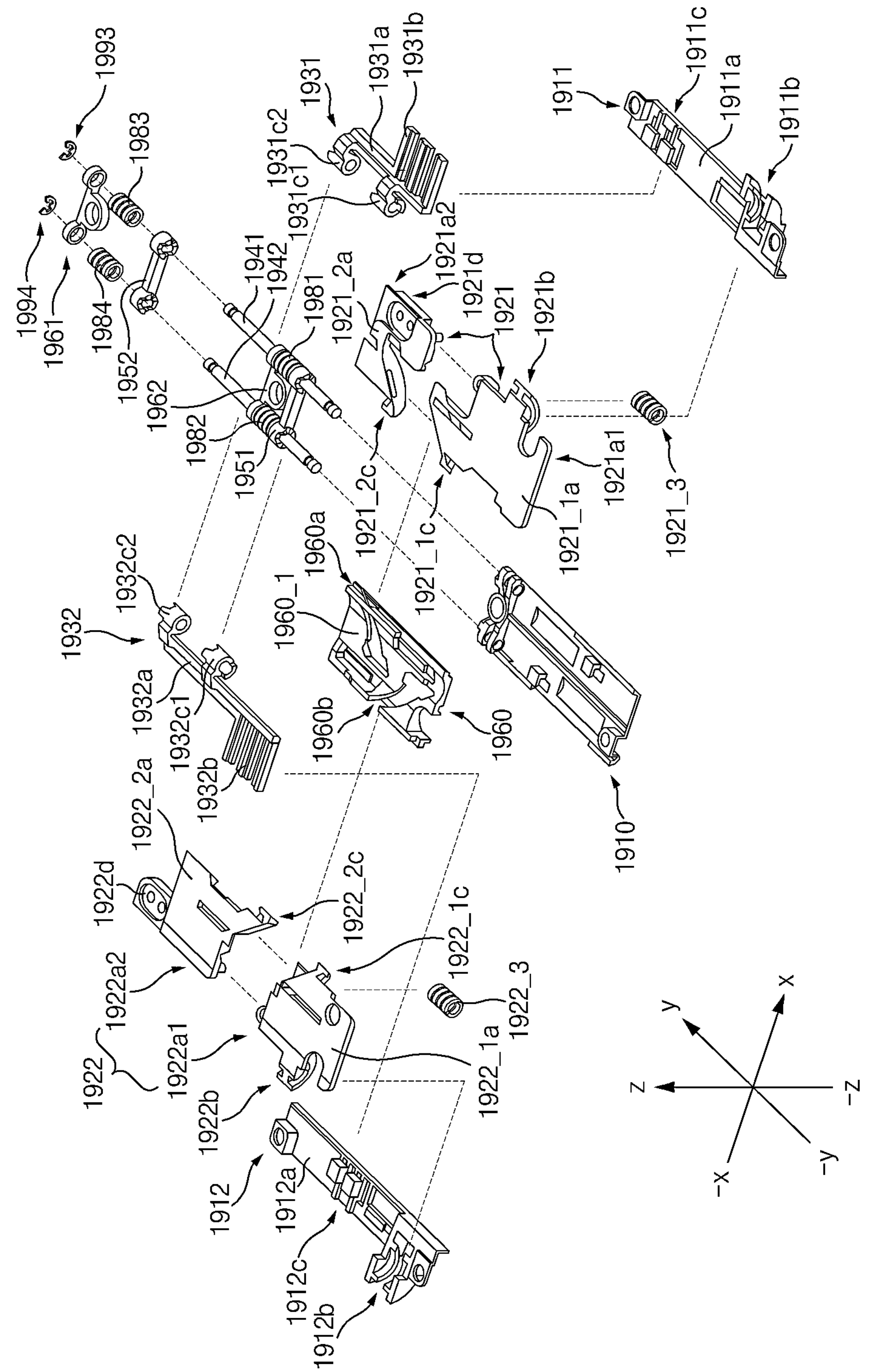
FIG. 19B is an exploded perspective view of a third type hinge structure applied to FIG. 18 according to an embodiment in a first direction.
Figure 19C:
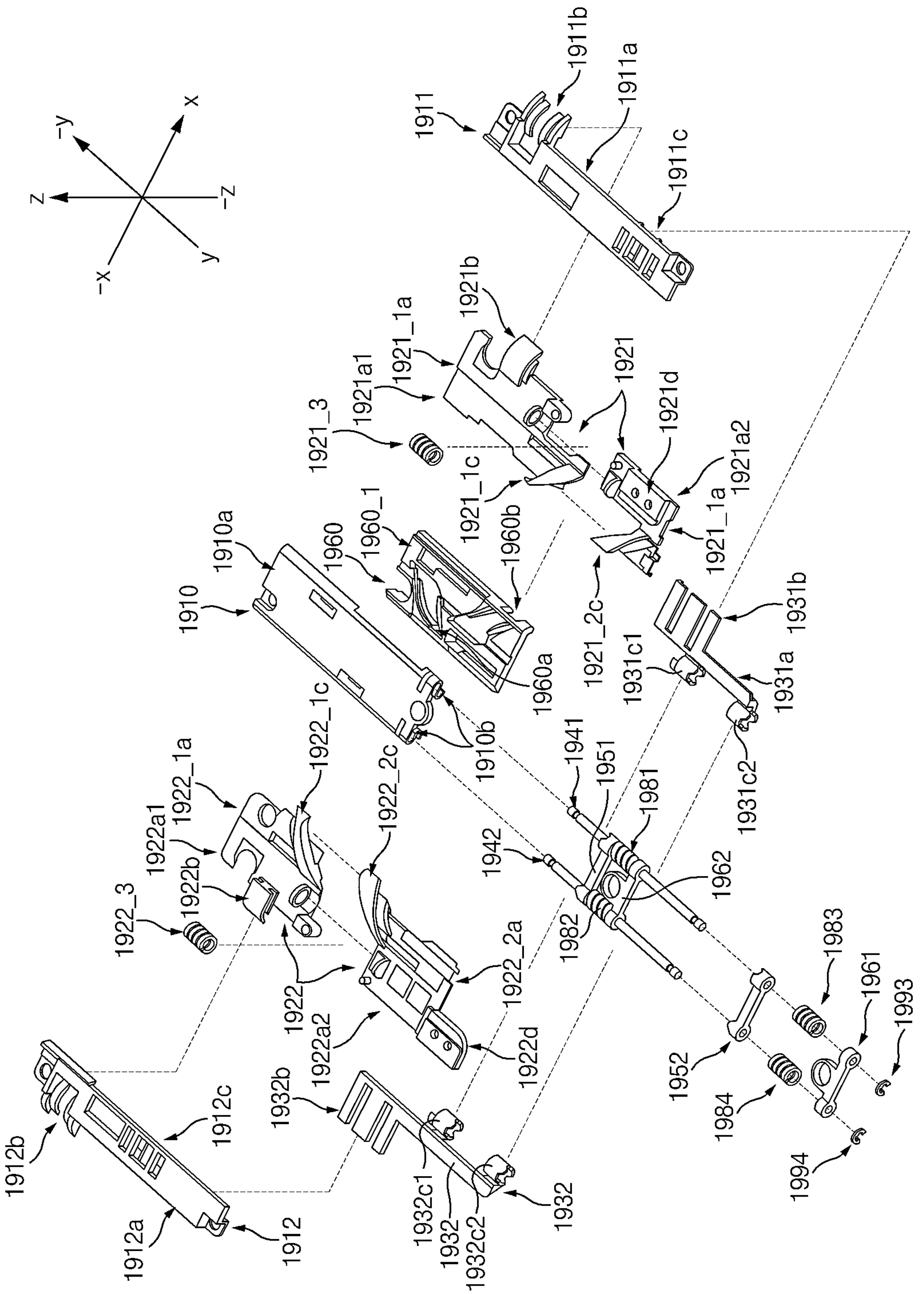
FIG. 19C is an exploded perspective view of a third type hinge structure applied to FIG. 18 according to an embodiment in a second direction.

FIG. 19B is a first directional exploded perspective view of the third type hinge structure applied to FIG. 18 according to an embodiment, and FIG. 19C is a second directional exploded perspective view of the third type hinge structure applied to FIG. 18 according to an embodiment.

Referring to FIGS. 18 to 19C, the third type hinge structure 1900 may include a fixing bracket 1910, a first rotation member 1921, a second rotation member 1922, a first link member 1911, a second link member 1912, a first arm member 1931, a second arm member 1932, a first shaft fixing part 1961, a second shaft fixing part 1962, a first cam member 1951, a second cam member 1952, first to fourth elastic members 1981, 1982, 1983, and 1984, and an interlocking member 160. Prior to a description, the first shaft fixing part 1961, the second shaft fixing part 1962, the first cam member 1951, the second cam member 1952, and the first to fourth elastic members 1981, 1982, 1983, and 1984, which are disposed on the third type hinge structure 1900 may have the same or similar operations and structure as those of the shaft fixing part, the shaft holder, the cam members, and the elastic members previously described in FIG. 11.

The fixing bracket 1910 may include a bracket body 1910*a*, on which an interlocking member 1960 is positioned, and a shaft holder 1910*b* which is formed at a y-axis periphery of the bracket body 1910*a* and holds peripheries (e.g., −y-axis peripheries) of a first shaft 1941 and a second shaft 1942. The bracket body 1910*a* may have a length in the y-axis direction which is larger than the length in the x-axis direction, and may have a shape, in which at least a portion thereof corresponds to a surface of the interlocking member 1960 in the −z-axis direction so that the interlocking member 1960 may be positioned thereon. The shaft holder 1910*b* may include a groove or hole area, into which the first shaft 1941 is inserted, and a groove or hole area, into which the second shaft 1942 is inserted. On one side of the shaft holder 1910*b*, side grooves or holes, into which a fixing member (e.g., an E-ring) is inserted, may be formed so that the first shaft 1941 and the second shaft 1942, which are held, do not deviate from the corresponding grooves or holes.

The interlocking member 1960 may include an interlocking body 1960_1 which is disposed on an upper surface (e.g., one side in the z-axis direction) of the fixing bracket 1910, a first spiral groove 1960*a* (or a hole), and a second spiral groove 1960*b* (or a hole). For example, the interlocking body 1960_1 may have a size which is similar to the size of the upper surface of the fixing bracket 1910 or smaller than the size of the upper surface of the fixing bracket 1910 to be positioned on the fixing bracket 1910. The interlocking body 1960_1 of the interlocking member 1960 may be disposed to be moved linearly in the y-axis or −y-axis direction on the upper surface of the fixing bracket 1910. The interlocking body 1960_1 may interlock the first rotation member 1921 and the second rotation member 1922 while converting the rotation of the first rotation member 1921 and the second rotation member 1922 into a linear movement.

The first spiral groove 1960*a* may be formed in a shape of a groove or hole which is curved in a diagonal direction on one side of the interlocking body 1960_1, and may be fastened to the first spiral rail structure (e.g., a first lower spiral rail structure 1921_1*c* and a first upper spiral rail structure 1921_2*c*) of the first rotation member 1921. The second spiral groove 1960*b* may be formed in a shape of a groove or hole which is curved in a diagonal direction on an opposite side of the interlocking body 1960_1, and may be fastened to the second spiral rail structure (e.g., a second lower spiral rail structure 1922_1*c* and a second upper spiral rail structure 1922_2*c*) of the second rotation member 1922. While the first rotation member 1921 and the second rotation member 1922 are rotated counterclockwise and clockwise, respectively, the first spiral rail structures 1921_1*c* and 1921_2*c* may be rotated along the first spiral groove 1960*a*, and the second spiral rail structure 1922_1*c* and 1922_2*c* may be rotated along the second spiral groove 1960*b*. In correspondence to the rotation of the first spiral rail structures 1921_1*c* and 1921_2*c* and the second spiral rail structures 1922_1*c* and 1922_2*c*, the interlocking member 1960 may be moved linearly in the y-axis or −y-axis direction.

The first rotation member 1921 may include a first lower rotation member 1921*a*1 and a first upper rotation member 1921*a*2, and a first rotation elastic member 1921_3 which is disposed between the first lower rotation member 1921*a*1 and the first upper rotation member 1921*a*2. The first lower rotation member 1921*a*1 may include a first lower rotation body 1921_1*a*. of which a length in the y-axis direction is larger than that in the x-axis direction and of which an upper surface has a flat shape, a first lower spiral rail structure 1921_1*c* which is disposed in a −x-axis periphery (or a corner between the −x-axis and the y-axis) area of the first lower rotation body 1921_1*a*, protrudes in the −z-axis direction, and is formed in a diagonal shape in a diagonal direction of the xy plane, and an arc-shaped or half-moon-shaped first rail structure 1921*b* which protrudes in the −z-axis direction from an x-axis periphery of the first lower rotation body 1921_1*a*. The first upper rotation member 1921*a*2 may include a first upper rotation body 1921_2*a*, an upper surface of which is formed flat, a first upper spiral rail structure 1921_2*c* which is formed at a −x-axis periphery (or a corner in the −x-axis and −y-axis directions) of the first upper rotation body 1921_2*a*, protrudes in the −z-axis direction, and is formed in a diagonal direction of the xy plane, and a first plate coupling part 1921*d* which is used for coupling of the first upper rotation body 1921_2*a* to the housing or a separate support plate (e.g., the first wing plate 1831). The first lower spiral rail structure 1921_1*c* may be fastened to the first spiral groove 1960*a* formed on one side of the interlocking member 1960 after being coupled to the first upper spiral rail structure 1921_2*c*.

The second rotation member 1922 may include a second lower rotation member 1922*a*1 and a second upper rotation member 1922*a*2, and a second rotation elastic member 1922_3 which is disposed between the second lower rotation member 1922*a*1 and the second upper rotation member 1922*a*2. Similar to the first lower rotation member 1921*a*1, the second lower rotation member 1922*a*1 may include a second lower rotation body 1922_1*a*. of which a length in the y-axis direction is larger than that in the x-axis direction and of which an upper surface has a flat shape, a second lower spiral rail structure 1922_1*c* which is disposed in a x-axis periphery (or a corner between the x-axis and the y-axis) area of the second lower rotation body 1922_1_a_, protrudes in the −z-axis direction, and is formed in a diagonal shape in a diagonal direction of the xy plane, and an arc-shaped or half-moon-shaped second rail structure 1922_b_ which protrudes in the −z-axis direction from a −x-axis periphery of the second lower rotation body 1922_1_a_. The second upper rotation member 1922_a_2 may include a second upper rotation body 1922_2_a_, an upper surface of which is formed flat, a second upper spiral rail structure 1922_2_c_ which is formed at an x-axis periphery (or a corner in the x-axis and −y-axis directions) of the second upper rotation body 1922_2_a_, protrudes in the −z-axis direction, and is formed in a diagonal direction of the xy plane, and a second plate coupling part 1972_d_ which is used for coupling of the second rotation member 1922 (or the second first upper rotation member 1922_2_a_) to the housing or a separate support plate (e.g., the second wing plate 1832). The second lower spiral rail structure 1922_1_c_ may be coupled to the second upper spiral rail structure 1922_2_c_ and may be seated in the second spiral groove 1960_b_.

The first link member 1911 may include a first link body 1911_a_, a first rail 1911_b_ which is disposed on one side (e.g., a −y-axis periphery) of the first link body 1911_a_ and is fastened to the first rail structure 1921_b_ of the first rotation member 1921 (or the first lower rotation member 1921_a_1), and a first slide holding part 1911_c_ which is disposed on an opposite side (e.g., a y-axis periphery) of the first link body 1911_a_ and is fastened to the first arm member 1931. While the first rotation member 1921 having the first rail structure 1921_b_ fastened to the first rail 1911_b_ is rotated counter-clockwise, the first link member 1911 may rotate the first slide structure 1931_b_ of the first arm member 1931 while being rotated in the same counterclockwise direction. When the first slide structure 1931_b_ is rotated, the first arm member 1931 may be rotated counterclockwise. As described above, the first link member 1911 may transmit a rotational force of the first rotation member 1921 to the first arm member 1931 to support the first rotation member 1921 and the first arm member 1931 while the first arm member 1931 is rotated in correspondence to the rotation of the first rotation member 1921.

The second link member 1912 may include a second link body 1912_a_, a second rail 1912_b_ which is disposed on one side (e.g., a −y-axis periphery) of the second link body 1912_a_, and is fastened to the second rail structure 1922_b_ of the second rotation member 1922 (or the second lower rotation member 1922_a_1) similar to the first link member 1911, and a second slide holding part 1912_c_ which is disposed on an opposite side (e.g., a y-axis periphery) of the second link body 1912_a_ and is fastened to the second arm member 1932. While the second rotation member 1922 having the second rail structure 1922_b_ fastened to the second rail 1912_b_ is rotated clockwise, the second link member 1912 may rotate the second slide structure 1932_b_ of the second arm member 1932 while being rotated in the same clockwise direction. When the second slide structure 1932_b_ is rotated, the second arm member 1932 may be rotated clockwise. As described above, the second link member 1912 may transmit a rotational force of the second rotation member 1922 to the second arm member 1932 to support the second rotation member 1922 and the second arm member 1932 while the second arm member 1932 is rotated in correspondence to the rotation of the second rotation member 1922.

The first arm member 1931 may be coupled to the first link member 1911 and may perform a cam operation while being moved in correspondence to the rotation of the first link member 1911. In this regard, the first arm member 1931 includes a first shaft holding part 1931_c_1, into which the first shaft 1941 is inserted and a second shaft holding part 1931_c_2, and a cam structure formed in at least one of the first shaft holding part 1931_c_1 and the second shaft holding part 1931_c_2 may be disposed in a coupled state to a first cam disposed on one side of the first cam member 1951 and a second cam disposed on one side of the second cam member 1952. The first shaft holding part 1931_c_1 and the second shaft holding part 1931_c_2 may be disposed to be spaced apart from each other at a specific interval.

The second arm member 1932 may be coupled to the second link member 1912, and may perform a cam operation while being moved in correspondence to the rotation of the second link member 1912. In this regard, the second arm member 1932 includes a third shaft holding part 1932_c_1, into which the second shaft 1942 is inserted, and a fourth shaft holding part 1932_c_2, and a cam structure formed in at least one of the third shaft holding part 1932_c_1 and the fourth shaft holding part 1932_c_2 may be disposed in a coupled state to a third cam disposed on an opposite side of the first cam member 1951 and a fourth cam disposed on an opposite side of the second cam member 1952. The third shaft holding part 1932_c_1 and the fourth shaft holding part 1932_c_2 may be disposed to be spaced apart from each other at a specific interval.

Figure 20:
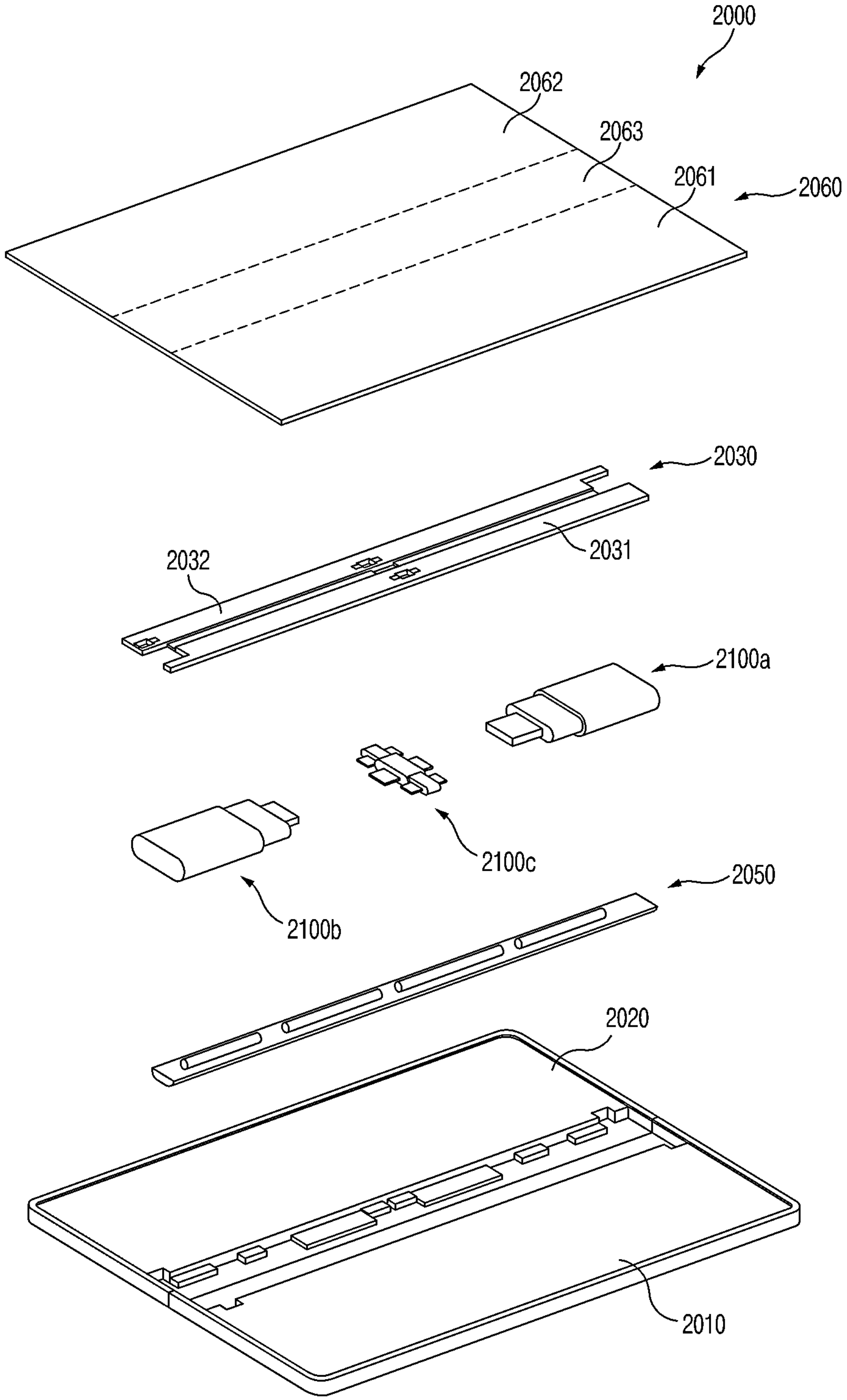
FIG. 20 is an exploded perspective view of an electronic device, to which a fourth type hinge structure is applied, according to an embodiment.
Figure 21:
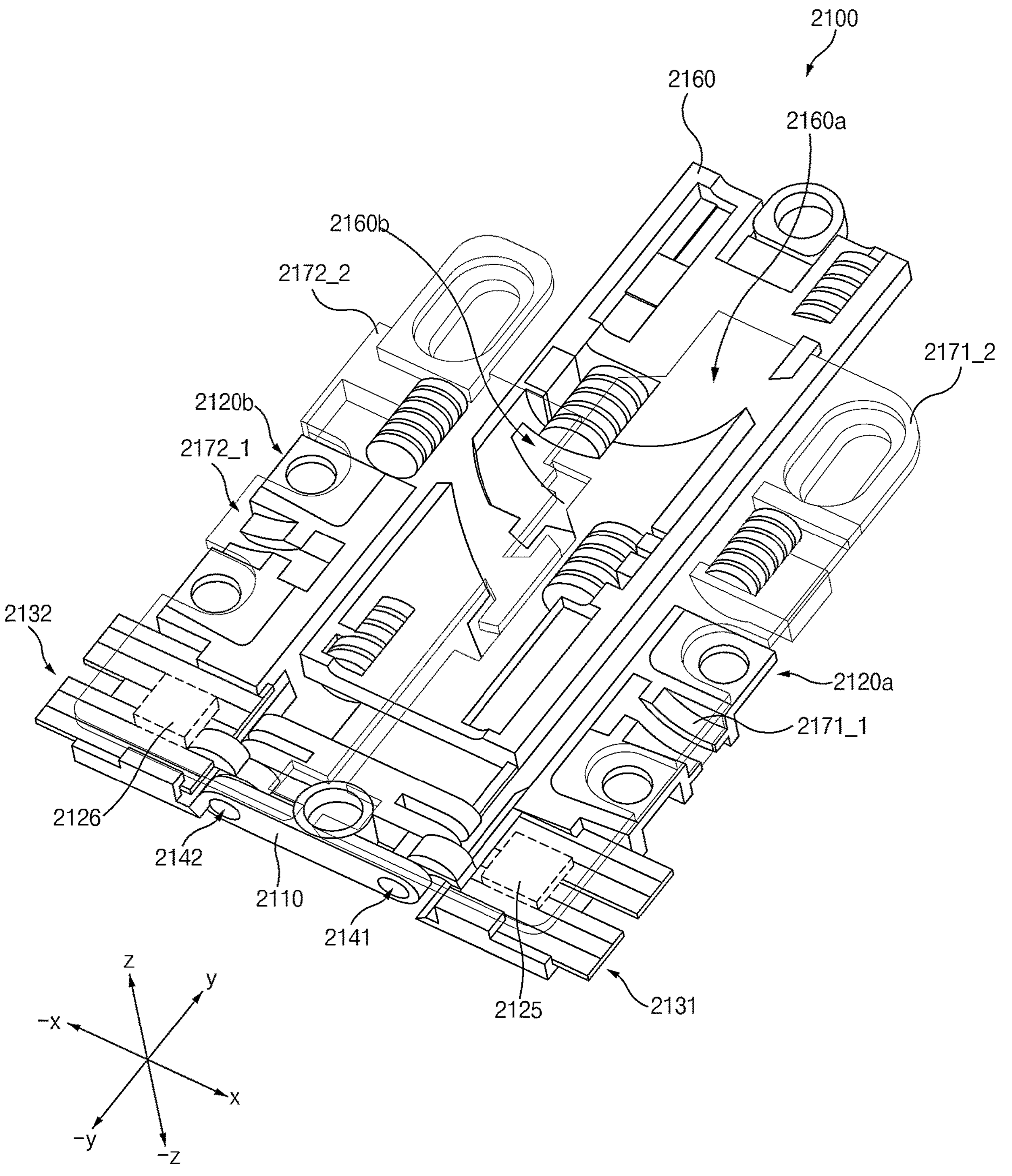
FIG. 21 is a perspective view illustrating an external appearance of a fourth type hinge structure applied to FIG. 20 according to an embodiment.
Figure 22:
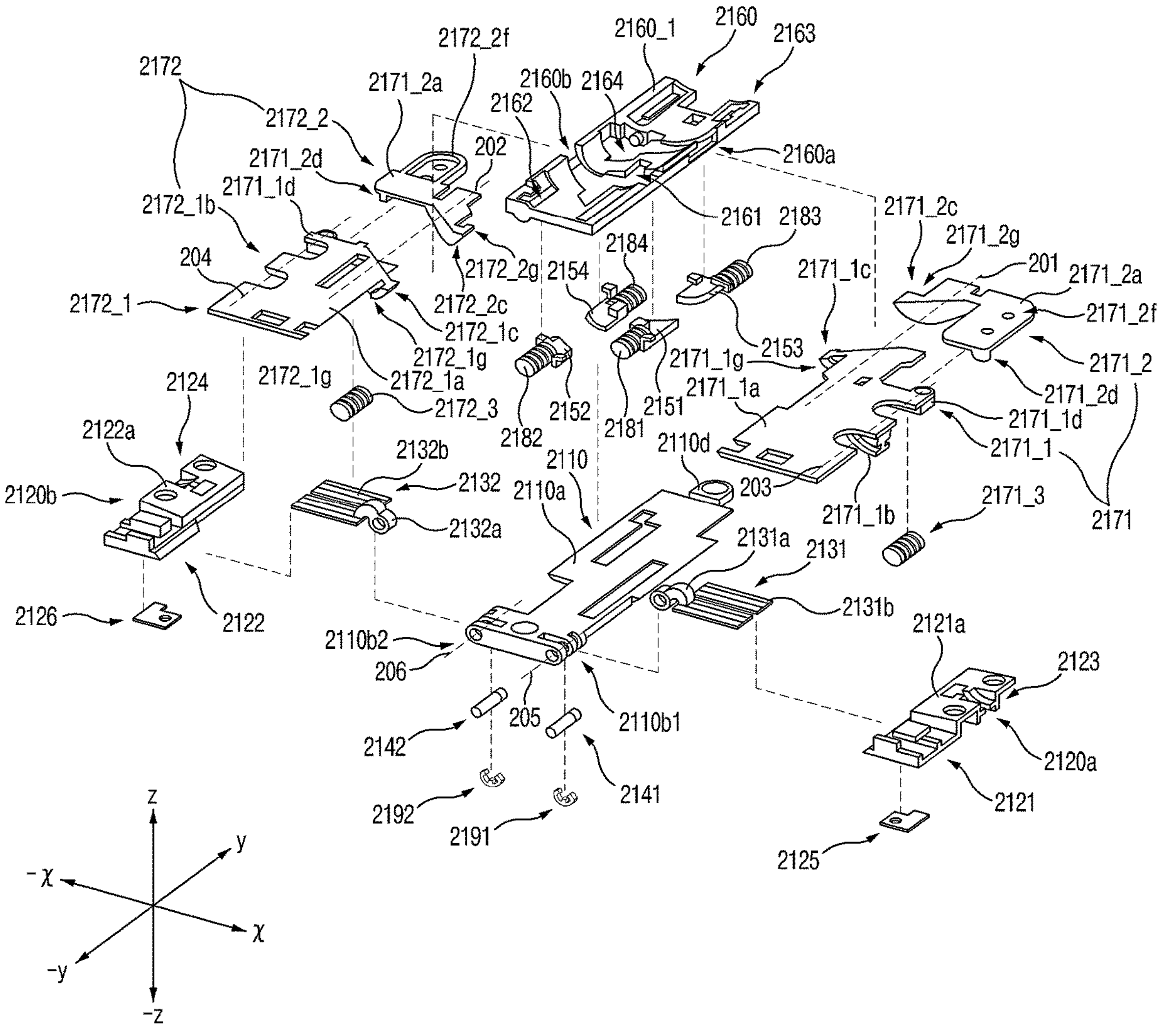
FIG. 22 is an exploded perspective view of a fourth type hinge structure according to an embodiment in a first direction.
Figure 23:
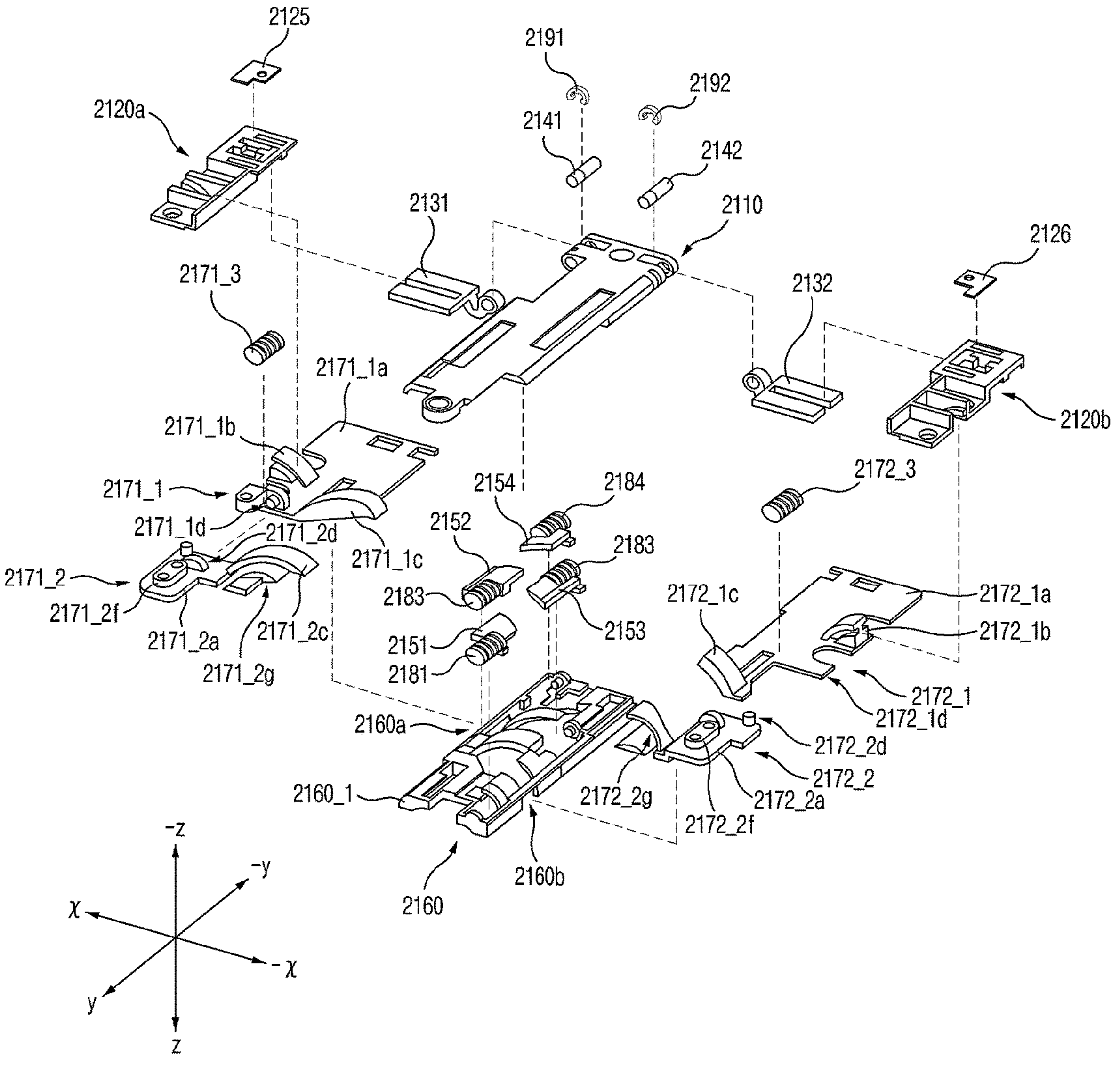
FIG. 23 is an exploded perspective view of a fourth type hinge structure according to an embodiment in a second direction.
Figure 24:
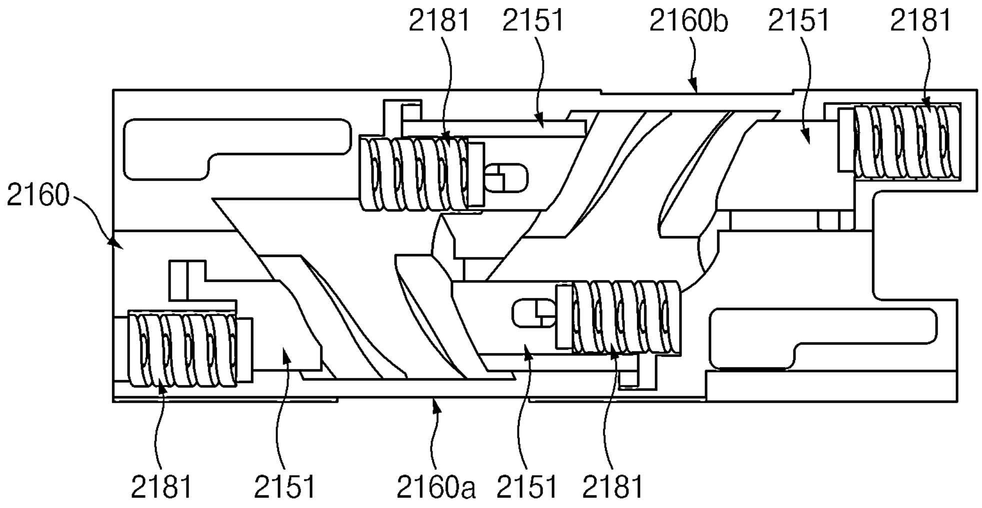
FIG. 24 is a view illustrating an example of an interlocking member of a fourth hinge structure according to an embodiment.
Figure 25:
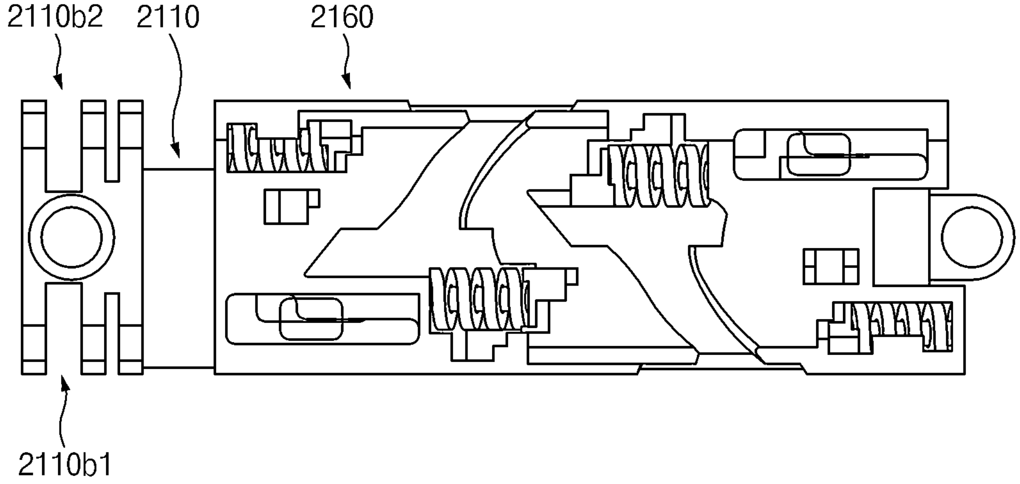
FIG. 25 is a view illustrating an example of an interlocking member and a fixing bracket of a fourth type hinge structure according to an embodiment.

FIG. 20 is a view illustrating an exploded perspective view of the electronic device, to which the fourth type hinge structure is applied, according to an embodiment, and FIG. 20 is a view illustrating an example of an external appearance of the fourth type hinge structure applied to FIG. 20. FIG. 22 is a first directional exploded perspective view of the fourth type hinge structure according to an embodiment, and FIG. 14 is a second directional exploded perspective view of the fourth type hinge structure according to an embodiment. FIG. 24 is a view illustrating an example of the interlocking member of the fourth type hinge structure according to an embodiment, and FIG. 25 is a view illustrating an example of the interlocking member and the fixing bracket of the fourth type hinge structure according to an embodiment.

Referring to FIGS. 20 to 25, an electronic device 2000 according to an embodiment may include a first housing 2010 and a second housing 2020, a hinge housing 2050, hinge structures 2100_a_, 2100_b_, and 2100_c_, wing plates 2030: 2031 and 2032, and a display 2060. For example, a length of the electronic device 2000 in the x-axis direction may be smaller than a length thereof in the y-axis direction. As an example, the electronic device 2000 may include only the remaining structures, except for the wing plates 2030.

The display 2060 may have a length in the x-axis direction which is smaller than a length in the y-axis direction, and may have the folded (closed) state or the unfolded (open) state with respect to a point in the x-axis direction (e.g., a center point of an x-axis width). The display 2060 may include a first area 2061 which is supported by the first housing 1010, a second area 2062 which is supported by the second housing 2020, a third area 2063 (or a folding area) which is disposed between the first area 2061 and the second area 2062. At least one lattice pattern may be formed at at least a portion of a rear surface of the display 2060 in the third area 2063. The display 2060 may be formed as any one of the various types of displays previously described in FIGS. 2A-2F and 3A-3C.

The wing plates 2031 and 2032 may include a first wing plate 2031 and a second wing plate 2032 which are disposed on a lower side of the third area 2063 of the rear surface of the display 2060. The first wing plate 2031 and the second wing plate 2032 may be disposed adjacent to each other with respect to the x-axis. Alternatively, when the electronic device 2000 is in the unfolded (open) state, the first wing plate 2031 and the second wing plate 2032 may be maintained in a state, in which there is no separate structure or a state, in which they are closely adjacent to each other.

The first housing 2010 and the second housing 2020 may have the same or similar configuration to those of the housings previously described in FIG. 1 or FIG. 11, and a detailed description thereof will be replaced with the previously described contents.

Hinge structures 2100*a*, 2100*b*, and 2100*c*, for example, may include a first hinge structure 2100*a*, at least a portion of which is seated at a −y-axis periphery of the hinge housing 2050, a second hinge structure 2100*b*, at least a portion of which is seated at a y-axis periphery of the hinge housing 2050, and a third hinge structure 2100*c* which is disposed between the first hinge structure 2100*a* and the second hinge structure 2100*b*. The first hinge structure 2100*a* and the second hinge structure 2100*b* may have substantially the same shape and size, and may be disposed in different directions. The third hinge structure 2100*c* may include some configurations of the first hinge structure 2100*a* (or the second hinge structure 2100*b*). Meanwhile, the fourth type hinge structure 2100 illustrated in FIGS. 21 to 23 may be any one of the first hinge structure 2100*a* and the second hinge structure 2100*b* described in FIG. 20.

The fourth type hinge structure 2100 may include a fixing bracket 2110, a first rotation member 2131, a second rotation member 2132, a first link member 2120*a*, a second link member 2120*b*, a first arm member 2171, a second arm member 2172, an interlocking member 2133, cam members 2151, 2152, 2153, and 2154, and elastic members 2181, 2182, 2183, and 2184.

The fixing bracket 2110 may include a bracket body 2110*a*, on which the interlocking member 2160 is positioned, rotation/fastening parts 2110*b*1 and 2110*b*2, to which the rotation members 2131 and 2132 are fastened, and a bracket fixing part 2110*d* for fixing the fixing bracket 2110 to the hinge housing 2050. The bracket body 2110*a* may have a length in the y-axis direction which is larger than the length in the x-axis direction, and may have a shape, in which at least a portion thereof corresponds to a surface of the interlocking member 2160 in the −z-axis direction so that the interlocking member 2160 may be positioned thereon. The rotation/fastening parts 2110*b*1 and 2110*b*2 may be located in the −y-axis direction of the bracket body 2110*a*. The rotation/fastening parts 2110*b*1 and 2110*b*2 may include a first rotation/fastening part 2110*b*1, into which the first rotation member 2131 is inserted, and a second rotation/fastening part 2110*b*2, into which the second rotation member 2132 is inserted. The first rotation/fastening part 2110*b*1 may include a first opening which is formed in the x-axis or −x-axis direction so that one side of the first rotation member 2131 may be inserted thereinto and coupled thereto, and a first through-hole which passes in the y-axis or −y-axis direction so that the first shaft 2141 coupled to the first rotation member 2131 mounted in the opening of the side wall which defines the opening may be inserted thereinto. The first rotation member 2131 may be rotated about the first axis corresponding to a center point of the first shaft 2141. The second rotation/fastening part 2110*b*2 may have a structure which is substantially the same or similar to that of the first rotation/fastening part 2110*b*1. For example, the second rotation/fastening part 2110*b*2 may include a second opening formed in the −x-axis direction, and a second through-hole which is formed, among the side walls which define the second opening, in the side wall located in the −y-axis direction, and into which the second shaft 2142 which is used to fix the second rotation member 2132 coupled to the second opening is inserted. The second rotation member 2132 may be rotated about the second axis corresponding to a center point of the second shaft 2142.

The first rotation member 2131 may include a first rotation holding part 2131*a* which is fastened to a first rotation/fastening part 2110*b*1, and a first slide structure 2131*b* which extends in the x-axis direction from the first rotation holding part 2131*a*. The first rotation holding part 2131*a*, for example, may include a through-hole which passes in the y-axis direction, and may be inserted into the first rotation/fastening part 2110*b*1, aligned with the first through-hole, and then fixed by the first shaft 2141. Correspondingly, a size of the through-hole of the first rotation holding part 2131*a* may be a size corresponding to a size of the first through-hole of the first rotation/fastening part 2110*b*1 and a diameter of the first shaft 2141. The first slide structure 2131*b* may include a plurality of slide bars which are connected to the first rotation holding part 2131*a* and have a specific length in the x-axis direction. However, the electronic device 2000 of the disclosure is not limited to the number of the slide bars included in the first slide structure 2131*b* described above. For example, the first slide structure 2131*b* may include one slide bar or three or more slide bars. The first slide structure 2131*b* may be seated on the first slide holding part 2121 formed on the first link member 2120*a*, and may be moved linearly in the x-axis or the −x-axis direction in the first slide holding part 2121.

The second rotation member 2132 may include a second rotation holding part 2132*a* which is fastened to a second rotation/fastening part 2110*b*2, and a second slide structure 2132*b* which are disposed in the −x-axis direction from the second rotation holding part 2132*a*. The second rotation holding part 2132*a*, for example, may include a through-hole which passes in the y-axis direction, and may be inserted into the second rotation/fastening part 2110*b*2, aligned with the second through-hole of the second rotation/fastening part 2110*b*2, and then fixed by the second shaft 2142. Correspondingly, a size of the through-hole of the second rotation holding part 2132*a* may be a size corresponding to a size of the second through-hole of the second rotation/fastening part 2110*b*2 and a diameter of the second shaft 2142. Alternatively, the second rotation holding part 2132*a* may have the same or similar structure to that of the first rotation holding part 2131*a*. The second slide structure 2132*b* may include a plurality of slide bars which are connected to the second rotation holding part 2132*a* and have a specific length in the −x-axis direction. The number of slide bars of the second slide structure 2132*b* may vary. The second slide structure 2132*b* may be seated on the second slide holding part 2122 formed on the second link member 2120*b*, and may be moved linearly in the −x-axis or the x-axis direction in the second slide holding part 2122.

The first link member 2120*a* may include a first link body 2121*a*, a first slide holding part 2121 which is fastened to the first slide structure 2131*b* of the first rotation member 2131, and a first rail 2123 which is fastened to a rail structure provided on one side of the first arm member 2171. The first link body 2121*a* has a panel shape having a specific area and width and a flat top, and may include a through-hole which passes through upper and lower sides. The through-hole formed in the first link body 2121*a* may be used to couple the first link member 2120*a* to the first housing 2010. The first slide holding part 2121 may include rail grooves which extend in the −y-axis direction from the first link body 2121*a*, and in which at least a portion of the first slide structure 2131*b* may be seated. Additionally or alternatively, it may further include a first slide support part 2125 which guides a periphery of the first slide structure 2131*b* whereby, after the first slide structure 2131*b* is seated on the first slide holding part 2121, the first slide structure 2131*b* does not deviate from the first slide holding part 2121 in the z-axis direction. The first slide support part 2125 may be inserted through an opening which is formed on a rear surface (e.g., a surface in the −z-axis direction) of the first slide holding part 2121. The first rail 2123 may extend in the y-axis direction from the first link body 2121*a*, and the rail structure formed on the first arm member 2171 may be fastened thereto. Correspondingly, the first rail 2123 may include arc-shaped or half-moon-shaped rail protrusions (or a pair of arc-shaped rail protrusions which face each other). Additionally or alternatively, a first link fixing part including a vertically opened opening which is used to fix the first link member 2120*a* to the first housing 2010 may be disposed in the y-axis direction of the first rail 2123.

The second link member 2120*b* may include a second link body 2122*a*, a second slide holding part 2122 which is fastened to the second slide structure 2132*b* of the second rotation member 2132, and a second rail 2124 which is fastened to a rail structure provided on one side of the second arm member 2172. The second link body 2122*a* may have substantially the same structure as that of the first link body 2121*a* described above. For example, the second link body 2122*a* may include a through-hole which vertically passes through the panel shape and is used for coupling to the second housing 2020. The first slide holding part 2121 may include rail grooves which extend from the second link body 2122*a* in the −y-axis direction and, in which at least a portion of the second slide structure 2132*b* may be seated, similar to the second slide holding part 2122. Additionally or alternatively, the second link member 2120*b* may further include a second slide support part 2126 for preventing the first slide structure 2131*b* from deviating. The second rail 2124 may extend in the y-axis direction from the second link body 2122*a*, and the rail structure formed in the second arm member 2172 may be fastened thereto. Correspondingly, at least a portion of the second rail 2124 may have an arc shape or a half-moon shape. Additionally, a second link fixing part including a vertically opened opening which is used to fix the second link member 2120*b* to the second housing 2020 may be disposed in the y-axis direction of the second rail 2124.

The first arm member 2171 may include a first lower arm member 2171_1 and a first upper arm member 2171_2, and a first arm elastic member 2171_3 which is disposed between the first lower arm member 2171_1 and the first upper arm member 2171_2. The first lower arm member 2171_1 may include a first lower arm body 2171_1*a*. of which a length in the y-axis direction is larger than that in the x-axis direction and of which an upper surface has a flat shape, a first lower spiral rail structure 2171_1*c* which is disposed in a −x-axis periphery (or a corner between the −x-axis and the y-axis) area of the first lower arm body 2171_1*a*, protrudes in the −z-axis direction, and is formed in a diagonal shape in a diagonal direction of the xy plane, and an arc-shaped or half-moon-shaped first rail structure 2171_1*b* which protrudes in the −z-axis direction from an x-axis periphery of the first lower arm body 2171_1*a*. Additionally, the first lower arm member 2171_1 may further include a lower seating structure 2171_1*d* which is formed adjacent to the first rail structure 2171_1*b* at an x-axis periphery of the first lower arm body 2171_1*a* and supports the first arm elastic member 2171_3 while the first arm elastic member 2171_3 is seated thereon. The first upper arm member 2171_2 may include a first upper arm body 2171_2*a* having a flat upper surface, a first upper spiral rail structure 2171_2*c* which is formed at a −x-axis periphery (or a corner in the −x-axis and −y-axis directions) of the first upper arm body 2171_2*a*, protrudes in the −z-axis direction, and is formed in the diagonal direction of the xy plane, a first upper seating structure 2171_2*d* which is formed to correspond to the first lower seating structure 2171_1*d* and supports the first arm elastic member 2171_3, and a first plate coupling part 2171_2*f* which is used to couple the first wing plate 2031. The first lower spiral rail structure 2171_1*c* may be fastened to the first spiral groove 1960*a* formed on one side of the interlocking member 2160 after being coupled to the first upper spiral rail structure 2171_2*c*. A first cam structure 2171_1*g* may be formed on a −y-axis side wall of the first lower spiral rail structure 2171_1*c*. A second cam structure 2171_2*g* may be formed on a y-axis side wall of the first upper spiral rail structure 2171_2*c*.

The second arm member 2172 may include a second lower arm member 2172_1 and a second upper arm member 2172_2, and a second arm elastic member 2172_3 which is disposed between the second lower arm member 2172_1 and the second upper arm member 2172_2. Similar to the first lower arm member 2171_1, the second lower arm member 2171_1 may include a second lower arm body 2172_1*a*, of which a length in the y-axis direction is larger than that in the x-axis direction and of which an upper surface has a flat shape, a second lower spiral rail structure 2171_1*c* which is disposed in an x-axis periphery (or a corner between the x-axis and the y-axis) area of the second lower arm body 2172_1*a*, protrudes in the −z-axis direction, and is formed in a diagonal shape in a diagonal direction of the xy plane, and an arc-shaped or half-moon-shaped second rail structure 2172_1*b* which protrudes in the −z-axis direction from a −x-axis periphery of the second lower arm body 2172_1*a*. Additionally, the second lower arm member 2172_1 may further include a second lower seating structure 2172_1*d* which is formed adjacent to the second rail structure 2172_1*b* at a −x-axis periphery of the second lower arm body 2172_1*a* and supports the second arm elastic member 2172_3 while the second arm elastic member 2172_3 is seated thereon. The second upper arm member 2171_2 may include a second upper arm body 2172_2*a* having a flat upper surface, a second upper spiral rail structure 2171_2*c* which is formed at a x-axis periphery (or a corner in the x-axis and −y-axis directions) of the second upper arm body 2172_2*a*, protrudes in the −z-axis direction, and is formed in the diagonal direction of the xy plane, a second upper seating structure 2172_2*d* which is formed to correspond to the second lower seating structure 2172_1*d* and supports the second arm elastic member 2172_3, and a second plate coupling part 2172_2*f* which is used to couple the second wing plate 2032. A third cam structure 2172_1*g* may be formed on a −y-axis side wall of the second lower spiral rail structure 2172_1*c*. A fourth cam structure 2172_2*g* may be formed on a y-axis side wall of the second upper spiral rail structure 2172_2*c*.

The interlocking member 2160 may include an interlocking body 2160_1 which is disposed on an upper surface (e.g., one surface in the z-axis direction) of the fixing bracket 2110, a first spiral groove 2160*a* (or a hole), a second spiral groove 2160*b* (or a hole), and a plurality of cam holes 2161, 2162, 2163, and 2164 (or grooves). For example, the interlocking body 2160_1 may have a size which is smaller than the size of the upper surface of the fixing bracket 2110 to be positioned at an upper portion of the fixing bracket 2110, and may be linearly moved in the y-axis or −y-axis direction on the upper surface of the fixing bracket 2110. The interlocking body 2160_1 may interlock the first arm member 2171 and the second arm member 2172 while converting the rotation of the first arm member 2171 and the second arm member 2172 into a linear movement. The first spiral groove 2160 may be formed in a shape of a groove or hole which is curved in a diagonal direction on one side of the interlocking body 2160_1, and may be fastened to the first spiral rail structure (e.g., the first lower spiral rail structure 2171_1*c* and the first upper spiral rail structure 2171_2*c*) of the first arm member 2171. The second spiral groove 2160*b* may be formed in a shape of a groove or hole which is curved in a diagonal direction on an opposite side of the interlocking body 2160_1, and may be fastened to the second spiral rail structure (e.g., the second lower spiral rail structure 2172_1*c* and the second upper spiral rail structure 2172_2*c*) of the second arm member 2172. The cam holes 2161, 2162, 2163, and 2164, for example, may include a first cam hole 2161, in which the first cam member 2151 and the first elastic member 2181 are seated, a second cam hole 2162, in which the second cam member 2152 and the second elastic member 2182 are seated, a third cam hole 2163, in which the third cam member 2153 and the third elastic member 2183 are seated, and a fourth cam hole 2164, in which the fourth cam member 2154 and the fourth elastic member 2184 are seated. The first cam member 2151 may be disposed to be engaged with the first cam structure 2171_1*g* formed in the first lower spiral rail structure 2171_1*c* (or the cam structure of the first lower spiral rail structure), the second cam member 2152 may be disposed to be engaged with the third cam structure 2172_1*g* formed in the second lower spiral rail structure 2172_1*c* (or the cam structure of the second lower spiral rail structure), the third cam member 2153 may be disposed to be engaged with the second cam structure 2171_2*g* formed in the first upper spiral rail structure 2171_2*c* (or the cam structure of the first upper spiral rail structure), and the fourth cam member 2154 may be arranged to be engaged with the fourth cam structure 2172_2*g* formed in the second upper spiral rail structure 2172_2*c* (or the cam structure of the second upper spiral rail structure). While the first arm member 2171 and the second arm member 2172 are rotated counterclockwise and clockwise, respectively, the cam structures (e.g., the first cam structure 2171_1*g* and the second cam structure 2171_2*g*) disposed in the first spiral rail structures 2171_1*c* and 2171_2*c* may respectively perform a cam operation of the first cam member 2151 and the third cam member 2153, and the cam structures (e.g., the third cam structure 2172_1*g* and the fourth cam structure 2172_2*g*) disposed in the second spiral rail structures 2172_1*c* and 2172_2*c* may respectively perform a cam operation with the second cam member 2152 and the fourth cam member 2154. In this process, the elastic members 2181, 2182, 2183, and 2184 may provide an elastic force to the cam members 2151, 2152, 2153, and 2154, respectively, so that a friction force which allows the first arm member 2171 and the second arm member 2172 to be held at a specific angle may be generated.

The above-described electronic device 2000 may include a first axis 201 (or a first imaginary axis), about which the first spiral rail structure 2171_1*c* and 2171_2*c*) of the first arm member 2171 is rotated in place while the unfolded (open) state is changed to the folded (closed) state (or while the folded (closed) state is changed to the unfolded (open) state), a second axis 202 (or a second imaginary axis), about which the second spiral rail structure 2172_1*c* and 2172_2*c* of the second arm member 2172 is rotated in place, a third axis 203 (or a third imaginary axis), about which the first rail structure 2171_1*b* of the first arm member 2171 is rotated (or slid) in the first rail 2123 of the first link member 2120*a*, a fourth axis 204 (or a third imaginary axis), about which the second rail structure 2172_1*b* of the second arm member 2172 is rotated (or slid) in the second rail 2124 of the second link member 2120*b*, a fifth axis 205 (or a first real axis), about which the first rotation member 2131 is rotated about the first shaft 2141, and a sixth axis 206 (or a second real axis), about which the second rotation member 2132 is rotated about the second shaft 2142, and the first slide structure 2131*b* and the second slide structure 2132*b* may be linearly moved in the x-axis or the −x-axis through the first slide holding part 2121 of the first link member 2120*a* and the second slide holding part 2122 of the second link member 2120*b*, respectively.

Meanwhile, in the above description, the electronic devices have been described separately for the hinge structures thereof, but at least part of the structure included in each hinge structure may be similarly applied to the electronic devices described in other drawings. For example, different types of hinge structures may be disposed in one electronic device. For example, the first type hinge structure and the second type hinge structure may be disposed in one electronic device, the second type hinge structure and the third type hinge structure may be disposed in one electronic device, the first type hinge structure and the third type hinge structure may be disposed in one electronic device, or the first type hinge structure, the second type hinge structure, and the third type hinge structure may be disposed in one electronic device. Alternatively, at least two of the first to fourth types of hinge structures may be disposed in one electronic device. Additionally, in an electronic device including at least one of the first to fourth type hinge structures, at least one or a plurality of hinge structures (e.g., 200*c*) including only rotation members may be disposed, or may be omitted. When a plurality of hinge structures are disposed, the disposition positions of the various types of hinge structures described above may vary. For example, the first type hinge structures (or the second type hinge structures, the third type hinge structures, or the fourth type hinge structures) may be disposed at opposite peripheries (opposite peripheries in the folded part when the foldable electronic device is in the folded state) of the foldable electronic device, respectively, and at least one hinge structure of a different type or at least one hinge structure 200*c* may be disposed between specific types of hinge structures. Alternatively, when the foldable electronic device is in the folded state, different types of hinge structures may be disposed on opposite peripheries of the folded portion of the foldable electronic device. Furthermore, at least one or a plurality of hinge structures and hinge structures 200*c* of the same or different types may be disposed between different types of hinge structures.

As described above, a foldable electronic device according to at least one of various embodiments may include a display, a first housing and a second housing, in which at least a portion of the display is received, a hinge structure connecting the first housing and the second housing, and a hinge housing, in which the hinge structure is seated. The hinge structure according to an embodiment of the disclosure includes a fixing bracket fixed to the hinge housing and including a first rail and a second rail, a first rotation member including a first rail structure fastened to the first rail and being rotated about a first axis, and a second rail structure extending from the first rail structure and being rotated about a second axis, a second rotation member including a third rail structure fastened to the second rail and being rotated about a third axis, and a fourth rail structure extending from the third rail structure and being rotated about a fourth axis, a first link member including a third rail fastened the arc-shaped second rail structure and including a first slide holding part disposed adjacent to the third rail, a second link member including a fourth rail fastened the arc-shaped fourth rail structure and including a second slide holding part disposed adjacent to the fourth rail, a first arm member including a first slide structure held on the first slide holding part, and a second arm member including a second slide structure held on the second slide holding part.

According to various embodiments, when the electronic device is viewed in a direction of the first axis or the third axis in an unfolded state, at least portions of the first rail structure and the third rail structure are disposed to overlap each other.

According to various embodiments, one periphery of the first rail structure and one periphery of the third rail structure are disposed to be engaged with each other when the electronic device is in the unfolded state.

According to various embodiments, the foldable electronic device further includes a first wing plate fastened to one side of the first rotation member and supporting a first area of a folded area of the display, and a second wing plate fastened to one side of the second rotation member and supporting a second area of the folded area of the display.

According to various embodiments, the foldable electronic device further includes at least one center plate disposed between the first wing plate and the second wing plate, an upper surface of which is formed flat, fastened to the hinge structure, and being maintained at a fixed position when the electronic device is changed from a folded state to an unfolded state.

According to various embodiments, the first slide holding part includes at least one rail groove formed in a direction, in which the first slide structure extends, and the first slide structure is linearly moved in a first direction along the at least one rail groove when the electronic device is changed from an unfolded state to a folded state.

According to various embodiments, the second slide holding part includes at least one rail groove formed in a direction, in which the second slide structure extends, and the second slide structure is linearly moved in a second direction being different from the first direction along the at least one rail groove when the electronic device is changed from the unfolded state to the folded state.

According to various embodiments, the foldable electronic device further includes at least one of a first link cover covering the first slide holding part, and a second link cover covering the second slide holding part.

According to various embodiments, the foldable electronic device further includes a first wing plate coupled to the first link cover and supporting a first area of a folded area of the display, and a second wing plate coupled to the second link cover and supporting a second area of the folded area of the display.

According to various embodiments, the foldable electronic device further includes a bracket cover covering at least an upper portion of the fixing bracket, to which the first rotation member and the second rotation member are fastened.

According to various embodiments, the second slide holding part includes at least one rail groove formed in a direction, in which the second slide structure extends, and the second slide structure is linearly moved in a second direction being different from the first direction along the at least one rail groove when the electronic device is changed from the unfolded state to the folded state.

According to various embodiments, the first axis and the third axis are located on a first plane being parallel to the display, and the second axis and the fourth axis are located on a second plane being parallel to the display.

According to various embodiments, the foldable electronic device further includes a first shaft inserted into one side of the first arm member and defining a fifth axis, about which the first arm member is rotated, a second shaft inserted into one side of the second arm member and defining a sixth axis, about which the second arm member is rotated, a shaft holding part of the first arm member, formed in the first arm member and into which the first shaft is inserted, and a shaft holding part of the second arm member, formed in the second arm member and into which the second shaft is inserted.

According to various embodiments, the foldable electronic device further includes a first gear formed in the shaft holding part of the first arm member, a second gear formed in the shaft holding part of the second arm member, and at least one idle gear disposed between the first gear and the second gear.

According to various embodiments, the foldable electronic device further includes a first spiral structure formed in the shaft holding part of the first arm member, a second spiral structure formed in the shaft holding part of the second arm member, and an interlocking member having a first spiral groove engaged with the first spiral structure and a second spiral groove engaged with the second spiral structure.

According to various embodiments, the interlocking member is linearly moved along an area being folded when the electronic device is changed from the unfolded state to the folded state.

According to various embodiments, the foldable electronic device further includes a first cam structure formed on one side of the first spiral structure, a second cam structure formed on one side of the second spiral structure, a first cam member disposed on one side of the interlocking member and including a cam engaged with the first cam structure, a second cam member disposed on an opposite side of the interlocking member and including a cam engaged with the second cam structure, a first elastic member which provides an elastic force to the first cam member, and a second elastic member which provides an elastic force to the second cam member.

According to various embodiments, when the electronic device is in an unfolded state, a shortest distance from the fifth axis and the sixth axis to a rear surface of the display is greater than a shortest distance from the first axis and the third axis to the rear surface of the display or a shortest distance between the second axis and the fourth axis to the rear surface of the display.

According to various embodiments, when the electronic device is in an unfolded state, a shortest distance between the fifth axis and the sixth axis is greater than a shortest distance between the first axis and the third axis.

A hinge structure employed in a portable communication device according to an embodiment includes a fixing bracket including an arc-shaped first rail and an arc-shaped second rail, a first rotation member including a first rail structure fastened to the first rail and rotated about a first axis, and a second rail structure extending from the first rail structure and rotated about a second axis, a second rotation member including a third rail structure fastened to the second rail and rotated about a third axis, and a fourth rail structure extending from the third rail structure and rotated about a fourth axis, a first link member including a first slide holding part including a third rail fastened to the arc-shaped second rail structure and disposed adjacent to the third rail, a second link member including a second slide holding part including a fourth rail fastened to the arc-shaped fourth rail structure and disposed adjacent to the fourth rail, a first arm member including a first slide structure, in which the first slide holding part is held, and a second arm member including a second slide structure, in which the second slide holding part is held.

In addition, in the above description, the structure related to rotational movement has been described by naming it a rail or a rail structure, but the disclosure is not limited to these terms, and the term assigned to the structure may change depending on a viewpoint. For example, the rail may protrude in a direction which protrudes from a flat side wall surface (or a bottom surface) (or in a direction which rises from the bottom surface) and may include a protrusion, of which a cross-section is curved or arc-shaped. The rail structure may include a structure, in which arc-shaped protruding protrusions are disposed to be spaced apart at regular intervals so that an arc-shaped empty space is formed between the protrusions. Accordingly, when the rail structure is fastened to the rail and rotated by an external pressure, it may be rotated or slid along the rail. Meanwhile, the terms of the above-described rail or rail structure may be read differently depending on the view point, but the disclosure is not limited thereto. That is, the rail or rail structure may be disposed in different structures for an operation, and in this case, any one of the rail and the rail structure may be formed in the different structures, or at least a portion may be formed as a rail and the remaining portions may be formed as a rail structure.

What is claimed is:

1. A foldable electronic device comprising:

a display;

a first housing and a second housing facing the display and foldable together with the display;

a hinge structure connecting the first housing to the second housing and foldable together with the display; and a hinge housing in which the hinge structure is seated, wherein the hinge structure includes:

rotation axes each extended in a rotation axis direction, the rotation axes including a first axis, a second axis, a third axis and a fourth axis;

a fixing bracket fixed to the hinge housing and including a first rail and a second rail adjacent to each other along a direction crossing the rotation axis direction;

a first rotation member including:

a first rail structure at which the first rotation member is slidably fastened to the first rail of the fixing bracket and rotatable about the first axis, and a second rail structure extending from the first rail structure along the direction crossing the rotation axis direction, having an arch-shape and being rotatable about the second axis;

a second rotation member including:

a third rail structure at which the second rotation member is slidably fastened to the second rail of the fixing bracket and rotatable about the third axis, and a fourth rail structure extending from the third rail structure along the direction crossing the rotation axis direction, having an arch-shape and being rotatable about the fourth axis;

a first link member including a third rail in which the second rail structure of the first rotation member is slidably fastened, the first link member including a first slide holding part adjacent to the third rail along the rotation axis direction;

a second link member including a fourth rail in which to the fourth rail structure of the second rotation member is slidably fastened, the second link member including a second slide holding part adjacent to the fourth rail along the rotation axis direction;

a first arm member including a first slide structure slidably held on the first slide holding part; and a second arm member including a second slide structure slidably held on the second slide holding part.

2. The foldable electronic device of claim 1, wherein the electronic device which is unfolded includes in a view along the rotation axis direction, a periphery of the first rail structure and a periphery of the third rail structure engaged with each other and overlapping each other at the fixing bracket.

3. The foldable electronic device of claim 1, wherein the display which is folded about an axis extended along the rotation axis direction includes a folded area;

the hinge structure further includes:

a first wing plate fixed to the first rotation member and facing the folded area of the display;

a second wing plate fixed to the second rotation member and facing the folded area of the display; and a center plate which is between the first wing plate and the second wing plate in the direction crossing the rotation axis direction and fastened to the hinge structure, the center plate including an upper surface which is formed flat; and the electronic device which is folded and which is unfolded includes the center plate maintained at a fixed position.

4. The foldable electronic device of claim 1, wherein the first slide holding part includes a rail groove extended in a direction in which the first slide structure extends;

the second slide holding part includes a rail groove extended in a direction in which the second slide structure extends; and the electronic device which is folded and which is unfolded linearly moves the first slide structure in a first direction along the rail groove of the first slide holding part together with linear movement of the second slide structure in a second direction which is different from the first direction and along the rail groove of the second slide holding part.

5. The foldable electronic device of claim 4, further comprising a bracket cover which overlaps the fixing bracket and to which the first rotation member and the second rotation member are fastened at opposing sides of the bracket cover, respectively.

6. The foldable electronic device of claim 1, further comprising:

a first link cover which covers the first slide holding part; and a second link cover which covers the second slide holding part.

7. The foldable electronic device of claim 6, wherein the display which is folded about an axis extended along the rotation axis direction includes a folded area, further comprising:

a first wing plate coupled to the first link cover and facing the folded area of the display; and a second wing plate coupled to the second link cover and facing the folded area of the display.

8. The foldable electronic device of claim 1, wherein the electronic device which is unfolded includes the display in a plane, and along a thickness direction of the electronic device which is unfolded:

the first axis and the third axis are each in a first plane which is parallel to the plane of the display, and the second axis and the fourth axis are each in a second plane which is parallel to the plane of the display.

9. The foldable electronic device of claim 1, further comprising:

the rotation axes further including a fifth axis and a sixth axis;

each of the first arm member and the second arm member further including a shaft holding part;

a first shaft which is rotatably engaged with the first arm member at the shaft holding part of the first arm member and defines the fifth axis; and a second shaft which is rotatably engaged with the second arm member at the shaft holding part of the second arm member and defines the sixth axis.

10. The foldable electronic device of claim 9, further comprising:

the first arm member and the second arm member further including a first gear in the shaft holding part of the first arm member and a second gear in the shaft holding part of the second arm member, respectively; and an idle gear which is between the first gear and the second gear along the direction crossing the rotation axis direction and engaged with at least one of the first gear and the second gear.

11. The foldable electronic device of claim 9, further comprising:

the first arm member and the second arm member further including a first spiral structure in the shaft holding part of the first arm member and a second spiral structure in the shaft holding part of the second arm member, respectively; and an interlocking member which is between the first spiral structure and the second spiral structure along the direction crossing the rotation axis direction, the interlocking member including a first spiral groove engaged with the first spiral structure and a second spiral groove engaged with the second spiral structure.

12. The foldable electronic device of claim 11, wherein the electronic device which is folded and which is unfolded linearly moves the interlocking member along the rotation axis direction.

13. The foldable electronic device of claim 11, further comprising:

the first spiral structure and the second spiral structure including a first cam structure and a second cam structure at one side of the first spiral structure and the second spiral structure, respectively;

the interlocking member further including:

a first cam engaged with the first cam structure of the first spiral structure; and a second cam which is on an opposite side of the interlocking member from the first cam and engaged with the second cam structure of the second spiral structure; and a first elastic member and a second elastic member which are engaged with the first cam and the second cam and provide an elastic force to the first cam and the second cam, respectively.

14. The foldable electronic device of claim 9, wherein when the electronic device is unfolded, shortest distances from the fifth axis and the sixth axis to a rear surface of the display, respectively, are greater than:

shortest distances from the first axis and the third axis to the rear surface of the display, respectively, or shortest distances from the second axis and the fourth axis to the rear surface of the display, respectively.

15. The foldable electronic device of claim 9, wherein when the electronic device is unfolded, a shortest distance between the fifth axis and the sixth axis is greater than a shortest distance between the first axis and the third axis.

16. The foldable electronic device of claim 1, wherein the display includes a first area, a second area and a third area which is foldable about an axis extended along the rotation axis direction; and the foldable electronic device which is folded includes portions of the third area facing each other together with the first area and second area facing each other and being closer to each other than the portions of the third area.

17. The foldable electronic device of claim 16, wherein the rotation axes further include a fifth axis and a sixth axis;

the first slide structure and the second slide structure are rotatable about the fifth axis and the sixth axis, respectively; and the foldable electronic device which is folded slides the first slide holding part and the second holding part along the first slide structure and the second slide structure to increase distances of the first slide holding part and the second holding part from the fifth axis and the sixth axis, respectively.

18. The foldable electronic device of claim 17, wherein the foldable electronic device which is folded further includes respective ends of the first slide holding part and the second holding part which are closest to the fixing bracket together with the third area of the display being closer to the fixing bracket than each of the respective ends.

19. The foldable electronic device of claim 16, wherein the display includes a periphery at each of opposing sides of the display along the direction crossing the rotation axis, the display being adhered to the first housing and the second housing at the peripheries, respectively; and the foldable electronic device which is folded slides the first slide holding part and the second holding part along the first slide structure and the second slide structure to decrease a distance of the first slide holding part and the second holding part from the peripheries of the display, respectively.

20. The foldable electronic device of claim 16, wherein the foldable electronic device which is folded includes:

a change of curvature of the display at boundaries respectively defined between the third area and each of the first area and the second area; and the boundaries corresponding to the second axis and the fourth axis, respectively.

* * * * *